(12) United States Patent
Thie et al.

(10) Patent No.: US 11,832,765 B2
(45) Date of Patent: Dec. 5, 2023

(54) TOASTER

(71) Applicant: BREVILLE PTY LIMITED, Alexandria (AU)

(72) Inventors: Johnson Thie, Alexandria (AU); Duncan Hellmers, Alexandria (AU); Stephen John McClean, Alexandria (AU); Ali Tofaili, Alexandria (AU); Alastair Dover, Alexandria (AU); Sathia Thangamuthu, Alexandria (AU); Gerard White, Alexandria (AU); Eugenie Barnet, Alexandria (AU); Tee Smith, Alexandria (AU); Sam Walker, Alexandria (AU); Tristan Brega, Alexandria (AU); James Morton, Alexandria (AU); Richard Hoare, Alexandria (AU); Con Psarologos, Alexandria (AU); Philip McKnight, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 252 days.

(21) Appl. No.: 17/256,981

(22) PCT Filed: Jun. 28, 2019

(86) PCT No.: PCT/AU2019/050688
§ 371 (c)(1),
(2) Date: Dec. 29, 2020

(87) PCT Pub. No.: WO2020/000056
PCT Pub. Date: Jan. 2, 2020

(65) Prior Publication Data
US 2021/0177207 A1 Jun. 17, 2021

(30) Foreign Application Priority Data

Jun. 29, 2018 (AU) ................................ 2018902375
Jun. 29, 2018 (AU) ................................ 2018902378

(51) Int. Cl.
*A47J 37/08* (2006.01)
*A47J 36/02* (2006.01)
(Continued)

(52) U.S. Cl.
CPC ......... *A47J 37/0807* (2013.01); *A47J 36/025* (2013.01); *A47J 36/04* (2013.01); *A47J 37/0871* (2013.01); *F24C 7/06* (2013.01)

(58) Field of Classification Search
CPC .... A47J 37/08; A47J 37/0807; A47J 37/0814; A47J 37/0842; A47J 37/085;
(Continued)

(56) References Cited

U.S. PATENT DOCUMENTS 4,164,643 A * 8/1979 Peart .................... F24C 15/005
                                                       219/411
4,396,825 A   8/1983 Cox et al.
(Continued)

FOREIGN PATENT DOCUMENTS

AU    2014100202 A4   4/2014
AU    2014221217 A1   3/2015
(Continued)

OTHER PUBLICATIONS

International Search Report for Application No. PCT/AU2019/050688, dated Sep. 9, 2019.
European Search Report for EP 19826209.9 dated Mar. 2, 2022.

*Primary Examiner* — Hung D Nguyen
(74) *Attorney, Agent, or Firm* — MOSER TABOADA

(57) ABSTRACT

There is disclosed herein a toaster (10) including: a housing (12); a pair of opposing food guards (24*a*, 24*b*) located
(Continued)

within the housing (12) and defining a toasting cavity (25a, 25b) for receiving foodstuff to be toasted; a pair of heating elements (28) located within the housing (12), each heating element (28) being located on a respective side of the pair of food guards (24a, 24b), wherein each food guard (24a, 24b) is spaced from the corresponding heating element (28) by a clearance (81); and wherein each food guard (24a, 24b) has an upwardly-extending portion (75c, 75d) that extends upwardly to a portion (75a, 75b) that extends transversely from the upwardly-extending portion so as to extend above the corresponding heating element (28), the transversely-extending portion (75a, 75b) of each food guard (24a, 24b) projecting away from the opposing food guard (24a, 24b).

19 Claims, 63 Drawing Sheets

(51) Int. Cl.
*A47J 36/04* (2006.01)
*F24C 7/06* (2006.01)

(58) Field of Classification Search
CPC ............... A47J 37/0857; A47J 37/0871; A47J 37/0878; A47J 37/0892; A47J 36/02; A47J 36/025; A47J 36/04; A47J 36/06; F24C 7/04; F24C 7/046; F24C 7/06; F24C 7/067
See application file for complete search history.

(56) References Cited

U.S. PATENT DOCUMENTS

| | | | |
|---|---|---|---|
| 4,913,046 A | | 4/1990 | Moethrath et al. |
| 4,986,173 A | | 1/1991 | Hahnewald et al. |
| 6,192,790 B1 | * | 2/2001 | Balandier ........... A47J 37/0807 99/385 |
| 6,649,877 B1 | | 11/2003 | Mauffrey et al. |
| 2004/0000238 A1 | | 1/2004 | Nguyen |
| 2004/0191579 A1 | | 9/2004 | Ge |
| 2009/0288563 A1 | | 11/2009 | Lim |

FOREIGN PATENT DOCUMENTS

| | | |
|---|---|---|
| EP | 1323367 A1 | 7/2003 |
| FR | 2703576 A1 | 10/1994 |
| GB | 1 366 882 A | 9/1974 |
| KR | 1999-0062179 A | 7/1999 |
| KR | 200266756 Y1 | 3/2002 |

\* cited by examiner

TOASTER

FIELD

The present invention relates to a toaster.

The invention has been developed primarily for use as a bread toaster and will be described hereinafter with reference to this application. However, it will be appreciated that the invention is not limited to this particular field of use.

BACKGROUND

During assembly of conventional toasters, a number of design features may be utilised to ensure that the various components of the toaster are securely assembled and to comply with safety requirements. Such design features may be practical from an assembly standpoint, but may not adequately reduce or prevent undesirable airflow through the toasting areas (i.e. the areas in which the foodstuff is cooked). The presence of airflow through the toasting areas impacts on toasting performance by varying the heat transfer to the foodstuff, which may result in uneven or insufficient toasting of the foodstuff.

The design features in conventional toasters may also affect the toaster's capacity to adequately and evenly distribute the heat from the heating elements to the foodstuff. Such design features are also susceptible to the retention of crumbs from the foodstuff, which is undesirable for aesthetic and hygiene reasons.

Toasters are also required to comply with strict safety standards. The design features of conventional toasters may not adequately comply with such safety standards whilst also maintaining the structural integrity and toasting performance of the toaster.

Toasters are also designed to brown slices of bread quickly and efficiently to a level that is desired by a user.

However, known toasting systems may not be able to efficiently and accurately cook all types of bread to the same desired level of the user, as the requirements for toasting different types of bread can vary due to the physical properties of the bread.

Further, known toasting systems may not be able to efficiently detect and counteract operation of a toaster where the bread has not been placed correctly within a slot of the toaster, or indeed not placed in the slot at all.

Also, known toasting systems may not be able to efficiently and accurately detect when a piece of bread has been toasted to a level desired by a user due to either holes or seeds in the bread interfering with toasting feedback signals.

OBJECT OF THE INVENTION

It is the object of the present invention to overcome or substantially ameliorate at least one of the above disadvantages.

SUMMARY OF THE INVENTION

There is disclosed herein a toaster including:
a housing;
a pair of opposing food guards located within the housing and defining a toasting cavity for receiving foodstuff to be toasted;
a pair of heating elements located within the housing, each heating element being located on a respective side of the pair of food guards, wherein each food guard is spaced from the corresponding heating element by a clearance; and
wherein each food guard includes an upwardly-extending portion that extends upwardly to a portion that extends transversely from the upwardly-extending portion so as to extend above the corresponding heating element, the transversely-extending portion of each food guard projecting away from the opposing food guard.

The toaster preferably further includes a top cap forming an upper surface of the toaster and including a pair of slots adapted to receive the foodstuff to be toasted, the top cap including portions that each have a horizontal and a vertical direction of extension that converge towards the slots.

The top cap preferably has a non-stick and/or ceramic coating.

The coating is preferably a dark, non-tarnishing colour.

The dark, non-tarnishing colour of the coating preferably has an emissivity of about 0.75 for even heat distribution.

The top cap coating preferably has a surface texture to provide an emissivity of about 0.75 for even heat distribution.

Each food guard preferably has a ceramic coating adapted to evenly distribute the heat from the heating elements into the toasting area.

The food guard coating is preferably a dark, non-tarnishing colour.

The dark, non-tarnishing colour of the food guard coating preferably has an emissivity of about 0.75 for even heat distribution.

The food guard coating preferably has a surface texture to provide an emissivity of about 0.75 for even heat distribution.

The transversely-extending portion of each food guard is preferably curved to extend over the corresponding heating element.

A gap is preferably formed between the top cap and the upper portion of each food guard.

The gap is preferably less than 3.5 mm in width.

The housing preferably includes an outer wall and an inner wall, and the toaster further includes a sensor mounted to the inner wall, the inner wall including an opening to allow the sensor to detect the foodstuff in the toasting cavity.

The toaster preferably further includes a pair of heating element brackets mounted at an upper portion of the housing and supported at a lower portion of the housing, each heating element bracket including a downwardly-facing portion adapted to engage and support the corresponding heating element.

Each food guard is preferably formed from a thin gauge wire mesh having a mesh gap of less than 5.3 mm.

The toaster preferably further includes a pair of end panels, each end panel being located adjacent to a respective end of the food guards, the end panels having a ceramic coating adapted to evenly distribute the heat from the heating elements into the toasting cavity.

Each end panel preferably has a non-stick and/or ceramic coating.

The coating is preferably a dark, non-tarnishing colour.

The dark, non-tarnishing colour of the coating preferably has an emissivity of about 0.75 for even heat distribution.

The end panel coating preferably has a surface texture to provide an emissivity of about 0.75 for even heat distribution.

Each end panel preferably includes a pair of guide slots, and each food guard includes an upper guide pin to be mounted in the respective guide slots.

The guide slots are preferably located above the toasting cavity so as to limit the airflow travelling across the foodstuff.

The food guards preferably each include a lower portion providing a pivot point, and the food guards are pivotable about their pivot points between open and closed positions.

The food guards are preferably displaceable in a horizontal direction between an open position and a closed position.

In some embodiments, the housing includes an inner wall surrounding the toasting cavity, the inner wall including an upper portion that is angled downwardly toward the slots.

There is also further disclosed herein including:
a housing;
a pair of opposing food guards located within the housing and defining a toasting cavity for receiving foodstuff to be toasted;
a pair of opposing heating elements located within the housing, each heating element being located on a respective side of the pair of food guards, wherein each heating element is spaced from the corresponding food guard by a clearance; and
a pair of spaced end panels between which the food guards extend;
wherein the heating elements are supported adjacent an upper portion of the cavity so as to extend downwardly.

Each end panel preferably has a non-stick and/or ceramic coating.

The coating is preferably a dark, non-tarnishing colour.

The dark, non-tarnishing colour of the coating preferably has an emissivity of about 0.75 for even heat distribution.

The end panel coating preferably has a surface texture to provide an emissivity of about 0.75 for even heat distribution.

Each food guard preferably has a ceramic coating adapted to evenly distribute the heat from the heating elements into the toasting area.

The food guard coating is preferably a dark, non-tarnishing colour.

The dark, non-tarnishing colour of the food guard coating preferably has an emissivity of about 0.75 for even heat distribution.

The food guard coating preferably has a surface texture to provide an emissivity of about 0.75 for even heat distribution.

The toaster preferably further includes a top cap forming an upper surface of the toaster and including a pair of slots adapted to receive the foodstuff to be toasted, the top cap including portions that each have a horizontal and a vertical direction of extension that converge towards the slots.

The top cap preferably has a non-stick and/or ceramic coating.

The coating is preferably a dark, non-tarnishing colour.

The dark, non-tarnishing colour of the coating preferably has an emissivity of about 0.75 for even heat distribution.

The top cap coating preferably has a surface texture to provide an emissivity of about 0.75 for even heat distribution.

Each end panel preferably includes a pair of guide slots, and each food guard includes an upper guide pin to be mounted in the respective guide slots.

The toaster preferably further includes a crumb tray that is removably engaged with a base member of the housing, the crumb tray including a raised portion to engage a recessed portion of the base member so as to correctly orient the crumb tray with respect to the base member.

The crumb tray preferably further includes an upper surface and a lower surface, the upper surface having portions that are angled with respect to the upper surface so as to reflect heat from the heating elements into the toasting cavity.

The base member preferably includes an actuation member, and wherein engagement of the crumb tray with the base member forces the actuation member into electrical contact with a switch in the base member, and disengagement of the crumb tray with the base member separates the base member from electrical contact with the switch.

Each food guard is preferably spaced from the corresponding heating element by a clearance; and each food guard has an upwardly-extending portion and a portion that extends transversely therefrom so as to extend above the corresponding heating element, the transversely-extending portion of each food guard projecting away from the opposing food guard.

The transversely-extending portion of each food guard is preferably curved to extend over the corresponding heating element.

The housing preferably includes an outer wall and an inner wall, and the toaster further includes a sensor mounted to the inner wall, the inner wall including an opening to allow the sensor to detect the foodstuff in the toasting cavity.

The toaster preferably further includes a pair of heating element brackets mounted at an upper portion of the housing and supported at a lower portion of the housing, each heating element bracket including a downwardly-facing portion adapted to engage and support the corresponding heating element.

Each food guard is preferably formed from a thin gauge wire mesh having a mesh gap of less than 5.3 mm.

There is further disclosed herein a toaster including:
a housing;
a pair of opposing food guards located within the housing and defining a toasting area for receiving foodstuff to be toasted; and
a pair of heating elements located within the housing, each heating element being located on a respective side of the pair of food guards, wherein each food guard is spaced from the corresponding heating element by a clearance, and each food guard is arranged to extend over the corresponding heating element.

There is further disclosed herein a toaster including:
a housing having an outer wall and an inner wall;
a toasting area within the housing for receiving foodstuff to be toasted;
a pair of heating elements, each heating element being located on a respective side of the toasting area; and
a sensor mounted to the inner wall, the inner wall including an opening to allow the sensor to detect the foodstuff in the toasting area, the inner wall further including a pair of reflector tabs located on opposing sides of the opening, wherein the reflector tabs are arranged at an angle to reflect heat generated by the heating elements into the toasting area.

There is further disclosed herein a toaster including:
a housing;
a toasting area within the housing for receiving foodstuff to be toasted;
a pair of heating element located within the housing, each heating element being located on a respective side of the toasting area; and
a pair of heating element brackets mounted at an upper portion of the housing and supported at a lower portion of the housing, each heating element bracket including a downwardly-facing portion adapted to engage and support the corresponding heating element.

There is further disclosed herein a toaster including:

a housing;

a pair of opposing food guards located within the housing and defining a toasting area for receiving foodstuff to be toasted; and a pair of heating elements located within the housing, each heating element being located on a respective side of the pair of food guards, wherein each food guard is formed from a thin gauge wire mesh having a mesh gap of less than 5.3 mm.

There is further disclosed herein a toaster including:

a housing;

a pair of opposing food guards located within the housing and defining a toasting area for receiving foodstuff to be toasted;

a pair of heating elements located within the housing, each heating element being located on a respective side of the food guard pair; and a pair of end panels, each end panel being located adjacent to a respective end of the food guards, the end panels having a ceramic coating adapted to evenly distribute the heat from the heating elements into the toasting area.

The present disclosure also provides an improved toaster and toaster operations, and in particular, providing improved toasting system for determining a type of bread being toasted to vary the toasting parameters, providing an improved toasting system for detecting when bread is not within a toasting slot that is being heated, or an improved toasting system for determining a position at which to monitor the bread before/while toasting the bread.

According to one embodiment, there is provided a toaster comprising at least one optical sensor, at least one toasting slot, at least one heating element for emitting heat in the toasting slot and a processor, wherein the optical sensor is arranged to: emit an optical signal into the toasting slot; sense a reflected optical signal that reflects off a food item when the food item is placed in the toasting slot, and communicate the reflected optical signal to the processor, wherein the processor is arranged to: determine an active shade profile based on the reflected optical signal for the food item, compare the active shade profile with at least one stored shade profile associated with at least one food item type to determine if the active shade profile and the stored shade profile are within a defined threshold, and whereupon the processor determining that the active shade profile and the stored shade profile are within the defined threshold of each other, controlling a heating profile of the heating elements based on the food item type.

Preferably, the processor is further arranged to compare a first shade value in the active shade profile at a defined time point with a second shade value in the stored shade profile at the same defined time point to determine if the first shade value and the second shade value are within the defined threshold.

Preferably, the processor is further arranged to adjust one or both of the time for toasting the food item and the power being applied to the heating element based on the determination by the processor that the active shade profile and the stored shade profile are within the defined threshold of each other.

According to another embodiment, there is provided a method of controlling a toaster comprising the steps of: emitting an optical signal into a toasting slot of the toaster; sensing a reflected optical signal that reflects off a food item when the food item is placed in the toasting slot, and determining an active shade profile based on the reflected optical signal for the food item, comparing the active shade profile with at least one stored shade profile associated with at least one food item type to determine if the active shade profile and the stored shade profile are within a defined threshold, and upon determining that the active shade profile and the stored shade profile are within the defined threshold, controlling a heating profile of the heating elements based on the food item type.

Preferably, the method further includes the step of: comparing a first shade value in the active shade profile at a defined time point with a second shade value in the stored shade profile at the same defined time point to determine if the first shade value and the second shade value are within the defined threshold.

Preferably, the method further includes the step of adjusting one or both of the time for toasting the food item and the power being applied to the heating elements based on the determination that the active shade profile and the stored shade profile are within the defined threshold of each other.

According to another embodiment, there is provided a toaster comprising at least one optical sensor, at least one toasting slot, at least one toasting carriage for inserting a food item into the toasting slot and a processor, wherein the optical sensor is arranged to: emit an optical signal into the toasting slot; sense a reflected optical signal associated with a food item when the toasting carriage is moving the food item within the toasting slot, and communicate the reflected optical signal to the processor, wherein the processor is arranged to: determine an optical profile of the food item based on the reflected optical signal along a region of the food item as it was being inserted, determine an optimal sensing location along the region of the food item that corresponds to an optimal sensing region based on the determined optical profile, and cause the toasting carriage to move to a toasting position that corresponds with the determined optimal sensing location.

Preferably, the toaster has a carriage motor arranged to control movement of the toasting carriage, wherein the processor is further arranged to determine the carriage position of the toasting carriage when the toasting carriage is moved within the toasting slot based on operation of the carriage motor, wherein the processor is further arranged to control movement of the toasting carriage to the carriage position that corresponds with the toasting position after determining the optimal sensing location.

Preferably, the optical signal sensed by the optical sensor is a light signal generated by the optical sensor that is reflected off the food item.

Preferably, the optimal sensing location is determined by the processor by comparing the optical profile with a stored profile that is associated with at least one optimal sensing region.

According to another embodiment, there is provided a method of controlling a toaster, the method comprising the steps of: emitting an optical signal into a toasting slot of the toaster; sensing a reflected optical signal associated with a food item when a toasting carriage of the toaster is moving the food item within the toasting slot, determining an optical profile of the food item based on the reflected optical signal along a region of the food item as it was being inserted, determining an optimal sensing location along the region of the food item that corresponds to an optimal sensing region based on the determined optical profile, and causing the toasting carriage to move to a toasting position that corresponds with the determined optimal sensing location.

Preferably, the method further includes the steps of determining a carriage position of the toasting carriage when the toasting carriage is moved within the toasting slot based on operation of the carriage motor, and controlling movement of the toasting carriage to the carriage position that corresponds with the toasting position after determining the optimal sensing location.

Preferably, the method further includes the step of comparing the optical profile with a stored profile that is associated with at least one optimal sensing region.

According to another embodiment, there is provided a toaster comprising at least one optical sensor, at least one toasting slot for receiving a food item and a processor, wherein the optical sensor is arranged to: emit an optical signal into the toasting slot; sense a reflected optical signal associated with the toasting slot, and communicate the reflected optical signal to the processor, wherein the processor is arranged to: determine, based on the reflected optical signal, whether a food item has or has not been inserted in the toasting slot.

Preferably, upon a determination that the food item has not been inserted in the toasting slot, the processor is further arranged to execute one or more defined tasks comprising: turn off one or more heating elements associated with the toasting slot; cause a toasting carriage for the toasting slot to rise; output an alarm signal; and shutdown user control of the toaster.

According to another embodiment, there is provided a method of controlling a toaster, the method comprising the steps of: emitting an optical signal into a toasting slot of the toaster; sensing a reflected optical signal associated with the toasting slot, determining, based on the reflected optical signal, whether a food item has or has not been inserted within the toasting slot.

Preferably, upon a determination that the food item has not been inserted in the toasting slot, the method further includes the steps of executing one or more defined tasks comprising: turning off one or more heating elements associated with the toasting slot; causing a toasting carriage for the toasting slot to rise; outputting an alarm signal; and shutting down user control of the toaster.

Other embodiments are also disclosed.

BRIEF DESCRIPTION OF THE DRAWINGS

Preferred forms of the present invention will now be described by way of example only, with reference to the accompanying drawings, in which.

DESCRIPTION OF THE EMBODIMENTS

Figure 1:
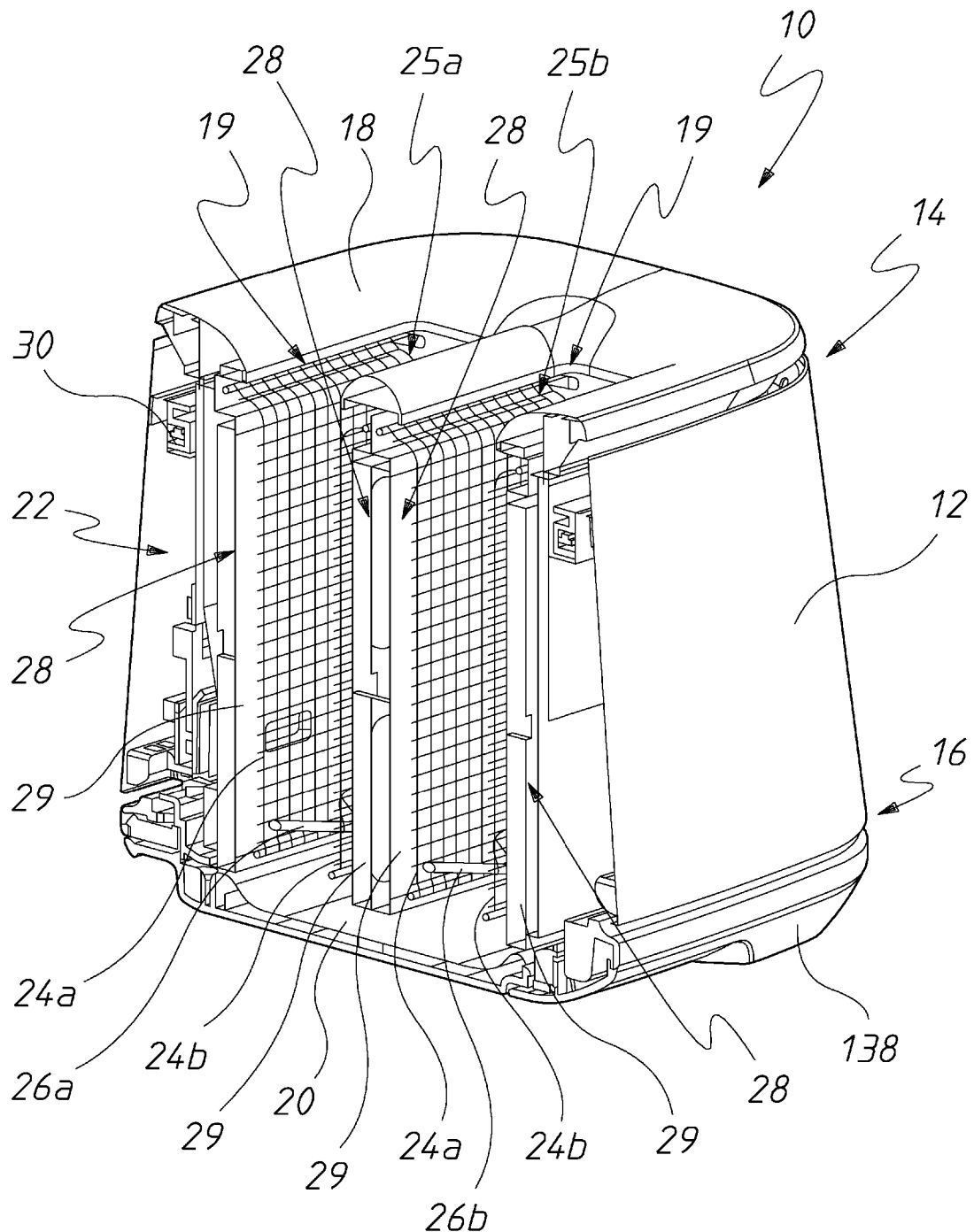
FIG. 1 is a schematic sectioned isometric view of a toaster.
Figure 59:
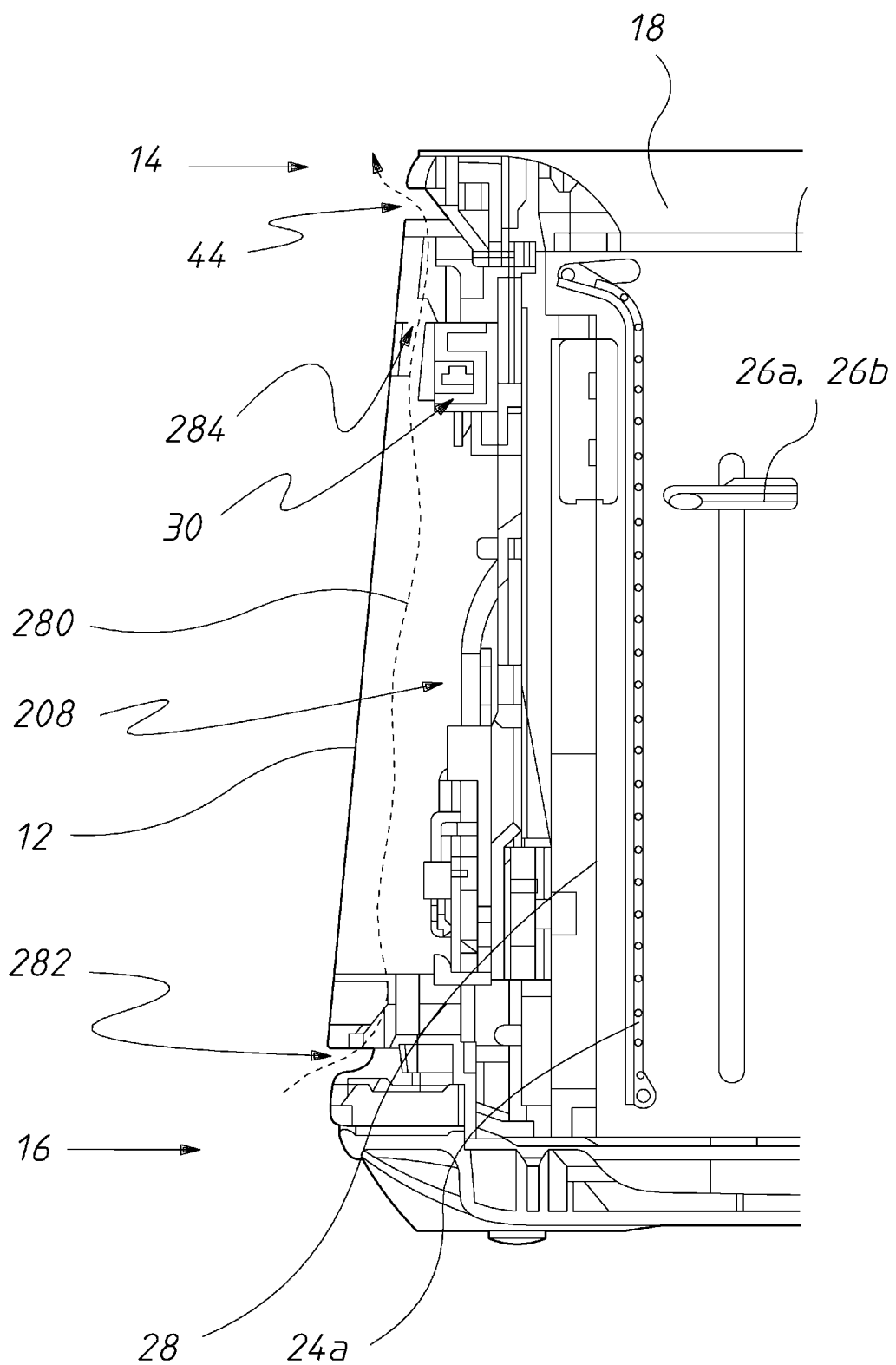
FIG. 59 is a further enlarged schematic front view of the toaster of FIG. 1.

In FIGS. 1 to 59 of the accompanying drawings, there is schematically depicted a toaster 10. The toaster 10 includes a housing 12 having an upper portion 14 and a lower (i.e. base) portion 16. The toaster 10 further includes a top cap 18 located at the upper portion 14 of the housing 12 and a removable crumb tray 20 located at the lower portion 16 of the housing 12. The top cap 18 includes a pair of slots 19 through which the foodstuff to be toasted is inserted. The housing 12 includes an interior 22 which houses a number of components for receiving and toasting the foodstuff. For the purpose of this specification, it will be understood that a wide variety of foodstuffs may be cooked in a toaster. Such foodstuffs include sliced breads, bagels, crumpets, and pastries, as well as frozen versions of such foodstuffs. Throughout the specification, the term "foodstuff" will be used to designate all of these unless otherwise specified.

The toaster 10 further includes two pairs of food guards located within the interior 22 of the housing 12. Each pair of food guards includes a first food guard 24a and an opposing second food guard 24b. The spaces between the pair of first and second food guards 24a and 24b defines the two toasting areas (cavities) 25a and 25b within which the foodstuff resides during operation of the toaster 10. It will be understood that the width of each toasting area 25a, 25b may range from between 20 to 25 mm to accommodate the width of the foodstuff. The width of each toasting area 25a, 25b also defines the distance that each of the respective food guards 24a, 24b may displace or pivot between their open and closed positions, as will be described in further detail below. Located between each pair of food guards 24a, 24b and adjacent the lower portion 16 of the housing 12 is a respective food carriage 26a, 26b. The foodstuff is inserted into the toaster 10 via one of the slots 19 in the top cap 18 and rested on the respective food carriage 26a, 26b, whereby the associated first and second food guards 24a and 24b hold (and/or align) the foodstuff in place. Each of the food carriages 26a, 26b are moveable from a first position adjacent to the upper portion 14 of the housing 12 to receive the foodstuff, and a second position adjacent to the lower portion 16 of the housing 12 to toast the foodstuff. The first position of each of the food carriages 26a and 26b corresponds to the open position of the respective food guards 24a and 24b and conversely, the second position of each of the food carriages 26a and 26b correspond to the closed position of the respective food guards 24a and 24b. The movement of each of the food carriages 26a, 26b between the first and second positions may be manually actuated (e.g. by a user pushing down or pulling up on a lever in the toaster 10), or automatically actuated (e.g. by detecting the presence of the foodstuff and enabling an associated motor-driven lift function, as will be described in further detail below). It is envisaged that the movement of each of the food carriages 26a, 26b may also be automatically actuated by way a user actuating an electronic/electrical button on the toaster 10. It will be understood that the associated motor-driven lift function also allows the food carriages 26a, 26b to rest at any location between the first and second positions. The toaster 10 further includes a heating element assembly 28 adjacent to each of the food guards 24a, 24b. Accordingly, in the embodiment as shown in the Figures, the toaster includes four heating element assemblies 28. The toaster 10 also includes a light emitting diode (LED) assembly 30 located within the interior 22 of the housing 12 adjacent the upper portion 14.

The structure and functionality of each individual component of the toaster 10 will now be described in further detail below.

Top Cap

Figure 3:
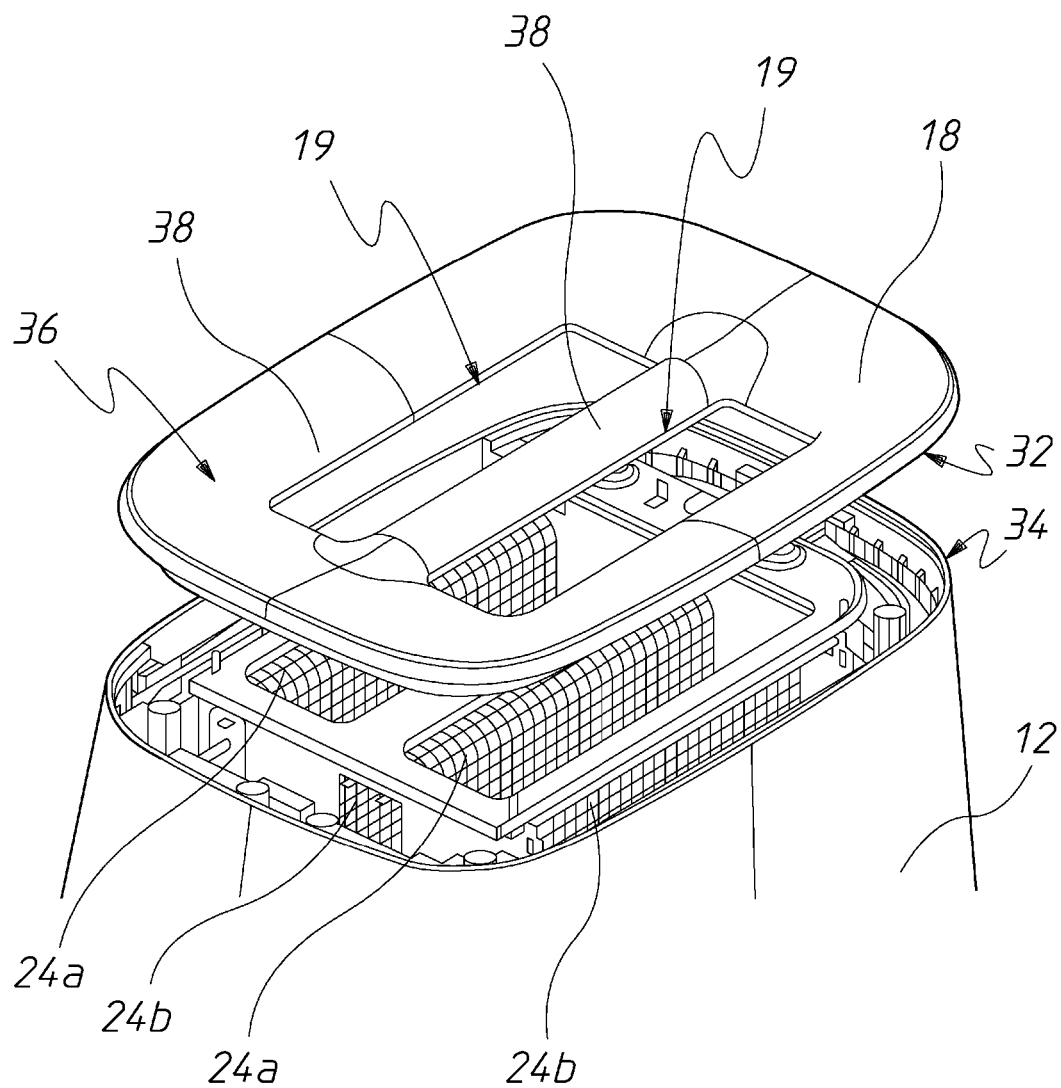
FIG. 3 is a schematic sectioned isometric view of the toaster of FIG. 1.
Figure 4:
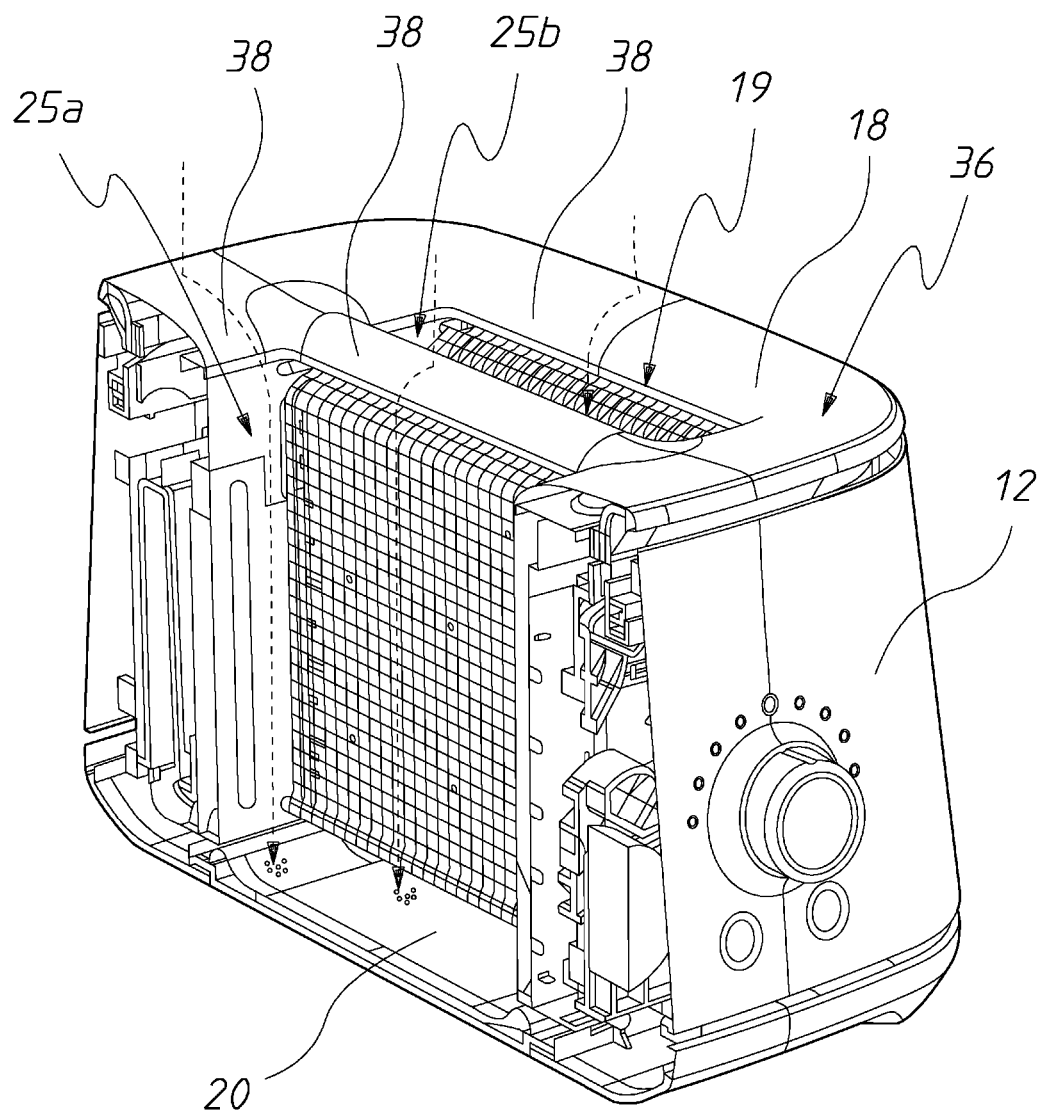
FIG. 4 is a further schematic sectioned isometric view of the toaster of FIG. 1.
Figure 5:
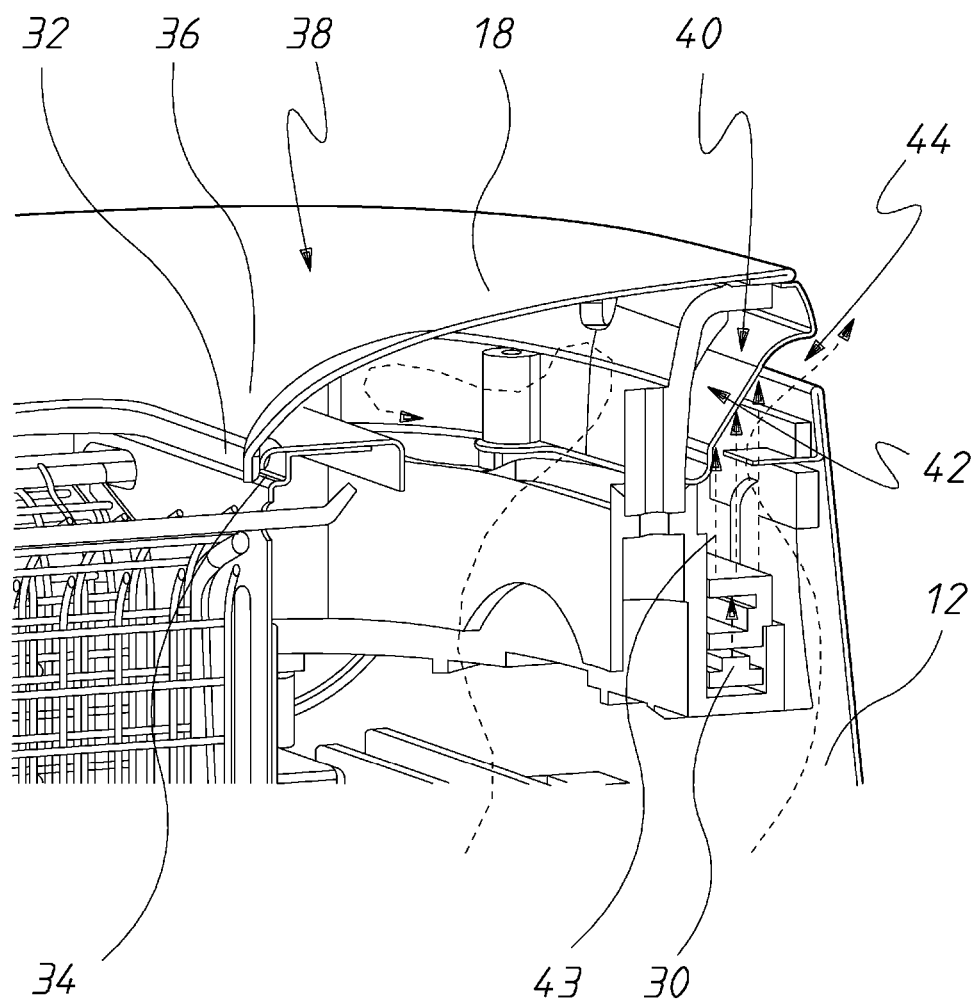
FIG. 5 is an enlarged schematic sectioned isometric view of the toaster of FIG. 1.

As best shown in FIGS. 3 to 5, the top cap 18 forms the upper surface of the toaster 10 and is adapted to receive the foodstuff to be toasted via the pair of slots 19. The pair of slots 19 have a generally rectangular cross-sectional shape with slightly rounded/curved corners. Referring to FIG. 5, the top cap 18 includes male features 32 located at a lower periphery of the top cap 18. The male features 32 are generally downwardly-facing and adapted to sealingly engage corresponding female features 34 (e.g. slots) located at an upper periphery of the housing 12. The corresponding arrangement of the male and female features 32 and 34 allow the top cap 18, and in particular the slots 19, to be securely aligned and attached to the housing 12 during assembly without the need for additional fixing tabs, as required during assembly of conventional toasters. The engagement of the male and female features 32 and 34 also creates a seal to reduce the presence of exposed openings between the top cap 18 and the housing 12, so as to prevent undesirable airflow into the interior 22 of the housing 12 whilst the foodstuff is being toasted. The corresponding arrangement of the male and female features 32 and 34 may also reduce the number of surfaces in the toaster 10 that are susceptible to collection of crumbs from the foodstuff.

Figure 19:
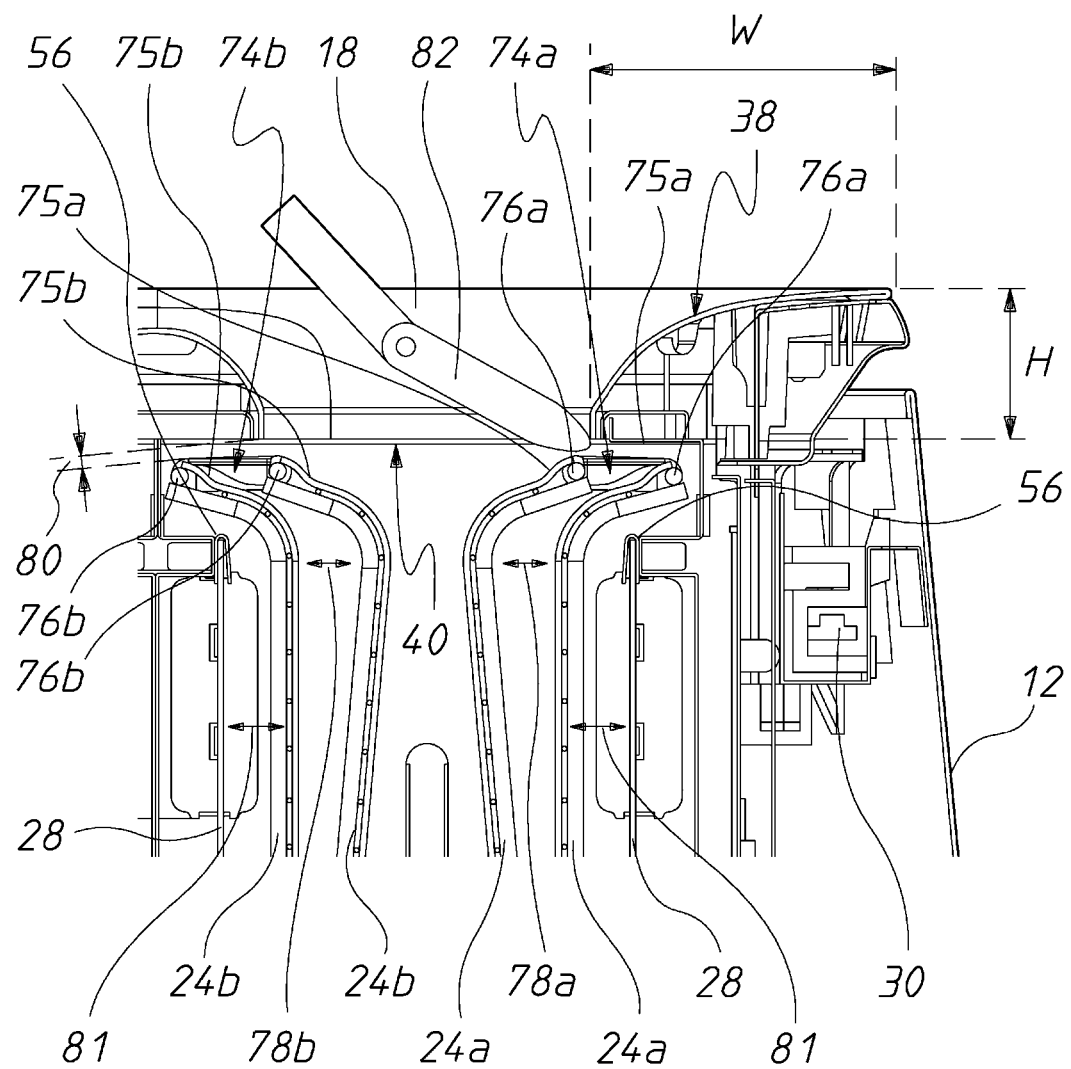
FIG. 19 is an enlarged schematic side view of the toaster of FIG. 1.
Figure 19B:
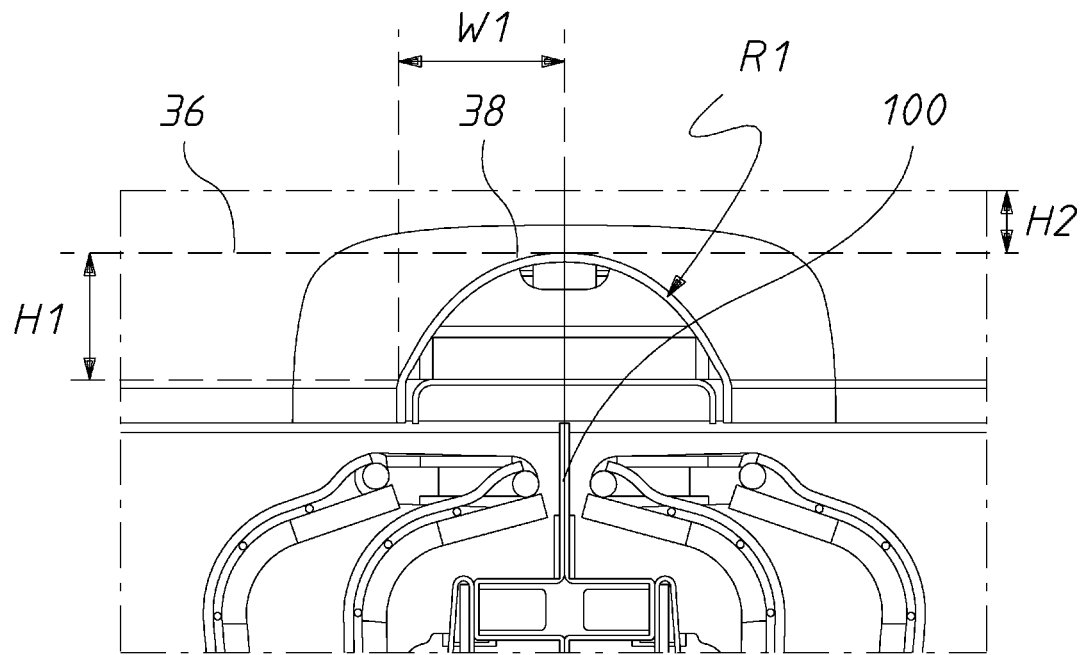
Figure 19A:
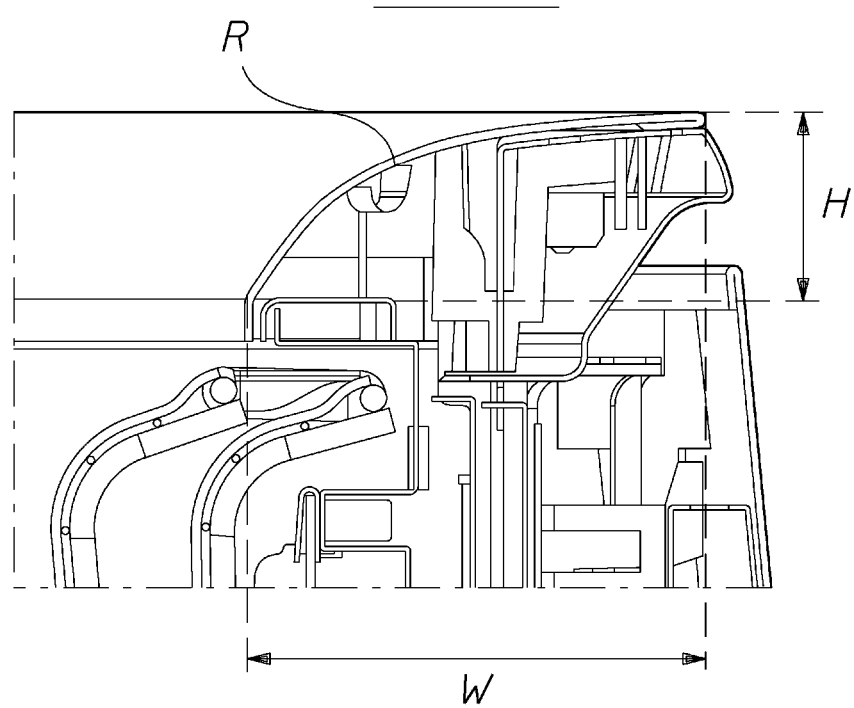

As best shown in FIGS. 4 and 5, the top cap 18 has an upper surface 36 including curved portions 38 that curve inwardly and downwardly towards each of the slots 19. The curved portions 38 each have a horizontal direction of extension and a vertical direction of extension that converge towards the slots. Referring to FIGS. 19 and 19A, the curved portions 38 are formed as compound curves with boundaries defined by a height H in the range of between about 10 mm to 20 mm and a width W in the range of between about 30 mm to 45 mm. In a preferred form, the height H is about 15.2 mm and the width W is 37.5 mm so as to define a compound curve having a radius of curvature R of about 24.5 mm. Returning to FIGS. 4 and 5, the arrangement of the curved portions 38 may at least reduce or eliminate horizontal portions on the upper surface 36 of the top cap 18 so as to prevent crumbs from the foodstuff being collected on the top cap 18. The curved portions 38 direct the crumbs to fall or roll into the toasting areas 25a, 25b via the slots 19 and onto the crumb tray 20. In preferred forms, the upper surface 36 of the top cap 18, including the curved portions 38, has a non-stick and/or ceramic coating to prevent crumbs from resting and sticking onto the upper surface 36 of the top cap 18. The non-stick and/or ceramic coating is preferably a dark (e.g. black), non-tarnishing colour to reduce the appearance of imperfections on the top cap 18. It will be appreciated that the dark (e.g. black) colour of the non-stick coating has a suitable emissivity range for even heat distribution. In a preferred form, the non-stick and/or ceramic coating is a dark colour having an emissivity of less than about 0.75. The surface texture of the coating may also be tuned, depending on the shade of the dark coating, so as to ensure that the emissivity does not drop below 0.75.

Referring to FIG. 5, the top cap 18 also has a lower surface 40 including an angled portion 42 to reflect light that shines upwardly from the LED assembly 30 (e.g. in the direction 43) and out of the toaster 10 through a gap or vent 44 between the top cap 18 and the housing 12. It is envisaged that the angle of the angled portion 42 relative to the upper surface 36 of the top cap 18 is between about 30 to 70 degrees. In a preferred form, the angle is about 50 degrees.

Housing

Figure 6:
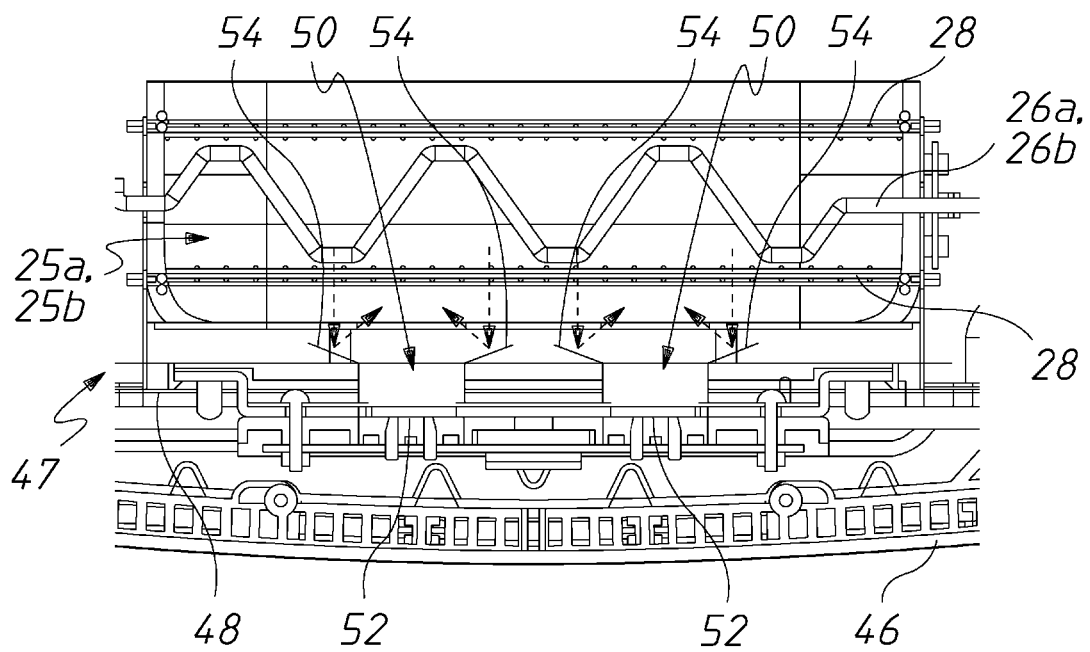
FIG. 6 is an enlarged schematic sectioned top view of the toaster of FIG. 1.
Figure 7:
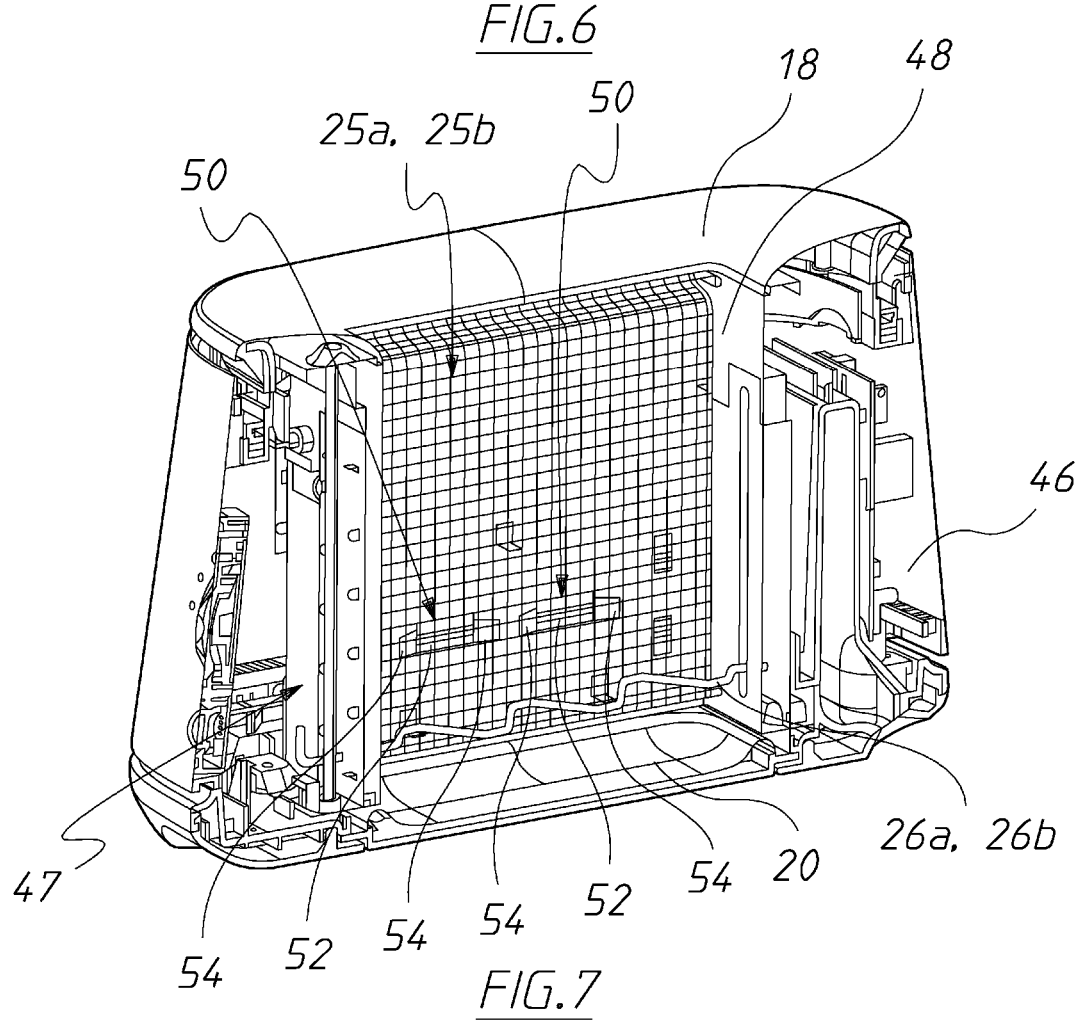
FIG. 7 is a further schematic sectioned isometric view of the toaster of FIG. 1.

As best shown in FIGS. 6 and 7, the housing 12 forms the main body of the toaster 12 and includes an outer wall 46 forming the outer chassis of the housing 12 and an inner chassis assembly 47 having an inner wall 48 surrounding the toasting area 25a, 25b. The inner wall 48 includes openings 50 to allow sensors 52 to detect the foodstuff. As will be discussed in further detail below, the sensors 52 are configured to detect the physical characteristics of the surface of the foodstuff to determine an optimal toasting area. When the optimal toasting area is found, the sensors 52 send a signal to an associated processor, which enables the associated motor to adjust the height of the food carriages 26a, 26b accordingly. Each sensor 52 is also configured to detect the presence or absence of the foodstuff in the toasting areas 25a and 25b. If no foodstuff is detected, the sensor 52 send a signal to the associated processor, which enables the associated motor to return associated food carriage 26a, 26b to the first position. A pair of reflector tabs 54 is located on either side of each opening 50 and adapted to reflect heat from the heating element assembly 28 back in the toasting areas 25a, 25b. The arrangement of the reflector tabs 54 may at least reduce the amount of heat lost through the openings 50 which may otherwise result in uneven toasting of the foodstuff. It is envisaged that the amount of heat reflected may be adjusted by modifying the length or angle of the tabs 54, or by introducing perforations into the tabs 54. In a preferred form, the angle of the tabs 54 relative to the surface of the inner wall 48 is between about 5 to 45 degrees. It is also envisaged that the maximum length of the tabs 54 may the width of the respective opening 50.

Figure 6A:
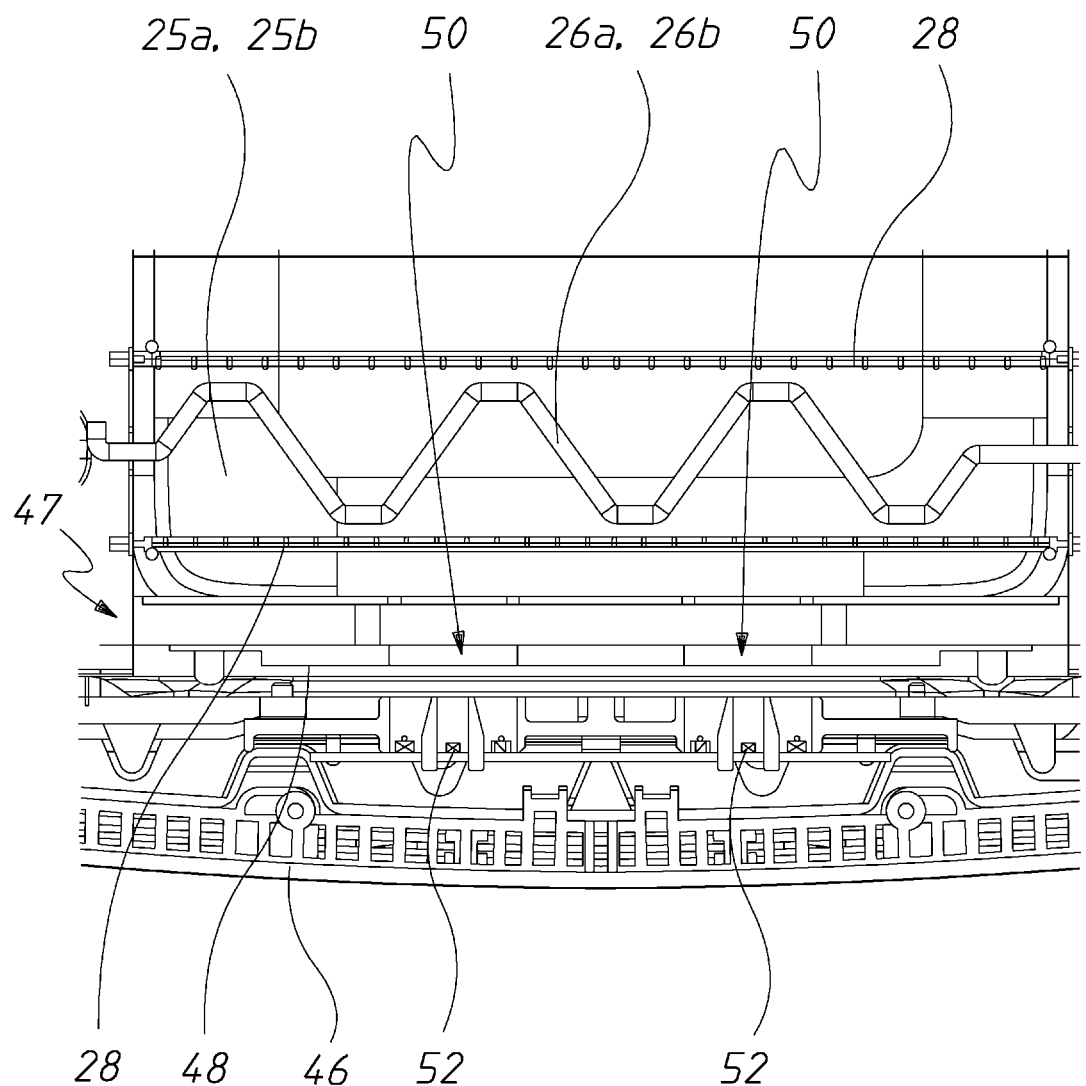
FIG. 6A is an enlarged schematic sectioned top view of the toaster of FIG. 1 in an alternative configuration.
Figure 7A:
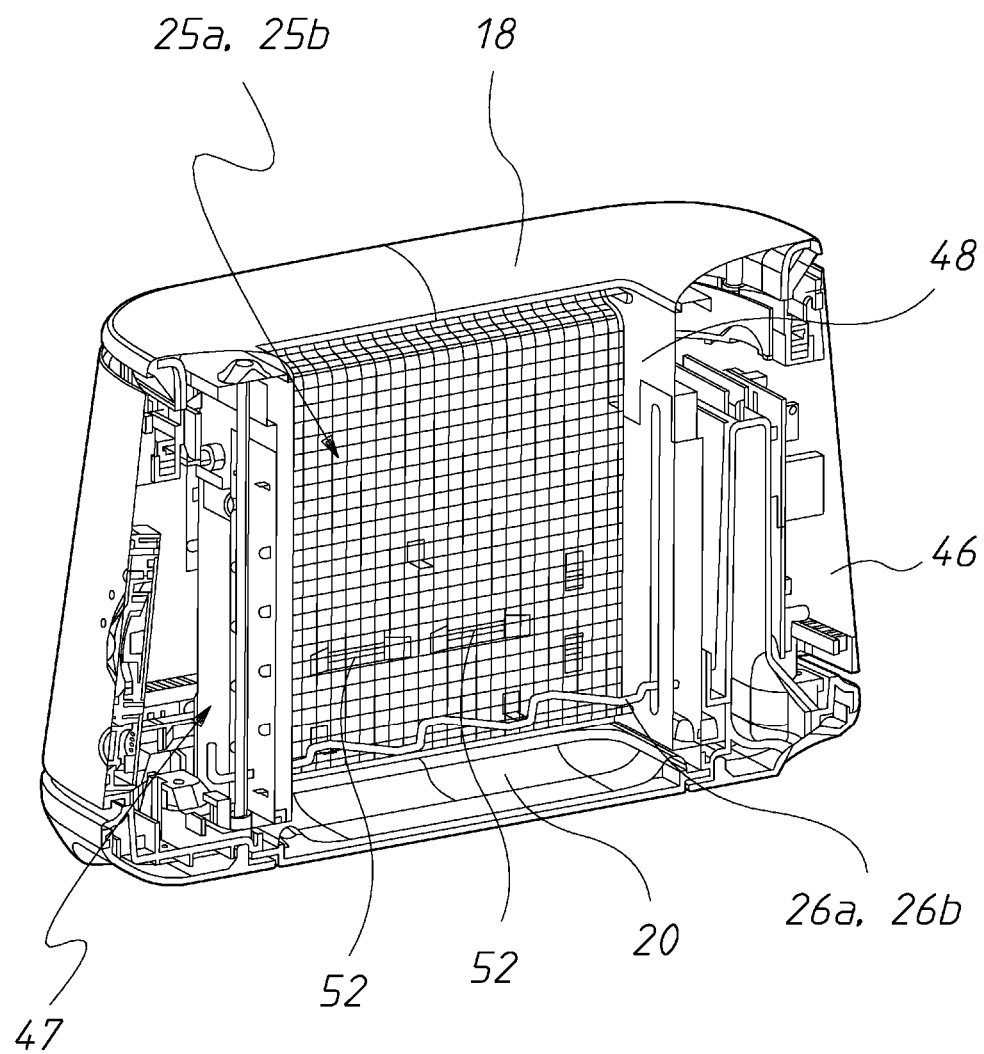
FIG. 7A is a further schematic sectioned isometric view of the toaster of FIG. 1 in a alternative configuration.

In the alternative embodiment as shown in FIGS. 6A and 7A, the reflector tabs 54 are removed.

Figure 8:
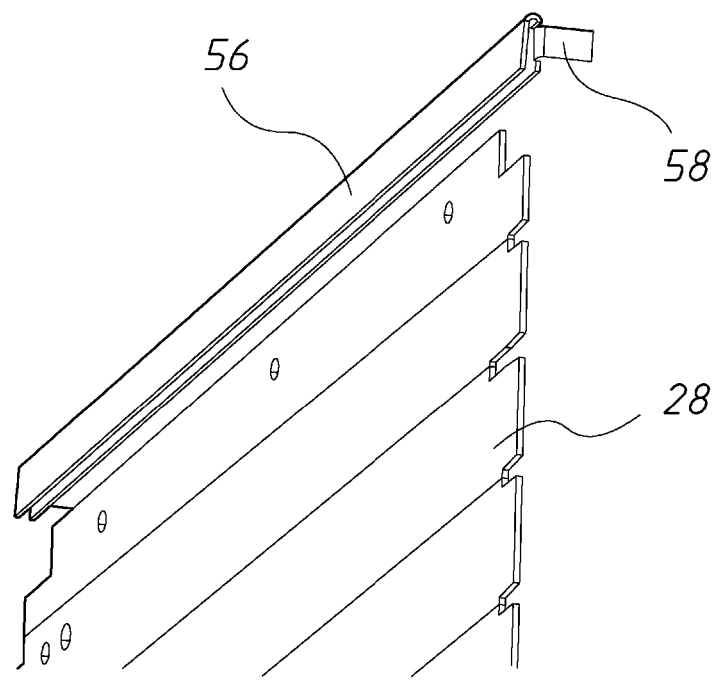
FIG. 8 is an enlarged schematic isometric view of a heating element and heating element bracket of the toaster of FIG. 1.
Figure 9:
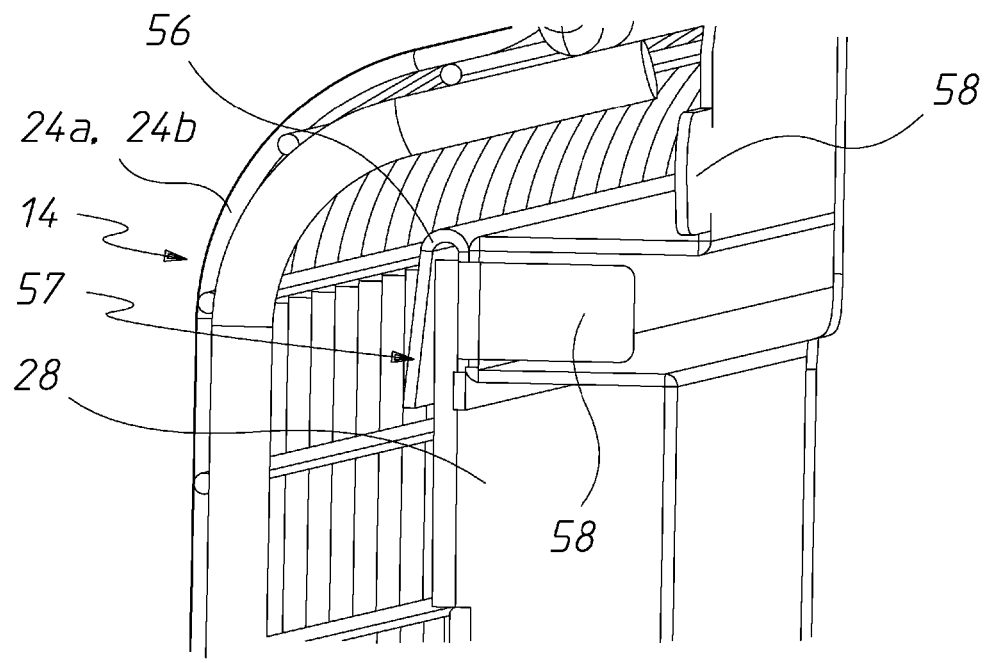
FIG. 9 is a further enlarged schematic isometric view of the heating element and heating element bracket of FIG. 8.

As best shown in FIGS. 8 and 9, each heating element assembly 28 of the toaster 10 is mounted in the housing 12 by way of a heating element bracket 56 located in the inner chassis assembly 47 and adjacent to the upper portion 14 of the housing 12. Each heating element bracket 56 includes a downwardly facing portion 57 adapted to clamp and support the heating element assembly 28. As discussed above, it will be understood that the toaster 10 includes a pair of heating element assemblies 28 located on either side of each toasting area 25a and 25b, such that the toaster 10 includes a total of four heating element assemblies 28. The heating element bracket 56 includes tabs 58 to engage corresponding apertures in the inner chassis assembly 47 to aid in the assembly of the inner chassis assembly 47 and increase the structural integrity of the inner chassis assembly 47. The arrangement of the heating element bracket 56 may at least remove the need to use a bottom plate to secure the heating element assembly 28 in the inner chassis assembly 47 as with conventional toasters, thereby reducing upward-facing surfaces from the bottom of the inner chassis assembly 47 that may be susceptible to crumb collection.

Figure 10:
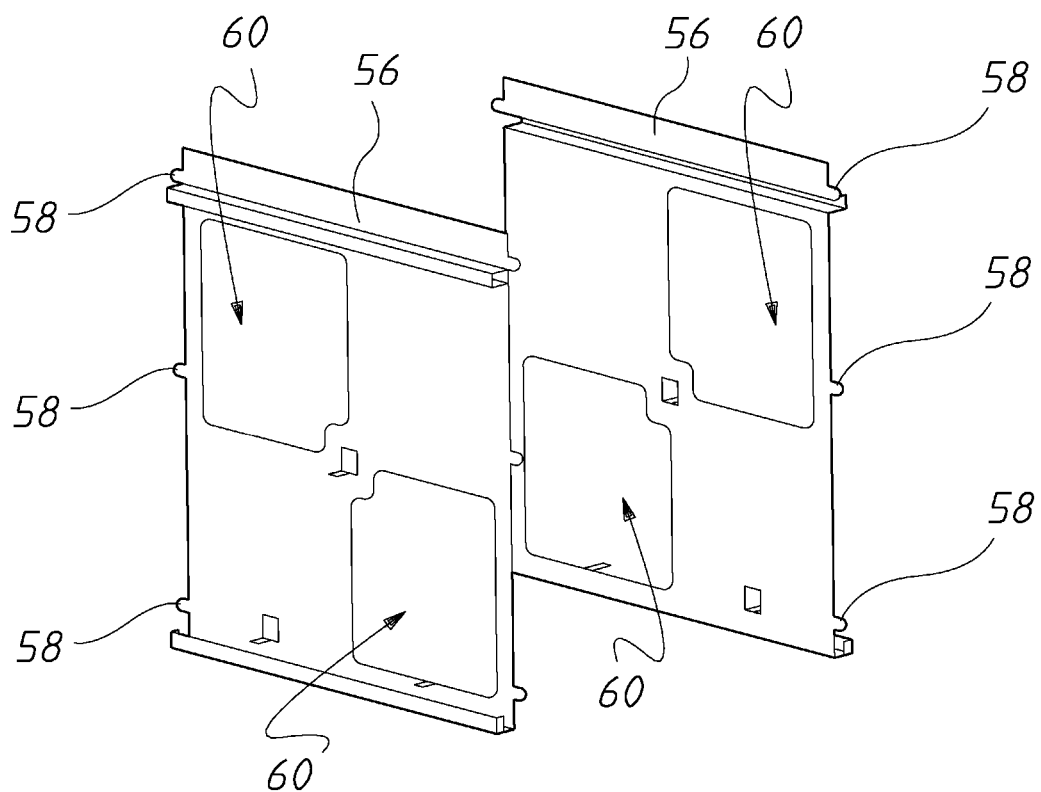
FIG. 10 is a schematic isometric view of the heating element bracket of FIG. 8.
Figure 11:
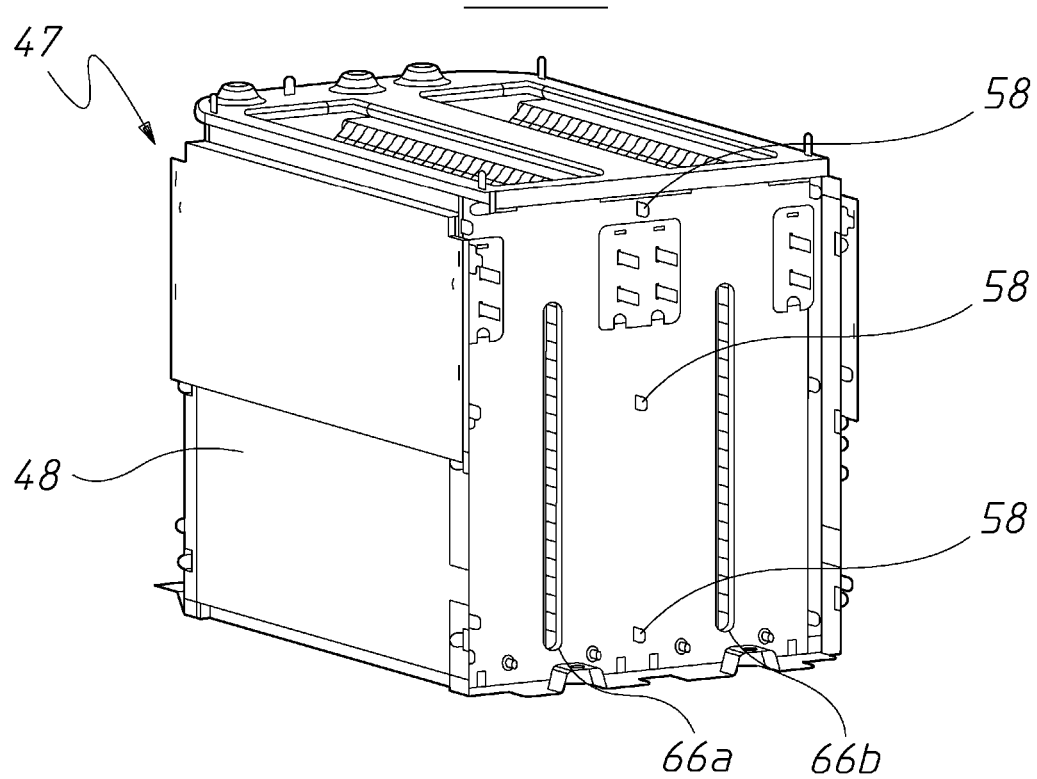
FIG. 11 is a schematic isometric view of an inner chassis assembly of the toaster of FIG. 1.

As best shown in FIGS. 10 and 11, the two element card brackets 56 located at the centre of the toaster 10 includes a pair of cutouts 60. The cutouts 60 on the two element card brackets 56 have an overlapping configuration such that the thermal mass of the toaster 10 may be reduced. It will be understood by a person skilled in the art that thermal mass affects the overall toasting time and as such, the higher the thermal mass, the slower the toasting time.

Figure 12:
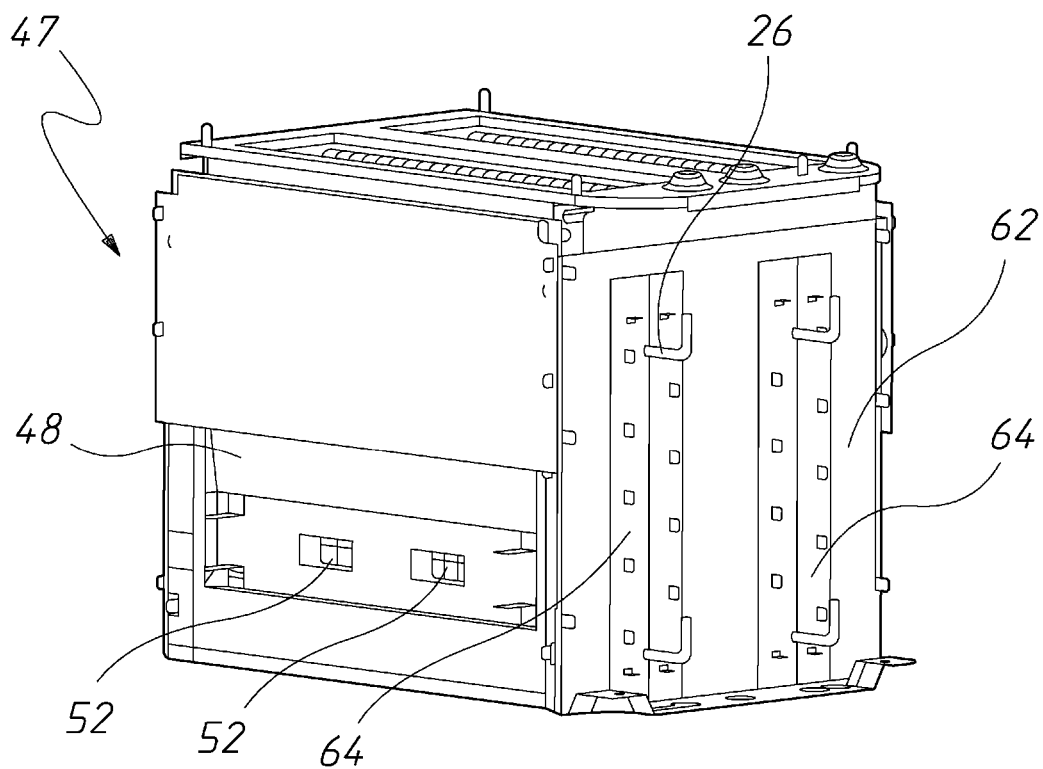
FIG. 12 is a further schematic isometric view of the inner chassis assembly of FIG. 11.
Figure 13:
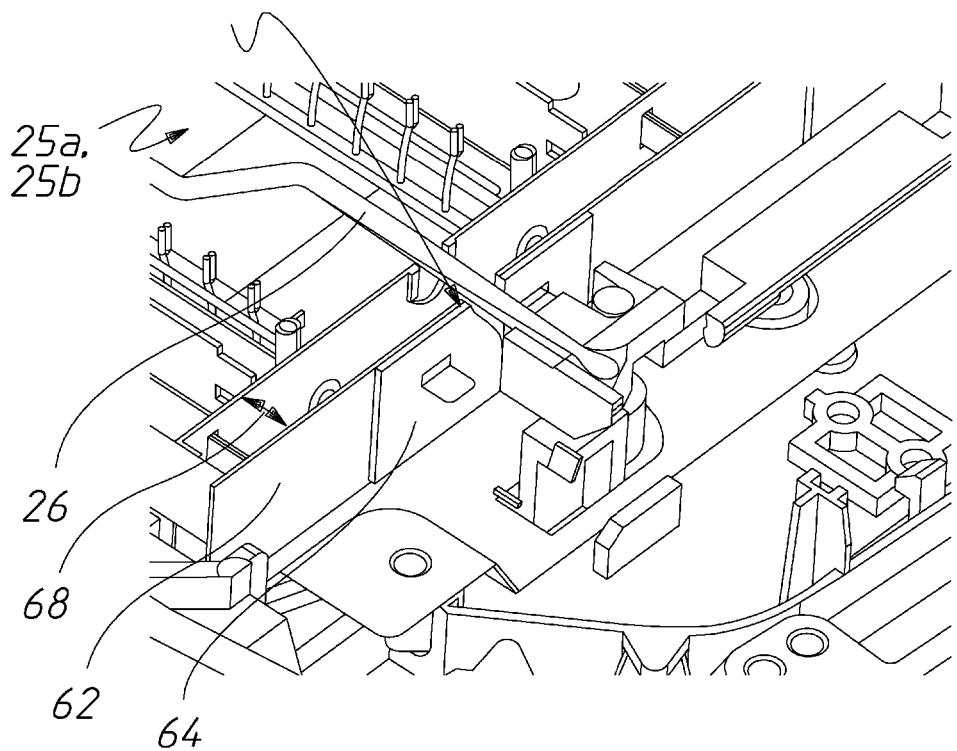
FIG. 13 is an enlarged schematic isometric view of a silicone curtain and an outer chassis reflector of the toaster of FIG. 1.

It will be understood that guide slots 66a, 66b in the inner chassis assembly 47 are required for the movement of the food carriages 26a, 26b between the first and second positions. As best shown in FIGS. 12 and 13, the toaster 10 includes an outer chassis reflector 62 upon which a silicone curtain 64 is attached. The silicone curtain 64 is adapted to provide a seal for airflow travelling through the guide slots 66a, 66b. The arrangement of the silicone curtain 64 may therefore reduce the amount of undesirable airflow through the toasting areas 25a, 25b. As best shown in FIG. 13, the outer chassis reflector 62 and the attached silicone curtain 64 are offset by a distance 68 away from the toasting area 25a, 25b so as to reduce the amount of heat being transferred to the silicone curtain 64.

Figure 12A:
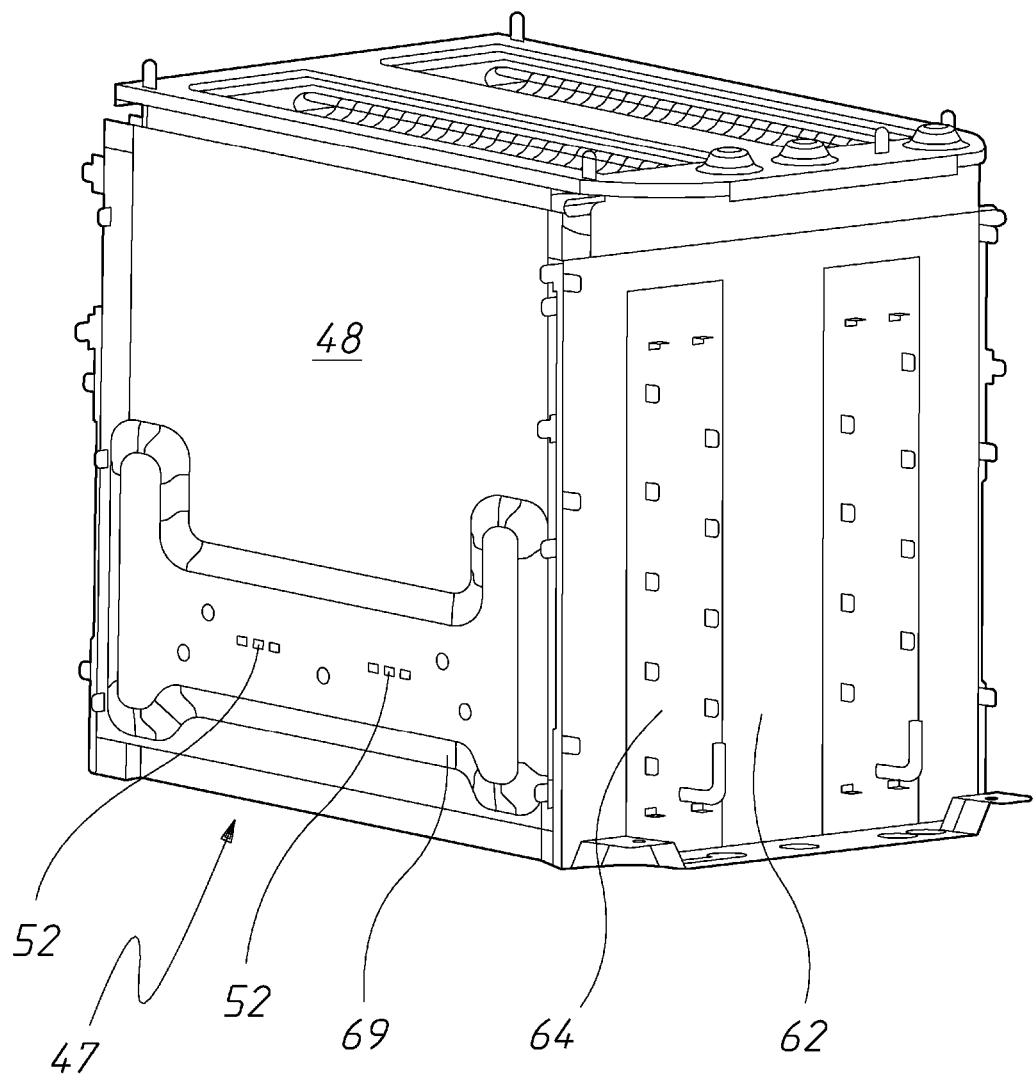
FIG. 12A is a further schematic isometric view of the inner chassis assembly of FIG. 11 in an alternative configuration.

In the alternative embodiment as shown in FIG. 12A, the inner wall 48 of the inner chassis assembly 47 includes a dogbone-shaped structure 69 upon which the sensor 52 may be mounted.

Figure 14:
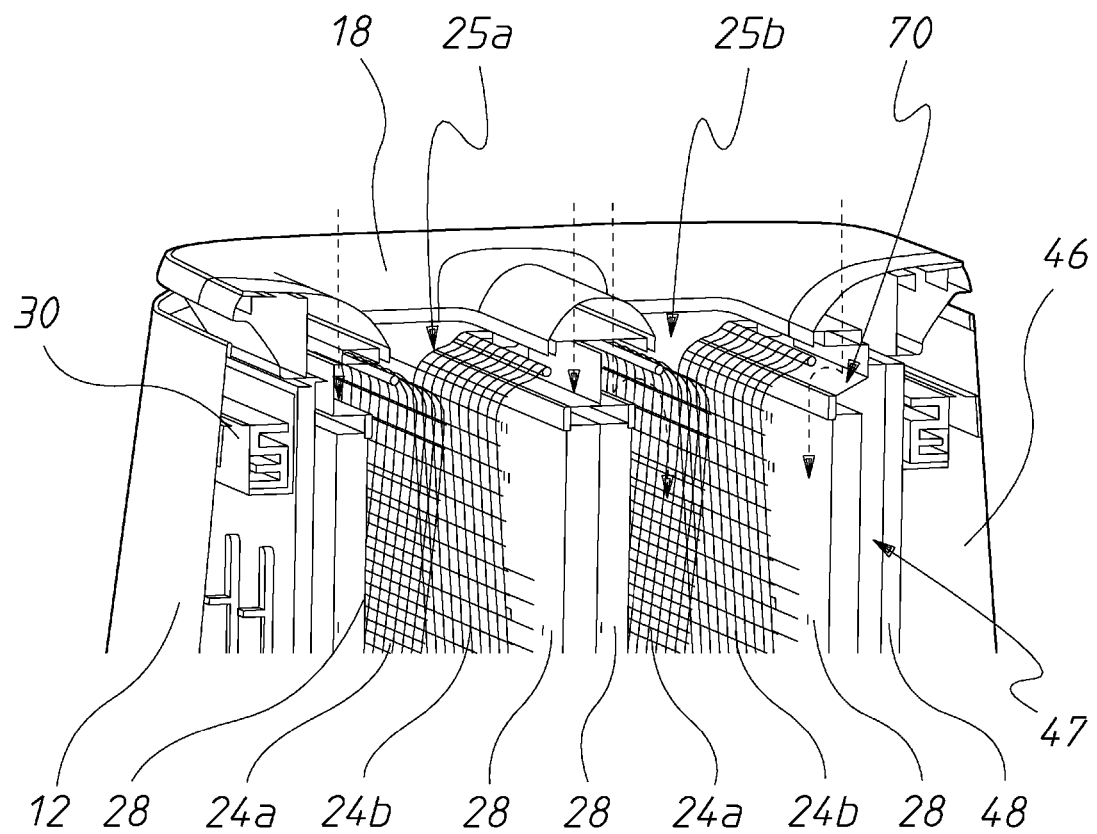
FIG. 14 is a further schematic sectioned isometric view of the toaster of FIG. 1.

As best shown in FIG. 14, the inner wall 48 of the inner chassis assembly 47 includes angled portions 70 which encourage crumbs to fall or roll onto the crumb tray 20. The arrangement of the angled portions 70 may at least reduce the number of horizontal surfaces in the inner chassis assembly 47 which may be susceptible to crumb collection. It will be appreciated that the angle of the angled portions 70 relative to the major surfaces of the inner wall 48 may at least provide a sufficient decline for the crumbs top fall or roll onto the crumb tray 20. In preferred forms, the angle of the angled portions 70 ranges from between about 1.0 to 89.0 degrees.

Figure 15:
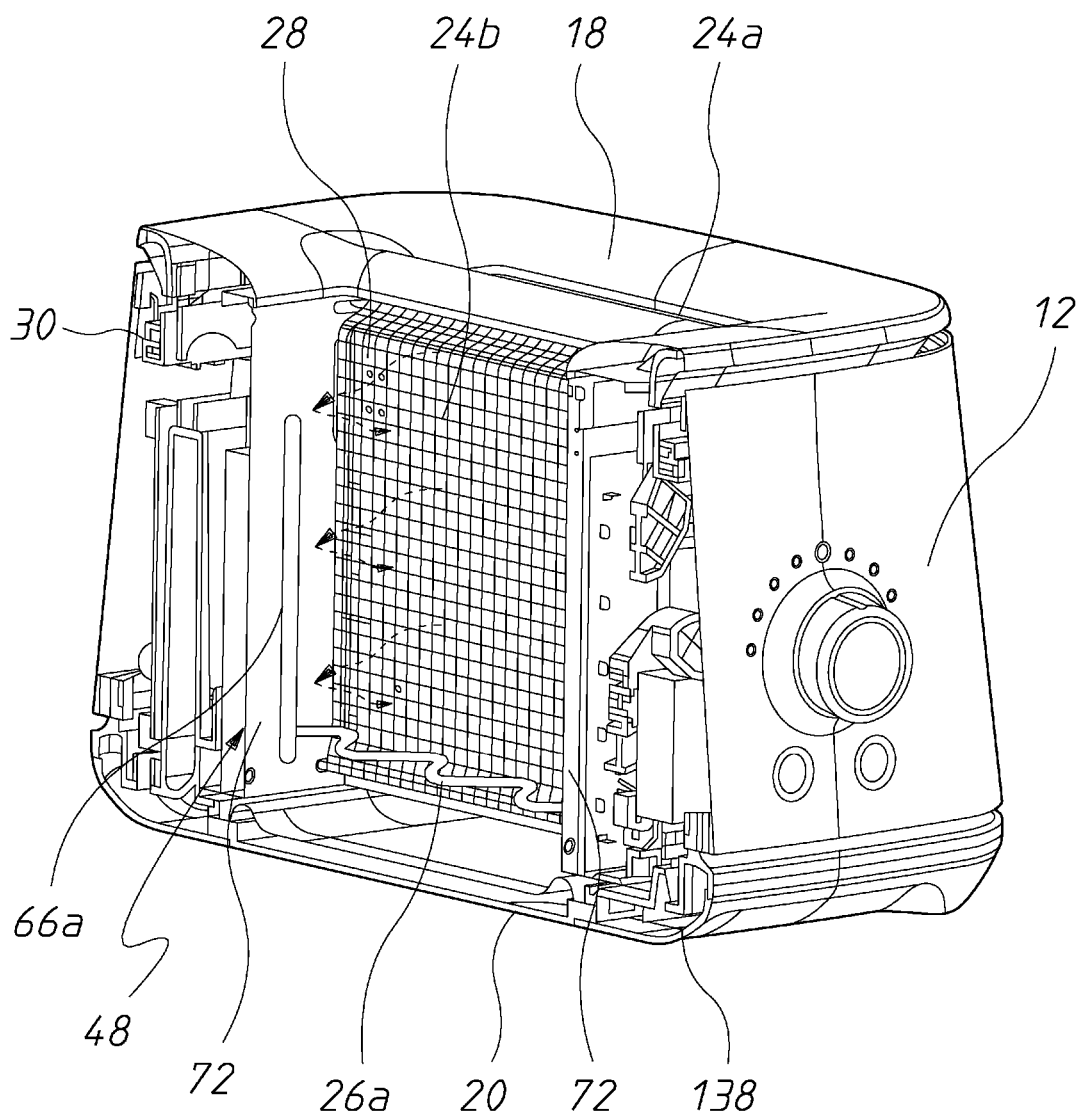
FIG. 15 is a further schematic sectioned isometric view of the toaster of FIG. 1.

It will be understood by a person skilled in the art that conventional toaster chassis end panels are typically made from steel (e.g. stainless steel, galvanised or aluminium coated), which is good at reflecting heat. The high heat that is reflected from the conventional toaster chassis end panels may result in uneven toasting of the foodstuff. If too much heat is reflected onto the foodstuff, the periphery of the foodstuff (which tends to be slightly dryer) will toast faster than the inner areas of the foodstuff, thereby resulting in uneven toasting. As best shown in FIG. 15, the inner wall 48 of the inner chassis assembly 47 includes a pair of end panels 72 adjacent to a respective end of the food guards 24a, 24b. The pair of end panels 72 secures the heating element brackets 56 in place within the inner chassis assembly 47, whereby the heating element brackets 56 are located at an upper portion of the end panels 72. The tabs 58 of the heating element brackets 56 engage corresponding apertures in the respective end panel 72. In preferred forms, each of the end panels 72 has a ceramic coating to reduce the amount of heat reflected onto the periphery of the foodstuff. An example of a suitable ceramic coating includes Cerasol, which has high temperature resistance, food grade rating and suitable colour range. The ceramic coating is preferably a dark (e.g. black) colour having a suitable emissivity range for even heat radiation. It would therefore be appreciated that the ceramic coating on each of the end panels 72 may at least provide an even heating environment (i.e. by distributing heat evenly) to at least maintain an appropriate level of heating performance of the toaster 10. In a preferred form, the non-stick and/or ceramic coating is a dark colour having an emissivity of less than about 0.75. The surface texture of the coating may also be tuned, depending on the shade of the dark coating, so as to ensure that the emissivity does not drop below 0.75.

Food Guards

Figure 17:
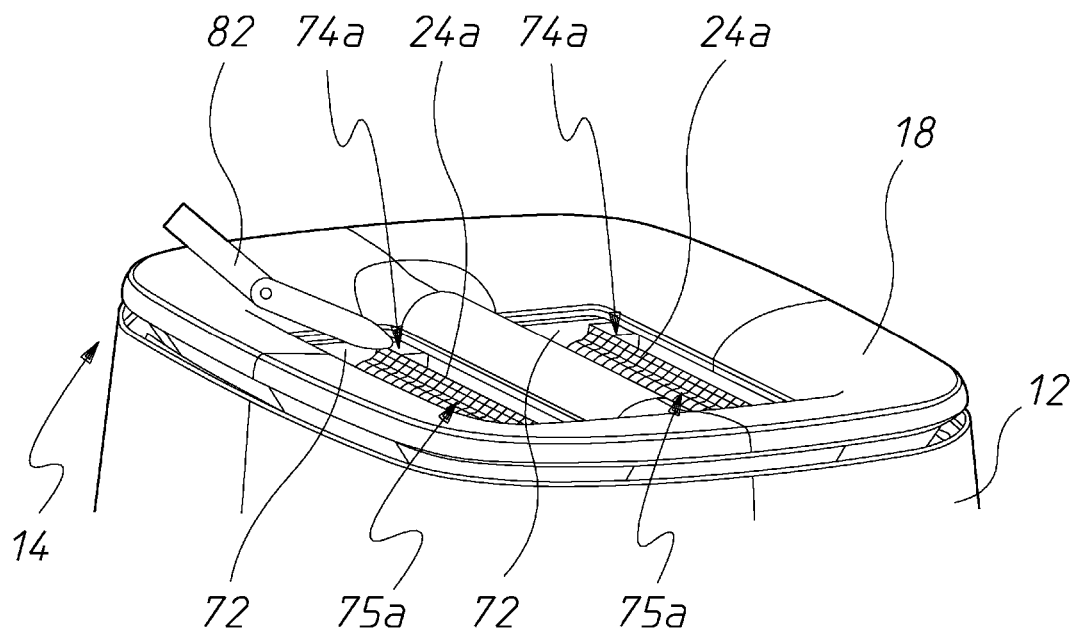
FIG. 17 is a further schematic isometric view of an upper portion of the toaster of FIG. 1.
Figure 16:
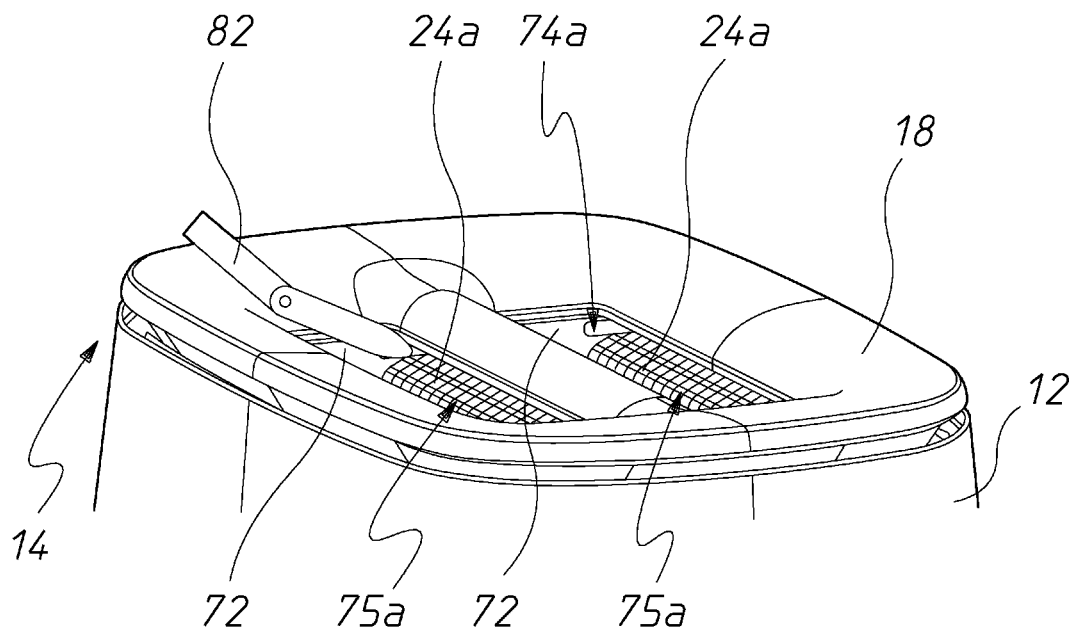
FIG. 16 is a schematic isometric view of an upper portion of the toaster of FIG. 1.
Figure 18:
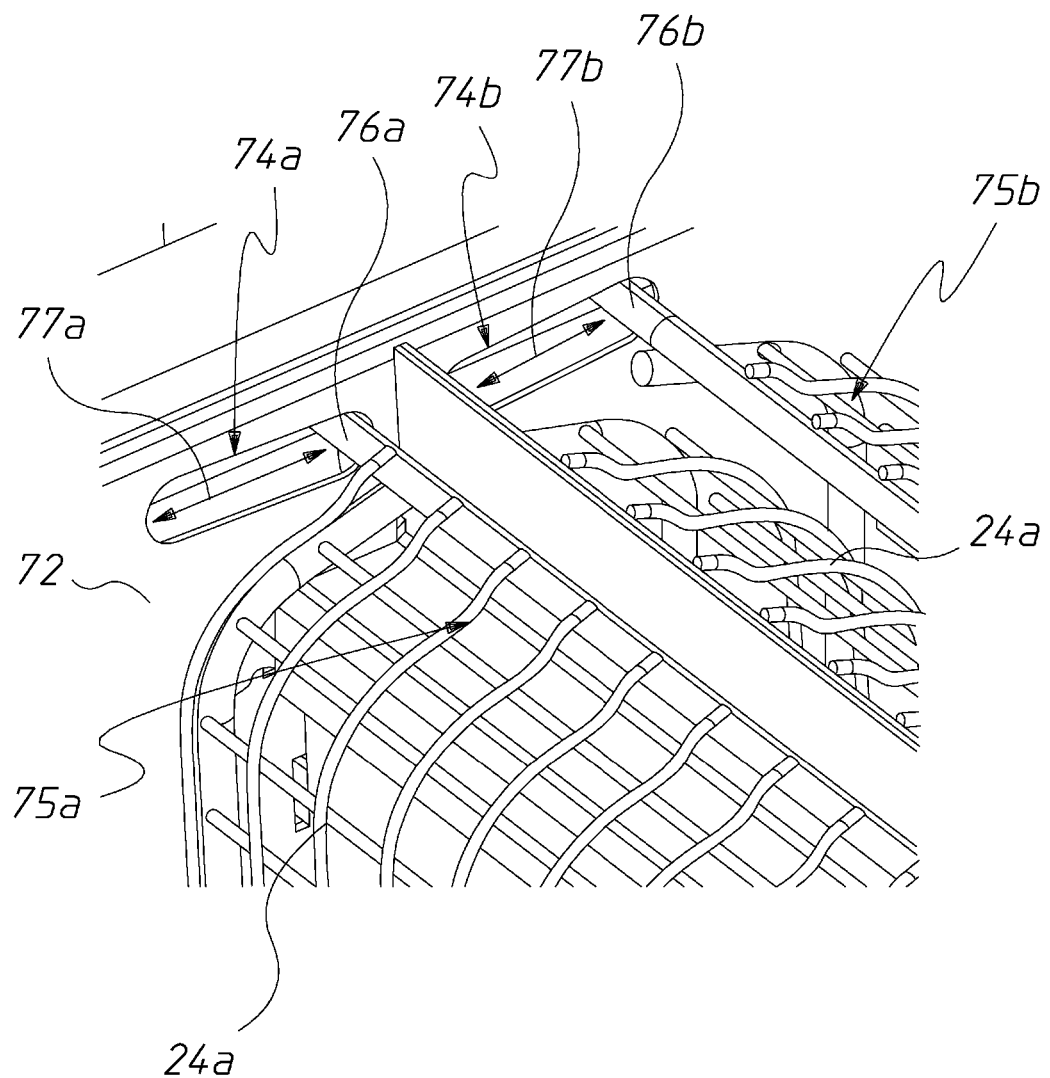
FIG. 18 is an enlarged schematic isometric view of the toaster of FIG. 1.
Figure 20:
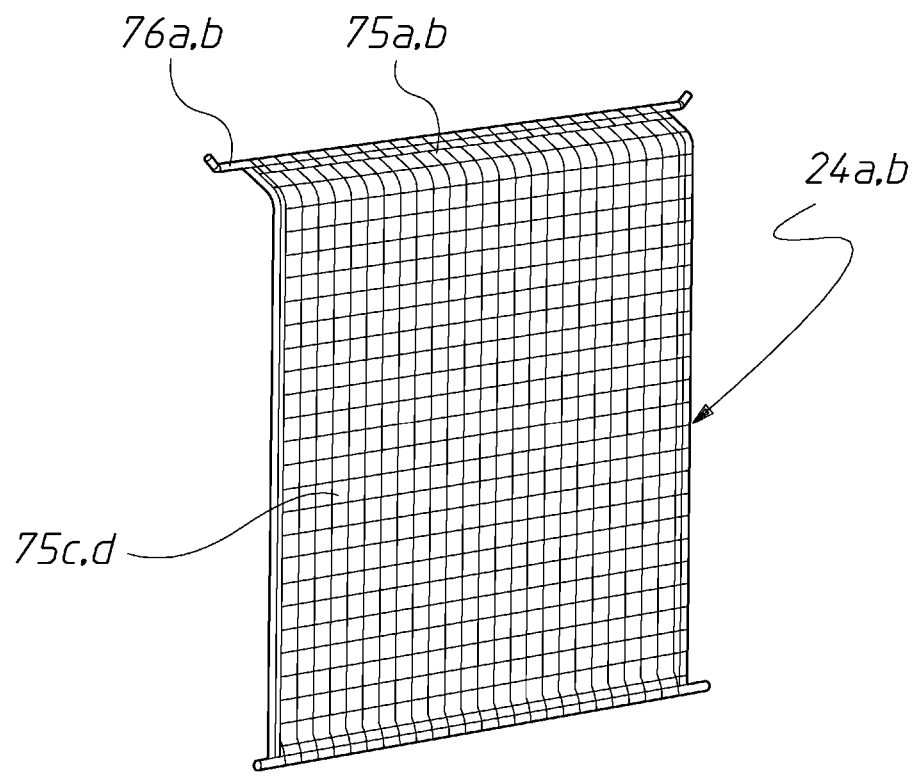
FIG. 20 is a schematic isometric view of a food guard of the toaster of FIG. 1.

FIG. 16 shows the pair of food guards in an open position, in which there is a sufficient gap between each of the opposing food guards 24a and 24b to receive the foodstuff. FIG. 17 shows the pair of food guards in a closed position, whereby each of the opposing food guards 24a and 24b are moved towards each other in an inward direction along the respective opposing guide slots 74a and 74b. As best shown in FIG. 18, the food guards 24a and 24b have respective upper portions 75a and 75b which are supported by respective upper guard pins 76a and 76b. Referring to FIGS. 19 and 20, for example, each food guard 24a and 24b also includes a respective upwardly-extending portion 75c and 75d, whereby the respective upper portions 75a and 75b each extend transversely therefrom so as to extend above the corresponding heating element assembly 28. In the depicted embodiment, the guide slots 74a and 74b are located in a horizontal orientation on each end panel 72, and are adapted to hold and guide the respective upper guard pins 76a and 76b. It is envisaged that the guide slots 74a and 74b may alternatively have a slightly curved/arched orientation to accommodate the movement of the food guards 24a and 24 in a lower pivoting mode, as described in further detail below. The movement of the upper guard pins 76a and 76b in the respective directions 77a and 77b facilitates the movement of the food guards 24a, 24b between the open and closed positions.

FIG. 19 shows the direction of movement 78a and 78b of the respective food guards 24a and 24b between the open and closed positions. FIG. 19 also shows that the upper portions 75a and 75b of the respective food guards 24a and 24b are arranged to curve over the top of the heating element assemblies 28 so as to limit access to the heating element assemblies 28 by a user's finger. It will be appreciated that in the closed position, a gap 80 between the upper portions 75a and 75b of the respective food guard 24a and 24b and the lower surface 40 of the top cap 18 is within a safe limit in accordance with safety compliance requirements. In the preferred form, the gap 80 is no more than about 3.5 mm in width. In the closed position, the food guards 24a and 24b are also horizontally overlapping with the top cap 18. Also shown in FIG. 19 is a test probe 82 (which simulates access to hazardous parts, e.g. to the heating element assemblies 28, by children of more than 36 months and less than 14 years old) which has a larger end diameter than the gap 80. It will be appreciated that the size of the gap 80 is maintained at least by the arrangement (e.g. length and direction) of the horizontally-oriented guide slots 74a and 74b which guide the movement of the respective upper guide pins 76a and 76b. It will also be appreciated that each of the food guards 24a and 24b are spaced apart from the heating element assemblies 28 to form a gap or clearance 81 to reduce the likelihood of a user's finger contacting the heating element assemblies 28.

Figure 21:
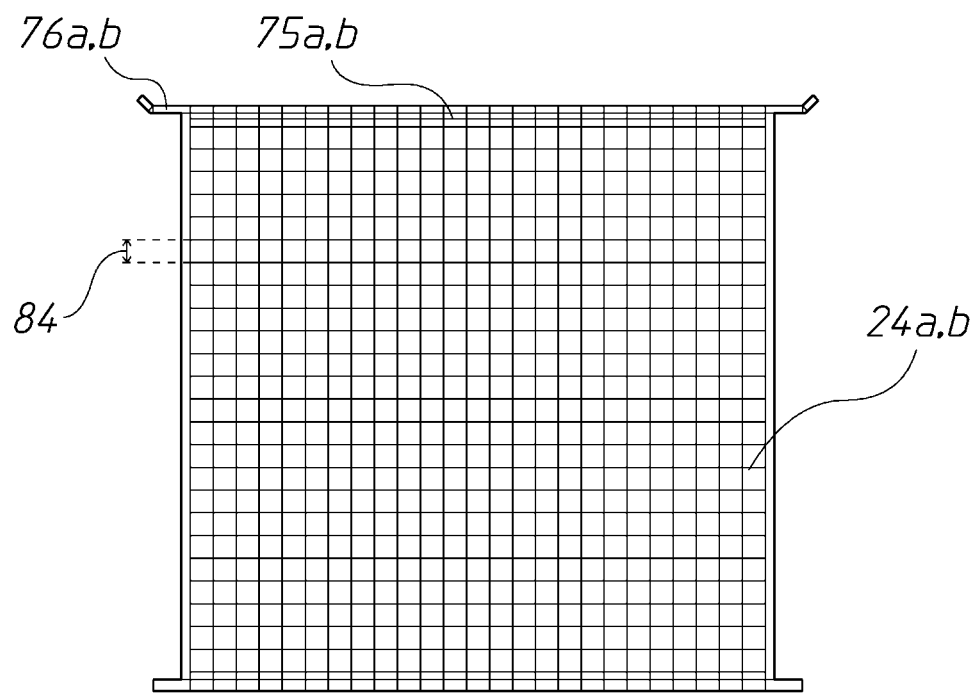
FIG. 21 is a schematic front view of a food guard of the toaster of FIG. 1.

FIGS. 20 and 21 show the food guard 24a, 24b in isolation. It will be appreciated that the food guard 24a, 24b is formed from a thin gauge wire mesh having a mesh gap 84 (e.g. the space between the horizontally-oriented wires or the vertically-oriented wires) of no more than about 12.1 mm to prevent access by a user's finger. In a preferred form, the space between the horizontally-oriented wires or the vertically-oriented wires is no more than about 5.3 mm. It will be understood that the end diameter of the test probe 82 described above is larger than the mesh gap 84. It will be appreciated that the thin gauge wires forming the mesh of the food guard 24a, 24b have sufficient stiffness to resist deformation when a force is applied to the food guard 24a, 24b, e.g. by a user's finger. It will also be appreciated that the use of thin gauge wire to form the food guards 24a, 24b may at least spread out the thermal mass of the food guards 24a, 24b and allow the heat to be distributed evenly to the foodstuff.

Figure 22:
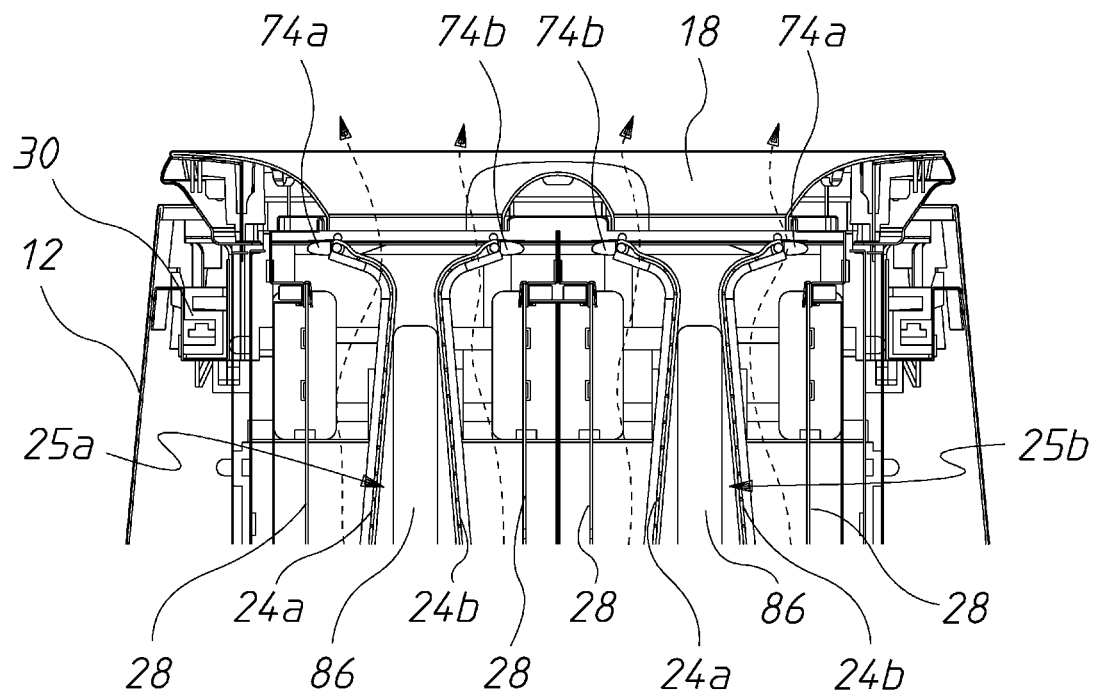
FIG. 22 is an enlarged schematic front view of the toaster of FIG. 1.
Figure 23:
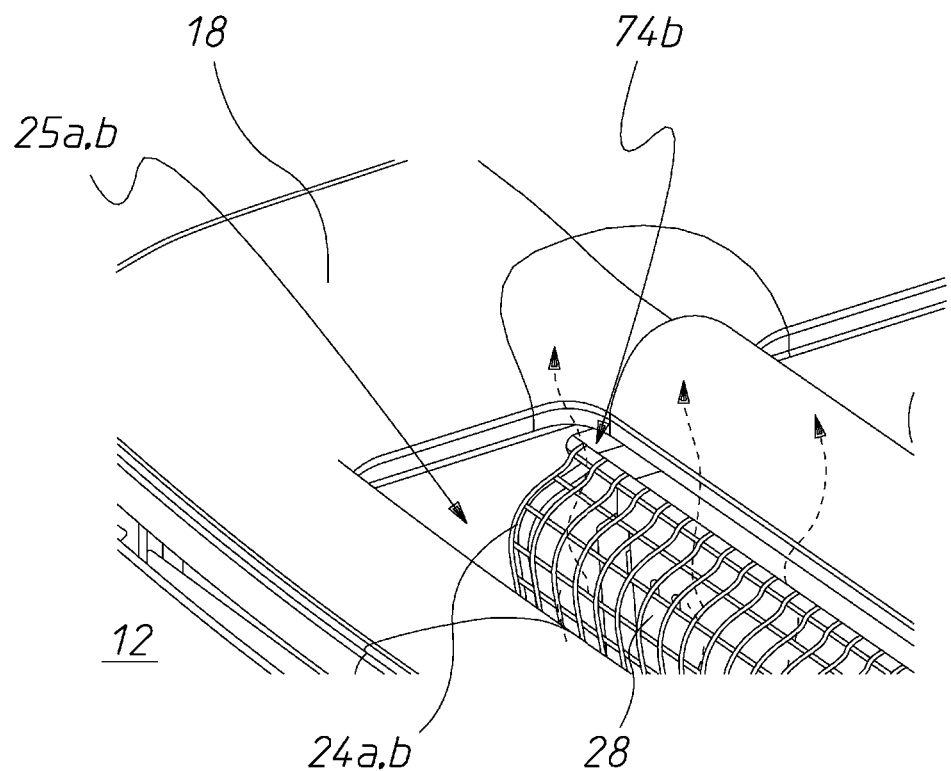
FIG. 23 is a further enlarged schematic isometric view of the toaster of FIG. 1.

As best shown in FIGS. 22 and 23, it will be understood that the opposing guide slots 74a and 74b are located above the respective toasting areas 25a and 25b so as to limit the amount of airflow traveling across the foodstuff 86. As discussed above, airflow through the toasting areas 24a and 25b is undesirable as it impacts on toasting performance by varying the heat transfer to the foodstuff 86, which may result in uneven or insufficient toasting.

Figure 24:
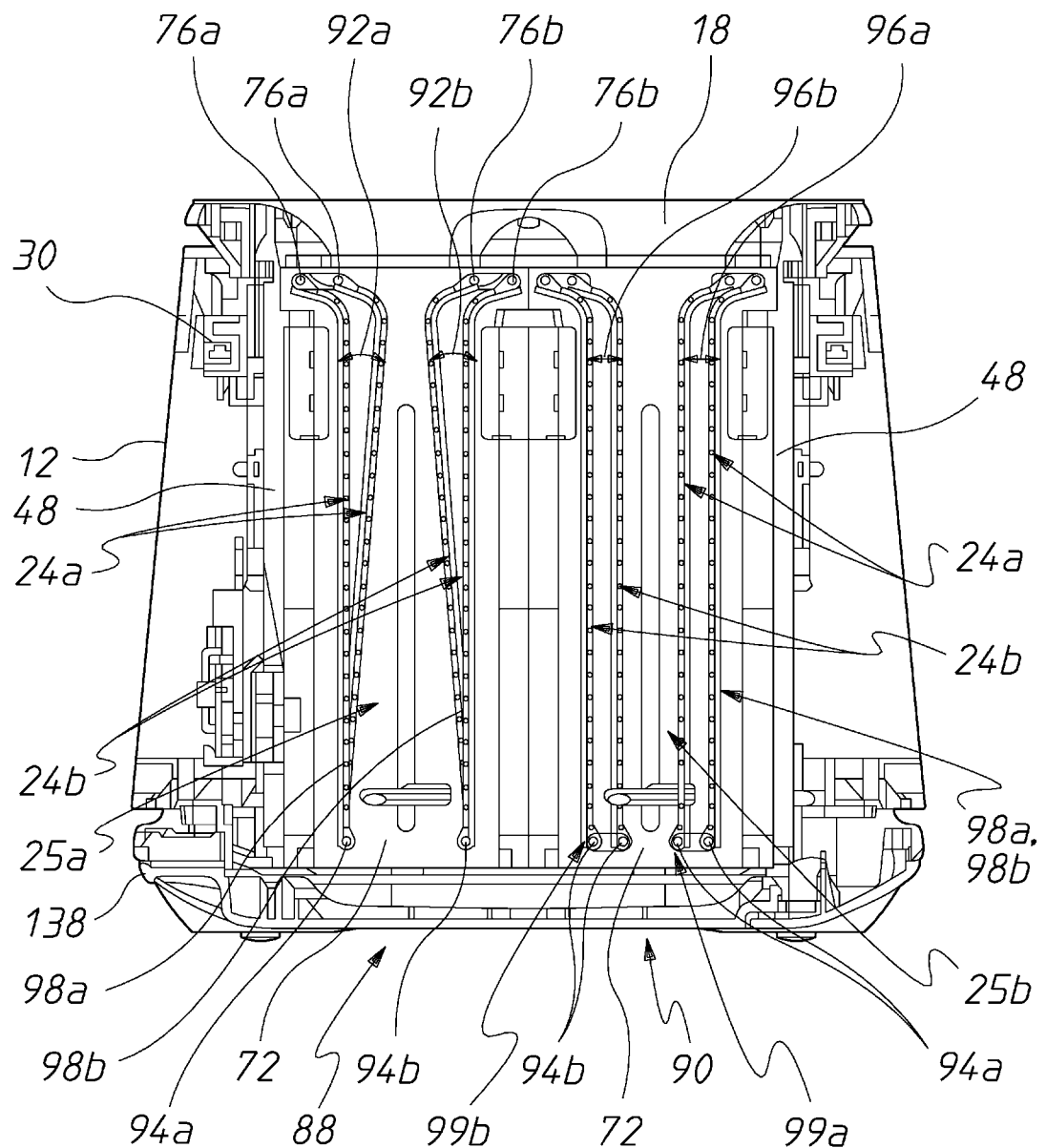
FIG. 24 is a schematic side view of the toaster of FIG. 1.

FIG. 24 shows an embodiment in which the food guards 24*a* and 24*b* are configured to move in one of two modes: a lower pivoting mode 88 or a horizontal displacement mode 90. The movement of the food guards 24*a* and 24*b* is caused by the manual or automatic actuation of the food carriages 26*a*, 26*b* between the first and second positions. The mechanism which allows the movement of the food guards 24*a*, 24*b* will be explained in further detail below (see 'Food Guard Springs and Earth Spring' section). In both modes 88 and 90, the food guards 24*a* and 24*b* are adapted to centre the foodstuff 86 in a vertical orientation in the toasting area 25*a*, 25*b*. In the lower pivoting mode 88, the upper portions 75*a* and 75*b* of the respective opposing food guards 24*a* and 24*b* move towards and away from each other in respective pivoting directions 92*a* and 92*b*, whereby the pivot point of the food guards 24*a* and 24*b* is located at the respective lower guard pins 94*a* and 94*b*. Accordingly, it will be understood that in this lower pivoting mode 88, the food guards 24*a* and 24*b* are pivoted between the open and closed positions, whereby in the closed position, the food guards 24*a* and 24*b* contact an upper region of the foodstuff 86 such that the foodstuff 86 is held and/or aligned at the centre of the toasting area 25*a*. In the horizontal displacement mode 90, the food guards 24*a* and 24*b* move towards and away from each other in respective horizontal directions 96*a* and 96*b*. Accordingly, in this horizontal displacement mode 90, the food guards 24*a* and 24*b* are horizontally displaced between the open and closed positions, whereby in the closed position, the vertical face of each food guard 24*a* and 24*b* is in contact with the foodstuff 86, and the foodstuff 86 is centred in a vertical orientation in the toasting area 25*b*. In this horizontal displacement mode 90, the vertical face of each food guard 24*a* and 24*b* is also substantially parallel with the vertical face of the inner wall 48. In this horizontal displacement mode 90, the food guards 24*a* and 24*b* have respective lower portions 98*a* and 98*b* which are supported by the respective lower guard pins 94*a* and 94*b*. In this horizontal displacement mode 90, the lower guard pins 94*a* and 94*b* are located in respective horizontal guide slots 99*a* and 99*b* in each end panel 72.

Figure 25:
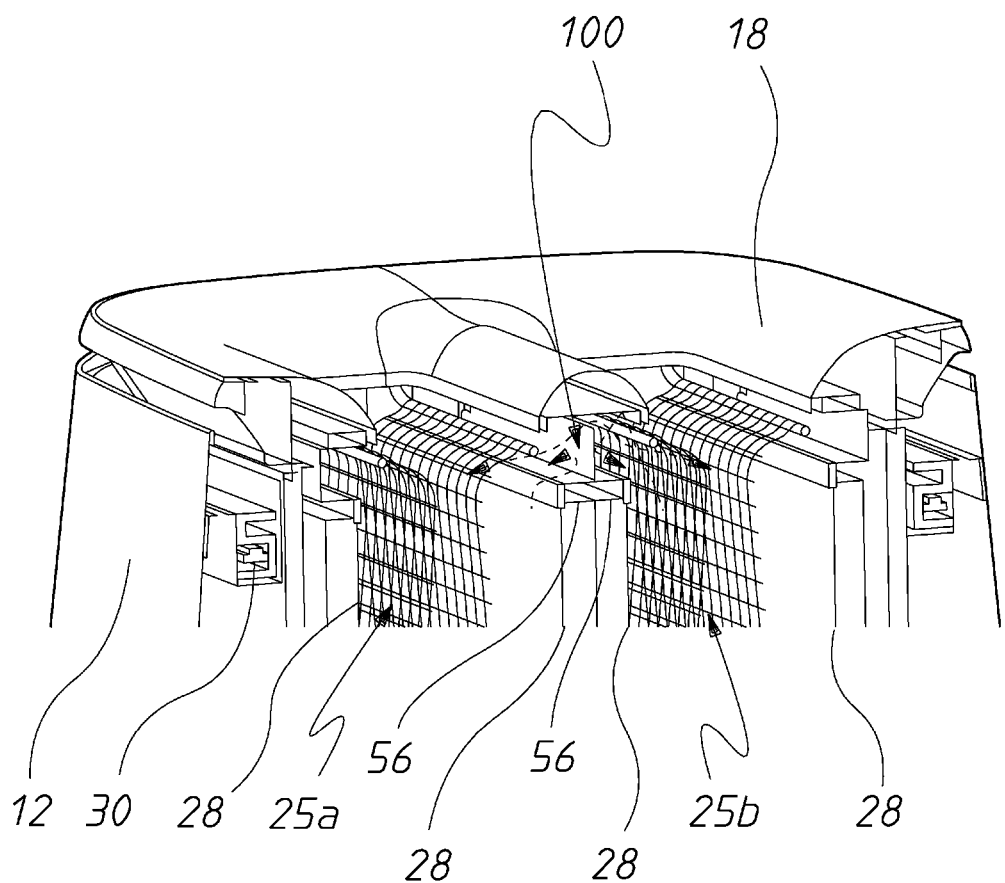
FIG. 25 is a further enlarged schematic isometric view of the toaster of FIG. 1.

As best shown in FIG. 25, the two element card brackets 56 at the centre of the inner chassis assembly 47 form a dividing portion 100 between the toasting areas 25*a* and 25*b*. The dividing portion 100 therefore acts as a barrier to reduce or prevent airflow traveling between the toasting areas 25*a* and 25*b*, thereby limiting the amount of airflow through the toasting areas 25*a* and 25*b*. In embodiments where only one of the toasting areas 25*a* or 25*b* is in use (e.g. to toast a single slice of bread at one time), the dividing portion 100 may at least maintain an appropriate level of toasting by reducing or preventing airflow traveling across the foodstuff 86 which would otherwise result in uneven toasting, under-toasting or over-toasting. Referring to FIG. 19B, the curved portions 38 of the upper surface 36 of the top cap 18 are formed as compound curves with boundaries defined by a height H1 in the range of between 5 mm to 15 mm and a width W1 in the range of between 7 mm to 18 mm. In a preferred form, the height H1 is about 9.9 mm and the width W1 is about 12.9 mm so as to define a compound curve having a radius of curvature R1 of between about 20 mm to 35 mm. In a preferred form, the height H2 from the uppermost region of the curved portion 38 to the upper surface 36 of the top cap is about 5 mm.

Figure 26:
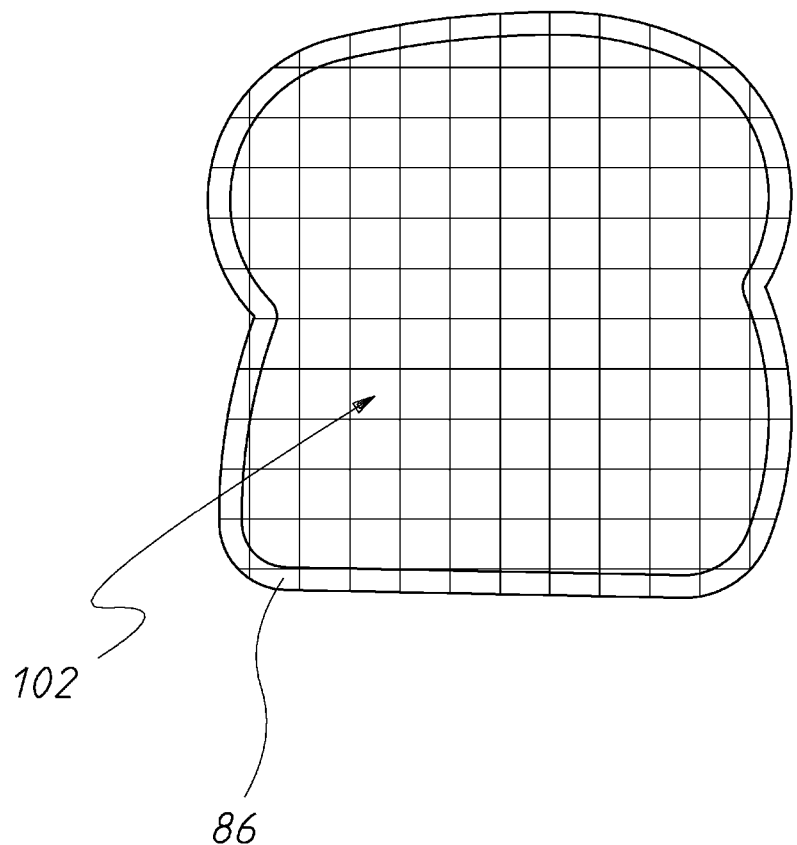
FIG. 26 is a schematic front view of a foodstuff.

In preferred forms, the food guards 24*a* and 24*b* have a ceramic coating to reduce the amount of heat reflected onto the foodstuff 86 and to reduce the amount of shadowing or grill marks 102 on the foodstuff 86 (e.g. as shown in FIG. 26). An example of a suitable ceramic coating includes Cerasol, which has high temperature resistance, food grade rating and suitable colour range. It will be understood that the ceramic coating on the food guards 24*a* and 24*b* may also function to spread the amount of heat reflected onto the foodstuff 86 to provide even toasting. The ceramic coating is preferably a dark (e.g. black) colour having a suitable emissivity range for even heat radiation. It would therefore be appreciated that the ceramic coating on food guards 24*a* and 24*b* may at least provide an even heating environment (i.e. by distributing heat evenly) to at least maintain an appropriate level of heating performance of the toaster 10. In a preferred form, the non-stick and/or ceramic coating is a dark colour having an emissivity of less than about 0.75. The surface texture of the coating may also be tuned, depending on the shade of the dark coating, so as to ensure that the emissivity does not drop below 0.75.

Food Carriage

FIGS. 27 to 30 shows the interaction between the inner chassis assembly 47 and a food carriage assembly 106 of the toaster 10. The inner chassis assembly 47 is located in the interior 22 of the housing 12 and includes the inner walls 48 having the end panels 72 as described above. The vertically-oriented guide slots 66*a*, 66*b* are located on the end panels 72. The food carriage assembly 106 includes a pair of the food carriages 26*a* and 26*b* for supporting the foodstuff 86 in the respective toasting areas 25*a* and 25*b*. The food carriage assembly 106 further includes a food carriage bracket 107 to hold the food carriages 26*a* and 26*b* in place.

Figure 28:
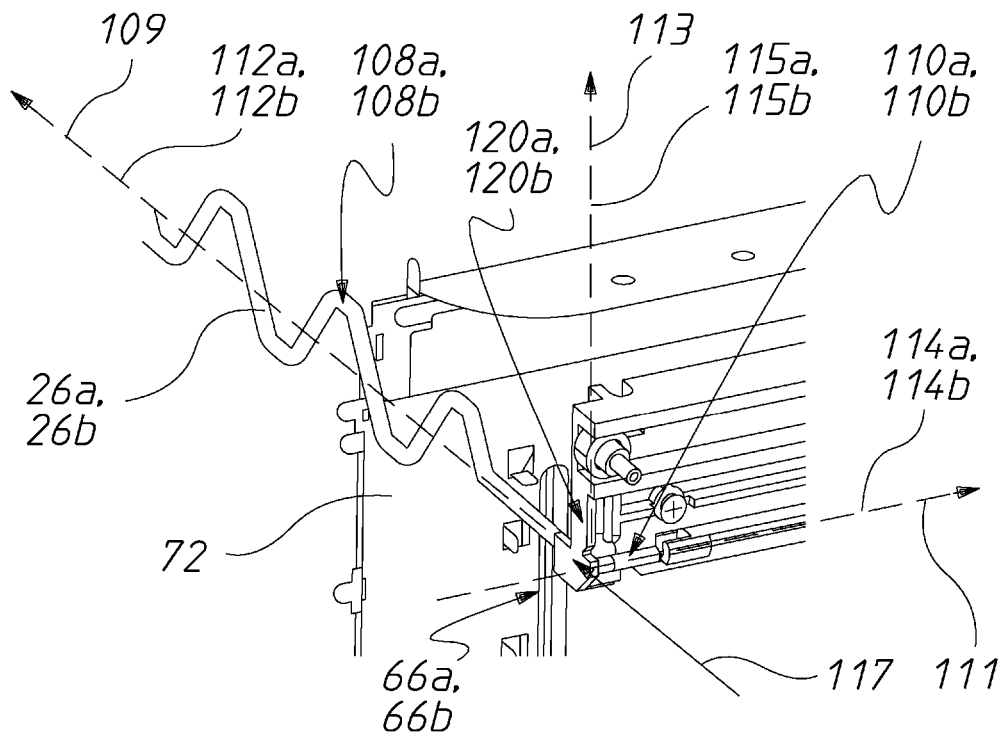
FIG. 28 is an enlarged schematic isometric view of a food carriage assembly of the toaster of FIG. 1.

As best shown in FIG. 28, the food carriages 26*a*, 26*b* include a respective support portion 108*a*, 108*b* and a respective arm portion 110*a*,110*b*. Each support portion 108*a*, 108*b* has a generally zig-zag shaped profile extending in a first direction 109 defined by a first axis 112*a*, 112*b* and the respective arm portion 110*a*, 110*b* has a generally linear profile extending in a second direction 111 along a second axis 114*a*, 114*b* which is perpendicular to the respective first axis 112*a*, 112*b*. It will be understood that in the depicted embodiment, the zig-zag profile of each support portion 108*a*, 108*b* extends in a third direction 113 along a third axis 115*a*, 115*b*.

Figure 27:
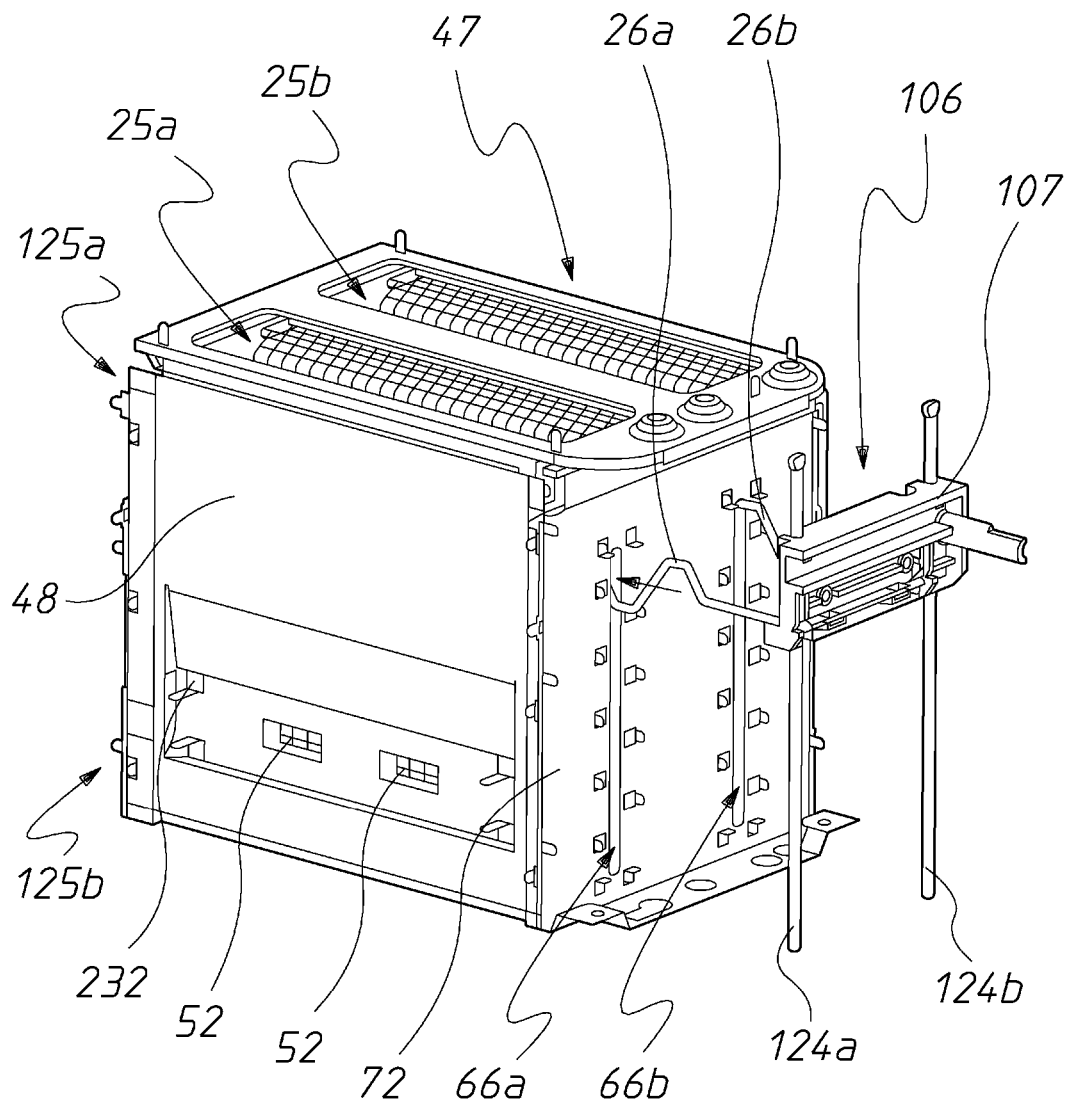
FIG. 27 is a schematic isometric view of an inner chassis assembly of the toaster of FIG. 1.
Figure 29:
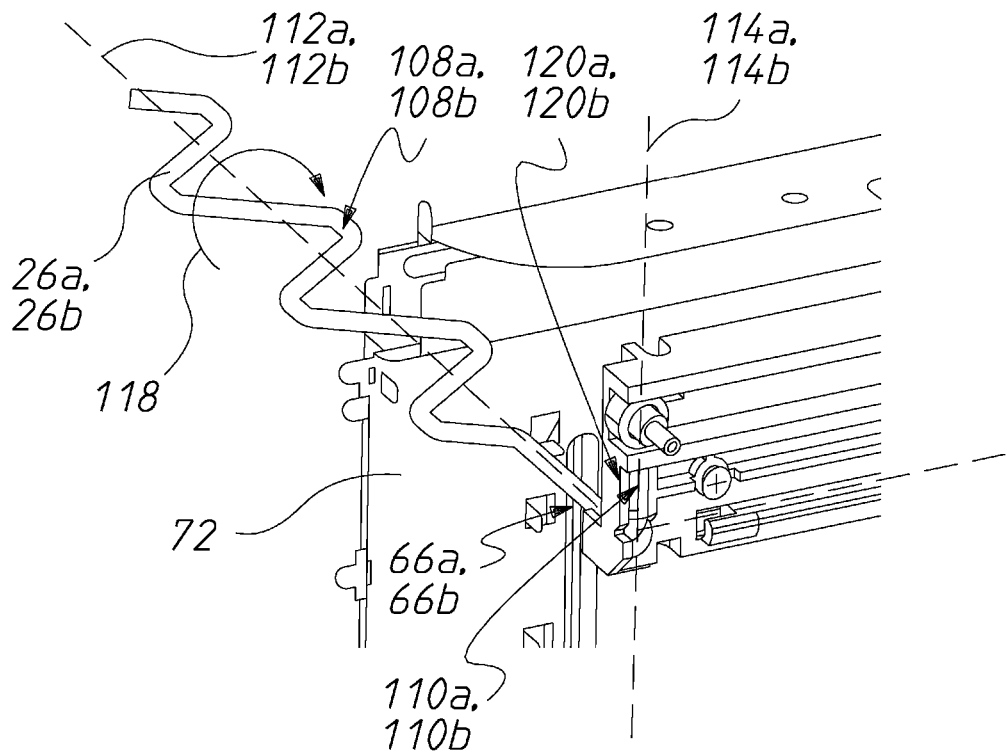
FIG. 29 is a further enlarged schematic isometric view of the food carriage assembly of FIG. 28.

In FIGS. 27 and 28, the food carriages 26*a*, 26*b* are in their assembly orientations, whereby the support portions 108*a*, 108*b* are oriented in a vertical direction to facilitate the insertion of the food carriages 26*a*, 26*b* into their respective vertically-oriented guide slots 66*a*, 66*b* on the end panel 72 during assembly. The food carriages 26*a*, 26*b* are inserted into the respective guide slots 66*a*, 66*b* along a direction 117. In this assembly orientation, the arm portions 110*a*, 110*b* are conversely oriented in a horizontal direction and disengaged from the respective retention members 120*a*, 120*b* on the food carriage bracket 107. In FIG. 29, the food carriages 26*a*, 26*b* are in their operational orientations, whereby the food carriages 26*a*, 26*b* are rotated from their assembly orientations in a clockwise direction 118 (or an opposing counter-clockwise direction, not shown) about the first axis 112*a*, 112*b* such that the support portions 108*a*, 108*b* are oriented in a horizontal direction. The food carriages 26*a*, 26*b* are rotated in the direction 118 until the arm portions 110*a*, 110*b* are oriented in a vertical direction so as to align with the respective vertically-oriented retention members 120*a*, 120*b* on the plate 107. The food carriages 26*a*, 26*b* are then moved further along the direction 117 towards the end panel 72 until the respective arm portions 110*a*, 110*b* engage the respective retention members 120*a*, 120*b*. The food carriages 26*a*, 26*b* are secured to the food carriage bracket 107 in the operational orientation following engagement of the arm portions 110*a*, 110*b* with the respective retention members 120*a*, 120*b*. It will be appreciated that the arrangement of the food carriage assembly 106, in particular the rotation of the food carriages 26*a* and 26*b* between the assembly and operation orientations, may at least reduce or avoid the need to have additional apertures in the internal chassis assembly 47 for assembly of toaster 10, thereby reducing or avoiding airflow through the toasting areas 25*a*, 25*b*.

In other embodiments (not shown), it is envisaged that the generally linear profile of the arm portions 110*a*, 110*b* of the respective food carriages 26*a*, 26*b* may alternatively extend in the direction 113 along the third axis 115*a*, 115*b*. Accordingly, in this arrangement, the zig-zag profile of the support portions 108*a*, 108*b* and the linear profile of the respective arm portions 111*a*, 110*b* are parallel and on the same plane. In this arrangement, the retention members 120*a*, 120*b* are horizontally-oriented to align with the respective arm portions 110*a*, 110*b*. Alternatively, the arm portions 110*a*, 110*b* may have a larger diameter than the diameter of the respective support portions 108*a*, 108*b* to secure the food carriage 26*a*, 26*b* to the food carriage bracket 107 (e.g. by way of a tolerance clip or the like disposed on the food carriage bracket 107). It is also envisaged that the generally linear profile of the arm portions 110*a*, 110*b* may alternatively extend in any direction other than the second or third directions 111 or 113, and the respective retention members 120*a*, 120*b* are reconfigured accordingly to facilitate the engagement of the arm portions 110*a*, 1110*b*.

Figure 30:
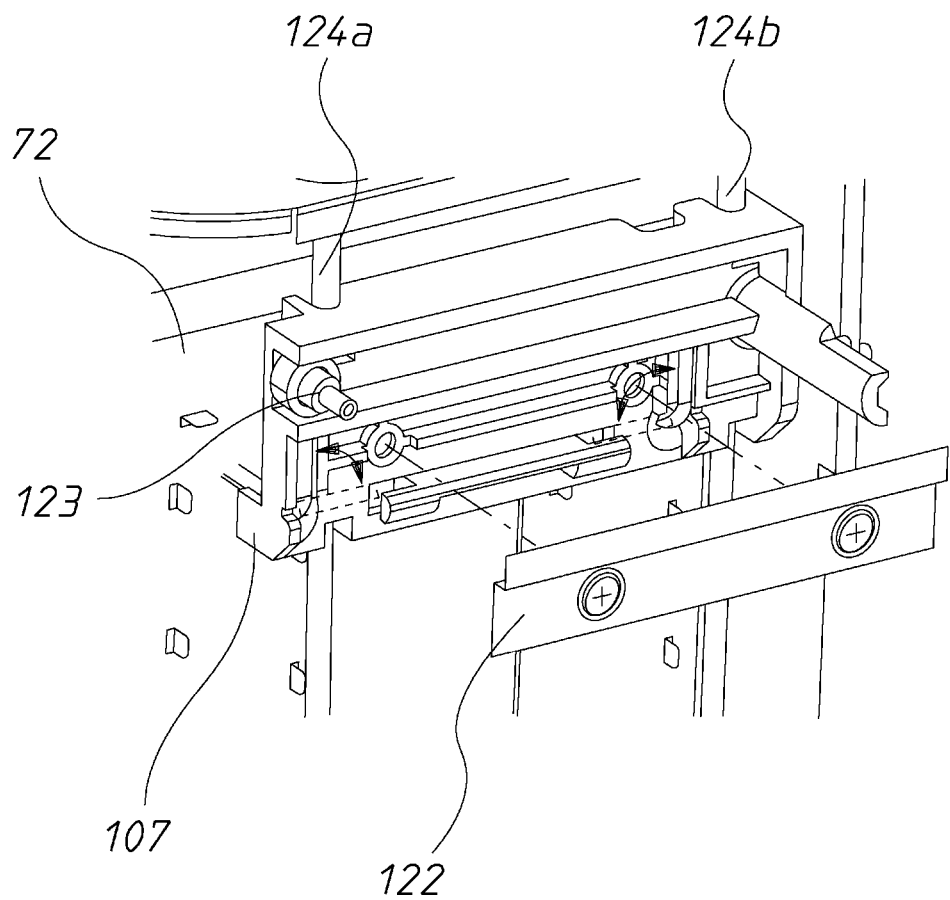
FIG. 30 is a further enlarged schematic isometric view of the food carriage assembly of FIG. 28.

FIG. 30 shows the alignment and attachment of a plate 122 to the food carriage bracket 107 following assembly of the food carriages 26*a* and 26*b*. It will be understood that the plate 122 further secures the food carriages 26*a* and 26*b* to the food carriage bracket 107. A motor arm retention feature 123 on the food carriage bracket 107 is adapted to receive an arm of the associated motor that drives the movement of the food carriages 26*a* and 26*b*.

Returning to FIG. 27, it will be understood that the food carriage bracket 107 is moveable along guide rails 124*a* and 124*b* in the vertical direction so as to move the food carriages 26*a*, 26*b* from the first position adjacent the upper portion 14 of the housing 12 (corresponding to an upper portion 125*a* of the inner chassis assembly 47) to receive the foodstuff, and a second position adjacent the lower portion 16 of the housing 12 (corresponding to a lower portion 125*b* of the inner chassis assembly 47) to toast the foodstuff. As discussed above, the movement of the food carriage bracket 107 (and the associated food carriages 26*a*, 26*b*) between the first and second positions may be manually actuated (e.g. by a user pushing down on a lever), or automatically actuated (e.g. by detecting the presence of the foodstuff and/or by actuating an electronic/electrical button, thus enabling an associated motor-driven lift function).

Food Guard Springs and Earth Spring

Figure 31:
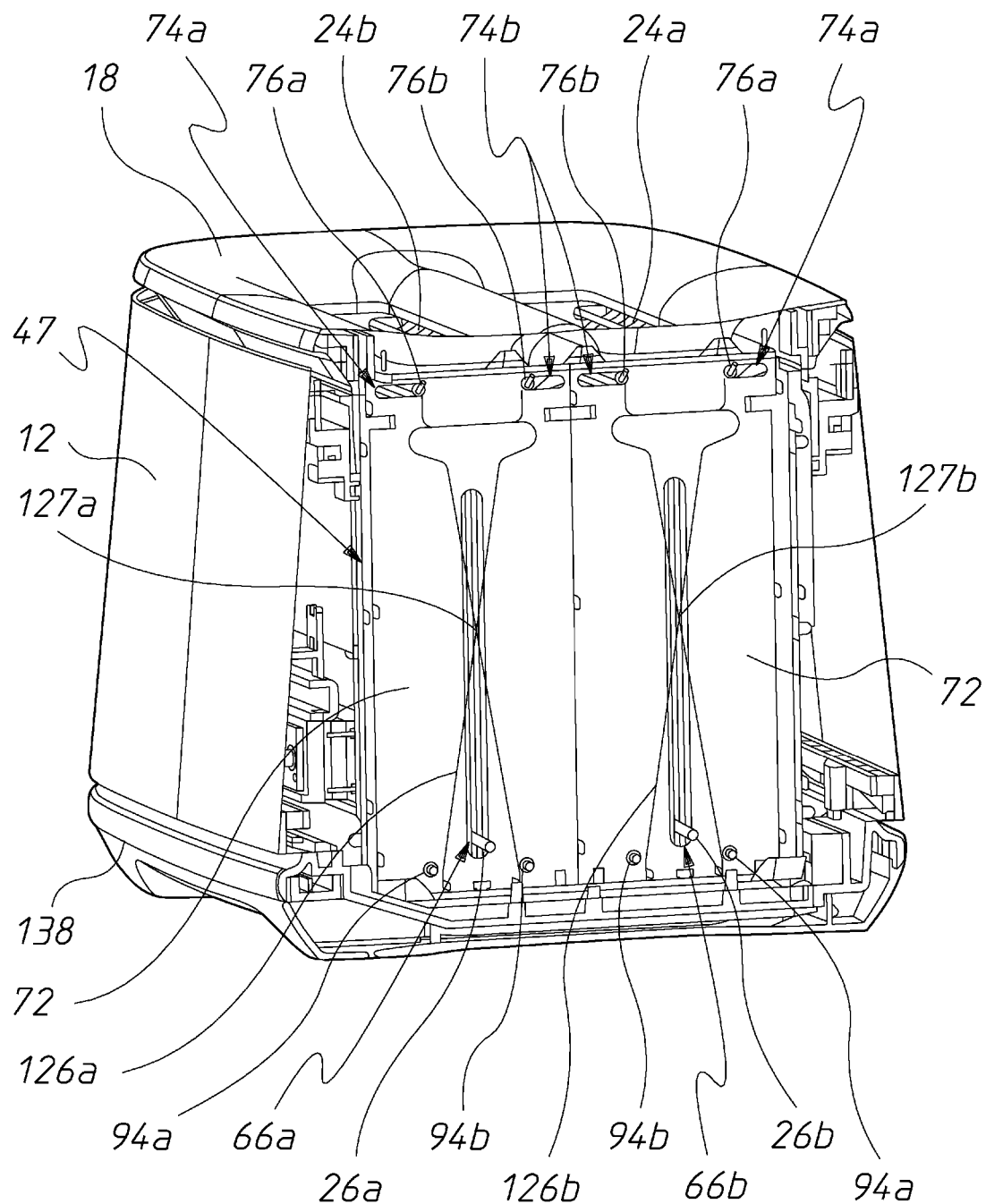
FIG. 31 is a further schematic sectioned isometric view of the toaster of FIG. 1.
Figure 32:
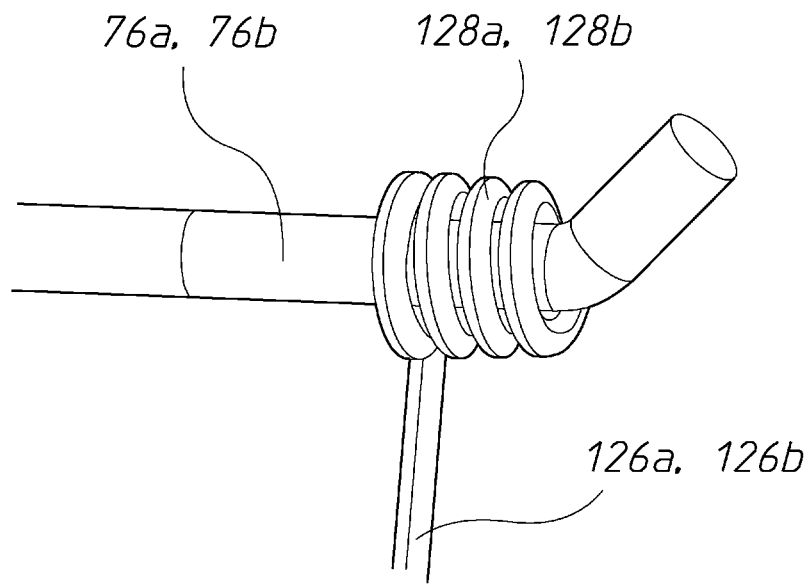
FIG. 32 is an enlarged schematic isometric view of a food guard spring of the toaster of FIG. 1.
Figure 33:
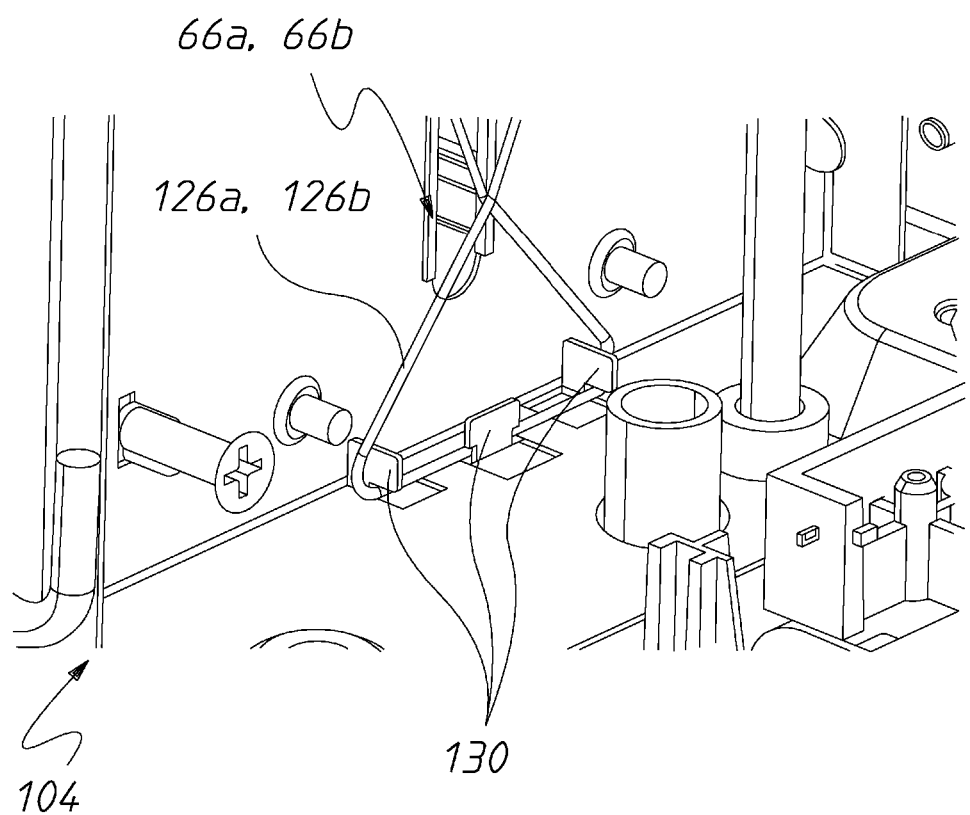
FIG. 33 is a further enlarged schematic isometric view of the food guard spring of FIG. 32.

As best shown in FIGS. 31 to 33, the toaster 10 includes a pair of food guard springs 126*a* and 126*b* coupled to the upper guard pins 76*a*, 76*b* supporting the food guards 24*a*, 24*b*. The food guard springs 126*a*, 126*b* include a respective conical loop 128*a*, 128*b* for coupling to the respective upper guard pins 76*a*, 76*b*. The food guard springs 126*a*, 126*b* are also coupled to the inner chassis assembly 47 by way of retention tabs 130. The food guards 24*a*, 24*b* are thus provided with a secured earth connection through the connection from the food guards 24*a*, 24*b* to the upper guard pins 76*a*, 76*b* to the food guard springs 126*a*, 126*b*, and through to the inner chassis assembly 47.

It will be understood that the food guard springs 126*a*, 126*b* facilitate the movement of the food guards 24*a*, 24*b* between the open and closed positions. The food guard springs 126*a*, 126*b* are biased in the open positions (in which there is a sufficient gap or space between each of the opposing food guards 24*a* and 24*b* to receive the foodstuff). Upon manual or automatic actuation of the food carriages 26*a*, 26*b* from the first position (adjacent to the upper portion 14 of the housing 12) and the second position (adjacent to the lower portion 16 of the housing 12), the food carriages 26*a*, 26*b* contact the respective intersecting portions 127*a*, 127*b* of the respective food guard springs 126*a*, 126*b* to force the intersecting portions 127*a*, 127*b* downwards, thereby drawing the upper guard pins 76*a*, 76*b* towards each other along the respective guide slots 74*a*, 74*b*. This causes a corresponding movement of the food guards 24*a*, 24*b* towards each other into the closed position, and the toasting operation is commenced. Once the toasting operation is finished, the food guard springs 126*a*, 126*b* return to their open positions so as to allow the foodstuff to be removed.

Crumb Tray

Figure 34:
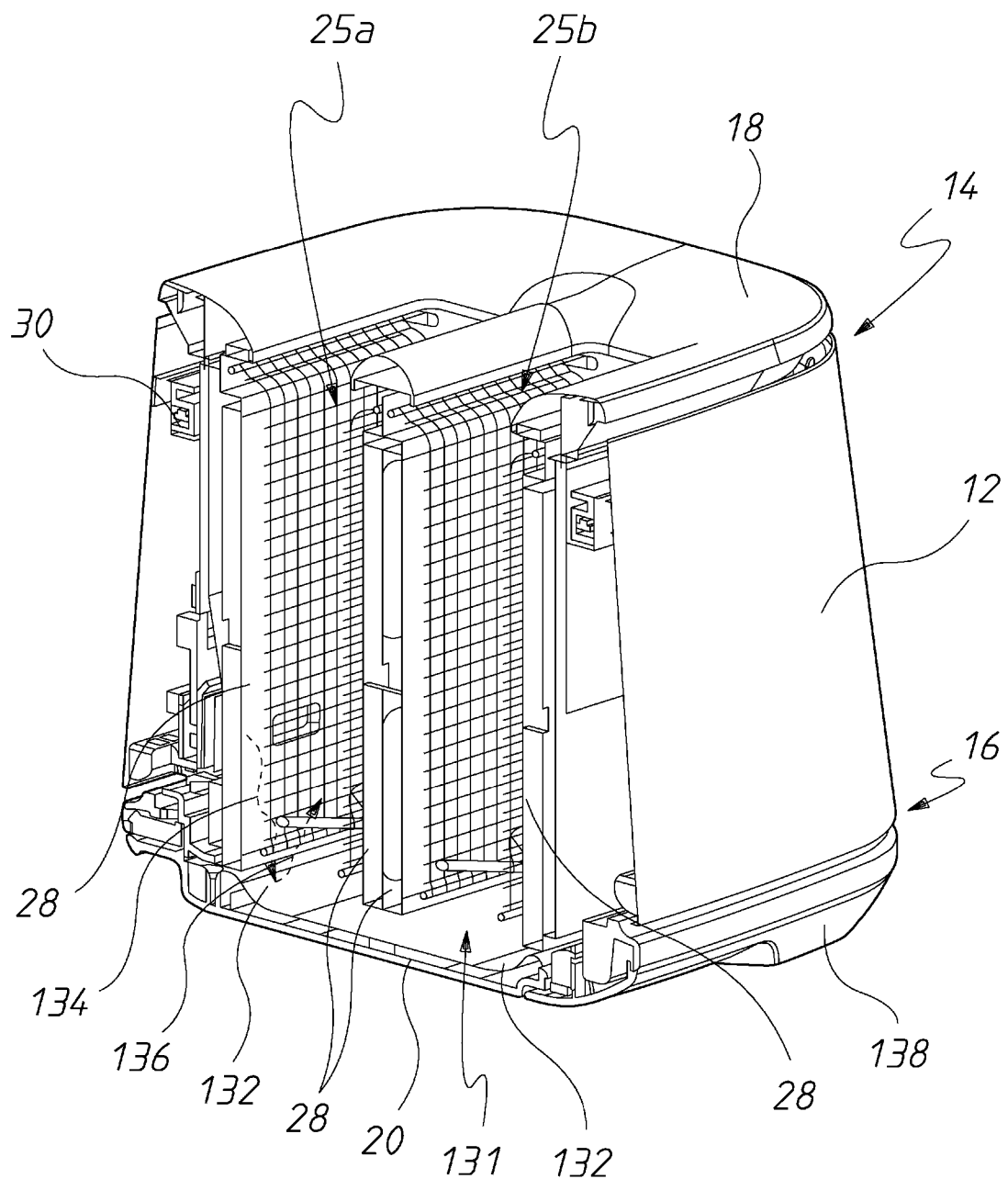
FIG. 34 is a further schematic sectioned isometric view of the toaster of FIG. 1.

As best shown in FIG. 34, the removable crumb tray 20, which is located at the lower portion 16 of the housing 12, includes an upper surface 131 facing the toasting areas 25*a*, 25*b*. The upper surface 131 includes angled portions 132 to reflect heat from the heating element assemblies 28 into the toasting areas 25*a* and 25*b* (e.g. in the directions 134 and 136). In preferred forms, the upper surface 131 of the crumb tray 20, including the angled portions 132, is formed from a reflective material. The arrangement of the angled portions 132 as part of the crumb tray 20 may at least reduce or avoid the need for separate reflective panels at the bottom of the toaster. In conventional toasters, these separate reflective panels are generally horizontally oriented and are therefore susceptible to collecting and retaining crumbs, thus reducing the reflective ability as the crumbs build up and cover the surfaces of the reflective panels. The arrangement of the angled portions 132 as part of the removable crumb tray 20 may at least provide an efficient way to remove the collected crumbs from the toaster 10 whilst maintaining the ability to reflect heat back into the toasting areas 25*a* and 25*b*.

In preferred forms, the upper surface 131 of the removable crumb tray 20 has a ceramic coating to reduce the amount of heat reflected onto the periphery of the foodstuff 86. An example of a suitable ceramic coating includes Cerasol, which has high temperature resistance, food grade rating and suitable colour range. The ceramic coating is preferably a dark (e.g. black) colour having a suitable emissivity range for even heat radiation. It would therefore be appreciated that the ceramic coating on the upper surface 131 may at least provide an even heating environment (i.e. by distributing heat evenly) to at least maintain an appropriate level of heating performance of the toaster 10.

Figure 35:
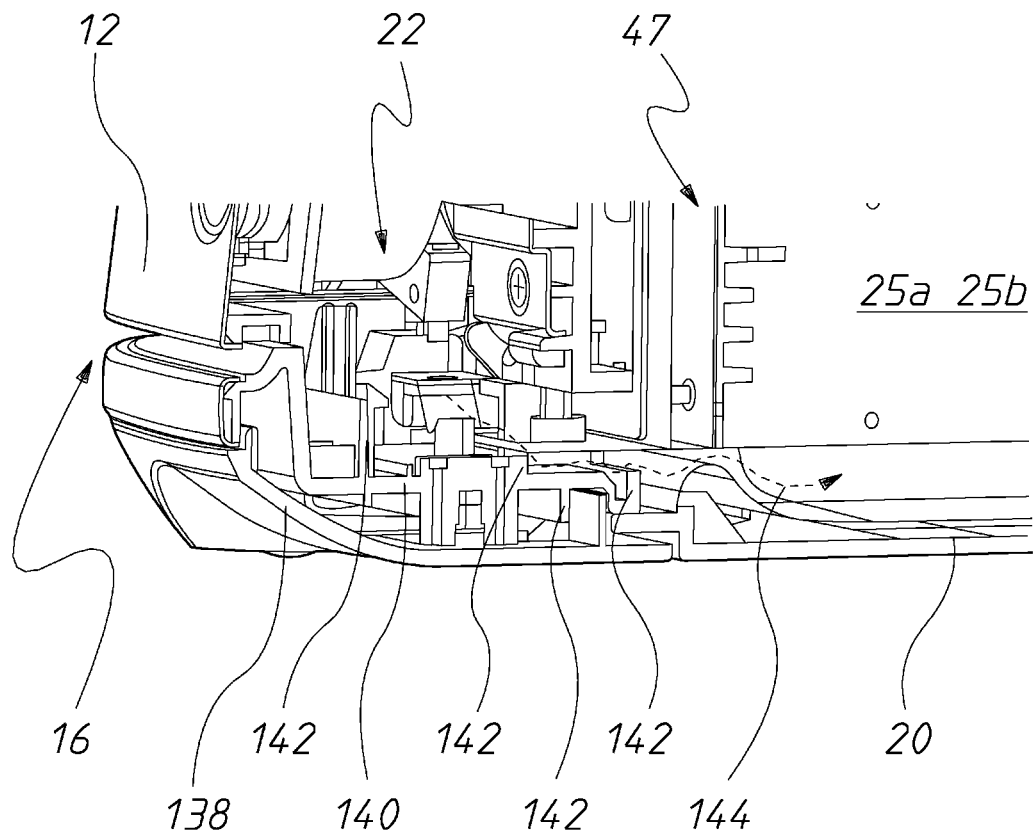
FIG. 35 is an enlarged schematic isometric view of a base member the toaster of FIG. 1.

As best shown in FIG. 35, the toaster 10 includes a base member 138 disposed at the lower (i.e. base) portion 16 of the housing 12. The base member 138 is adapted to support the toaster 10 (e.g. on a kitchen benchtop). The toaster 10 further includes an intermediate member 140 located in the interior 22 of the housing 12 between the base member 138 and the inner chassis assembly 47. The intermediate member 140 includes a plurality of protrusions 142. The removable crumb tray 20 engages the base member 138 and the intermediate member 140 by way of an interlocking profile, which, in conjunction with the protrusions 142, creates a torturous flow path 144 to reduce the amount of airflow traveling through the toaster 10 and into the toasting areas 25a, 25b. It will be appreciated that the engagement of the removable crumb tray 20 and the base member 138 also provides a seal between the removable crumb tray 20 and the inner chassis assembly 47 to reduce the amount of airflow traveling into the toasting areas 25a, 25b.

Figure 36:
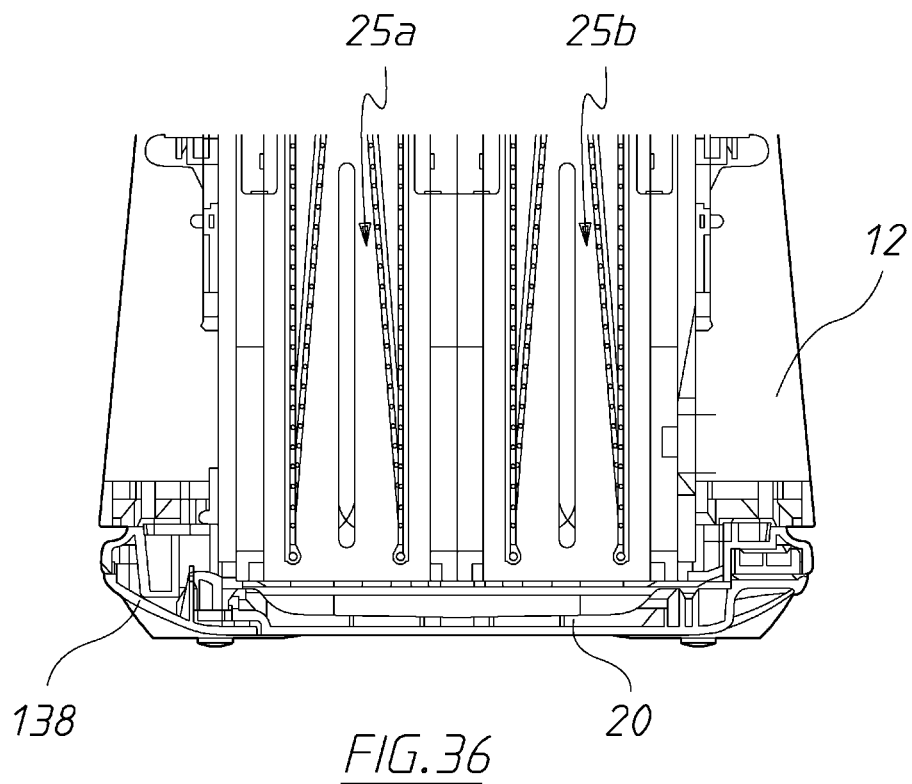
FIG. 36 is a further enlarged schematic side view of the toaster of FIG. 1.
Figure 37:
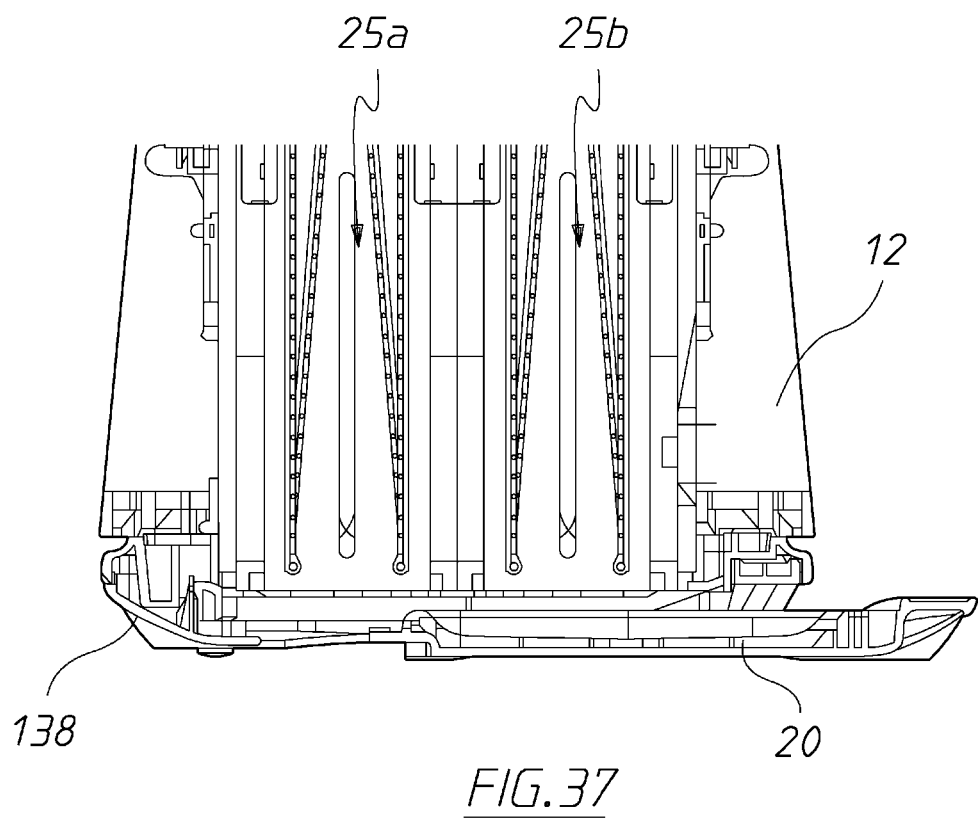
FIG. 37 is a further enlarged schematic side view of the toaster of FIG. 1.
Figure 38:
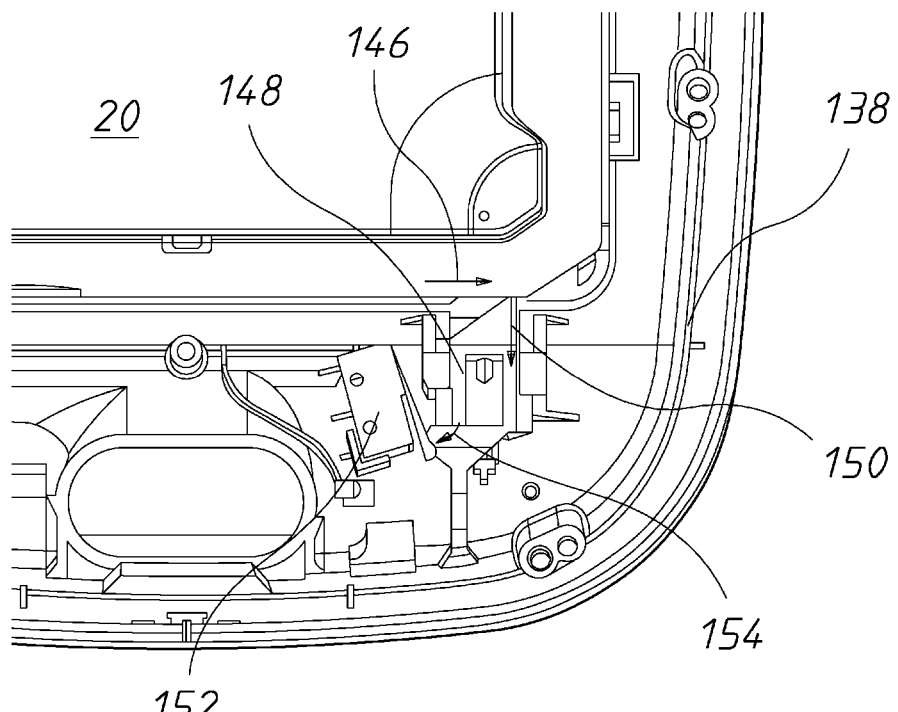
FIG. 38 is an enlarged schematic top view of an actuation member of the toaster of FIG. 1.
Figure 39:
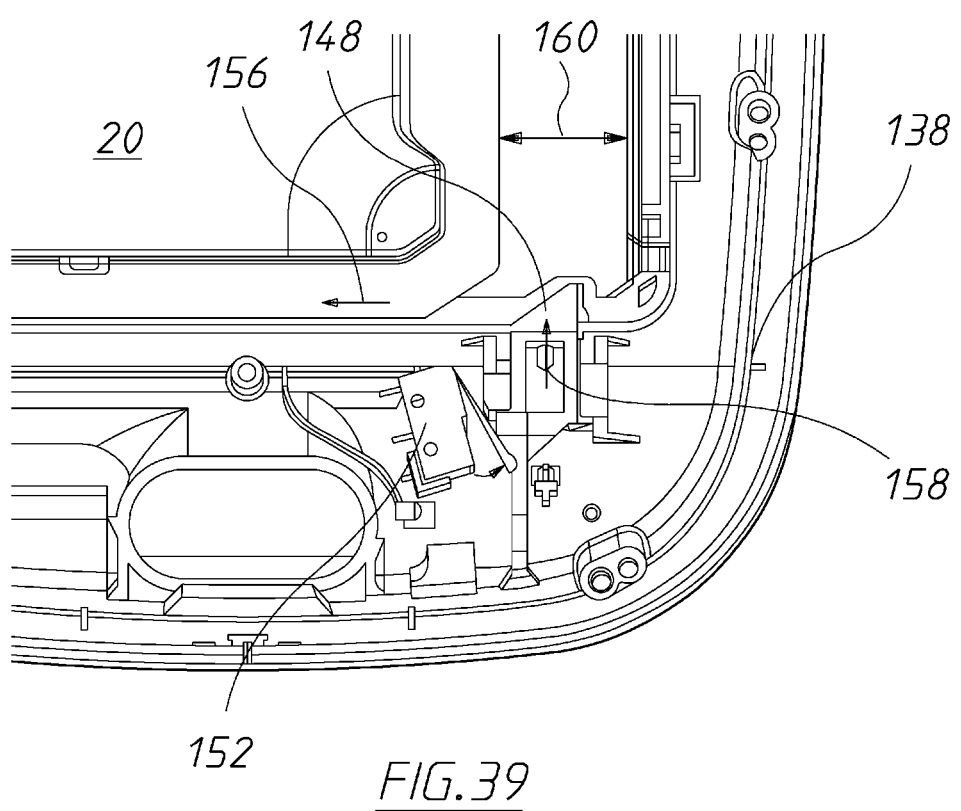
FIG. 39 is a further enlarged schematic top view of the actuation member of FIG. 38.
Figure 40:
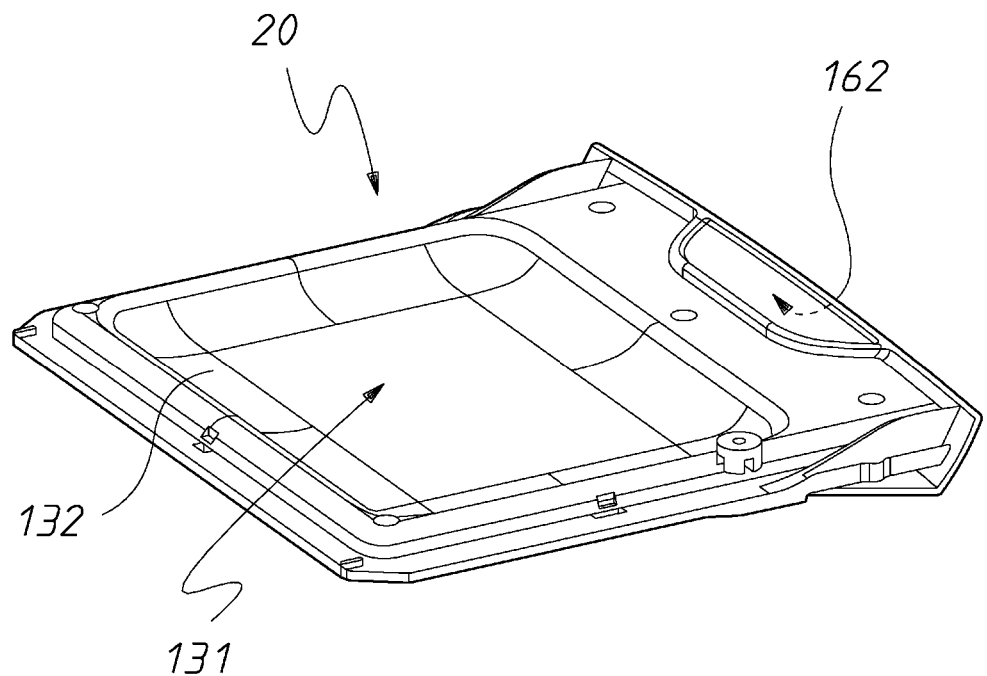
FIG. 40 is a schematic isometric view of a crumb tray of the toaster of FIG. 1.

FIGS. 36 and 38 show the removable crumb tray 20 in engagement with the base member 138, whilst FIGS. 37 and 39 show the removable crumb 20 disengaged from the base member 138. As best shown in FIG. 38, when the removable crumb tray 20 is inserted and engaged with the base member 138 in the direction 146, the removable crumb tray 20 abuts an actuation member 148 in the base member 138 to force the actuation member 148 in the direction 150. This movement causes the actuation member 148 to be moved into electrical contact with a switch member 152 in the base member 138 in the direction 154. The switch member 152 is electrically associated with the heating element assemblies 28 of the toaster 10. Accordingly, the electrical contact between the actuation member 148 and the switch member 152 allows the heating element assemblies 28 to be powered on. As best shown in FIG. 39, when the removable crumb tray 20 is removed and disengaged from the base member 138 in the direction 156, the actuation member 148 (which is biased in the direction 158) moves into the gap 160 vacated by the crumb tray 20. The movement of the actuation member 148 in the direction 158 removes the actuation member 148 from electrical contact with the switch member 152, thereby powering off the heating element assemblies 28. The arrangement and functionality of the actuation member 148 and switch member 152 may at least ensure that the heating element assembly 28 are powered off when the crumb tray 20 is removed from the base member 138, such that, if or when the heating element assemblies 28 are exposed to a user, the heating element assembly 28 may at least be electrically safe to touch.

It is envisaged that the base member 138 may also include a protrusion (not shown) to limit the movement of the removable crumb tray 20 if the removable crumb tray 20 is inserted at an angle (instead of in the direction 146). This arrangement may at least prevent the actuation member 148 from coming into electrical contact with the switch member 152 if the removable crumb tray 20 is inserted at an incorrect angle or orientation, thereby preventing exposure of the heating element assembly 28 to the user.

Figure 41:
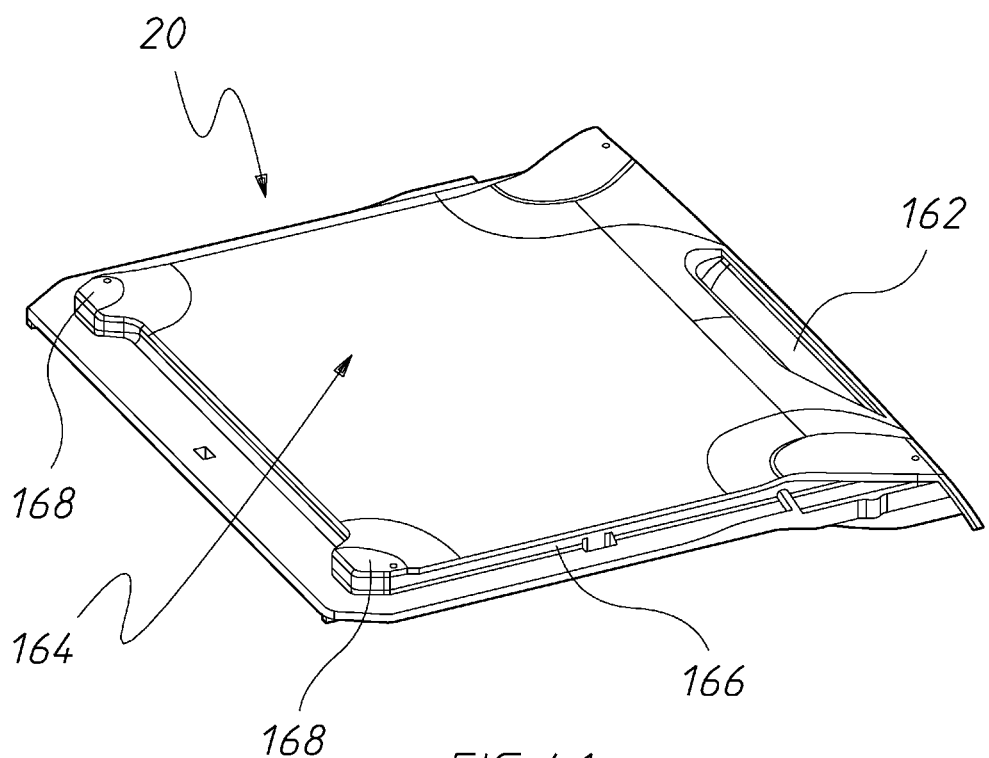
FIG. 41 is a further schematic isometric view of the crumb tray of the toaster of FIG. 1.
Figure 42:
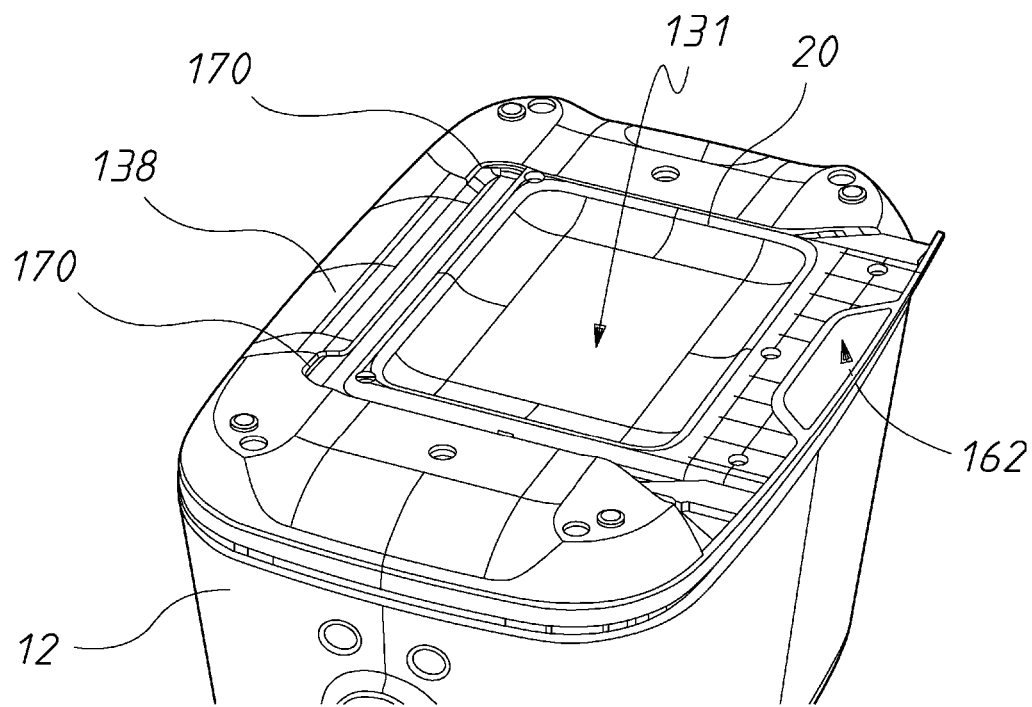
FIG. 42 is a schematic isometric view of an underside of the toaster of FIG. 1.
Figure 43:
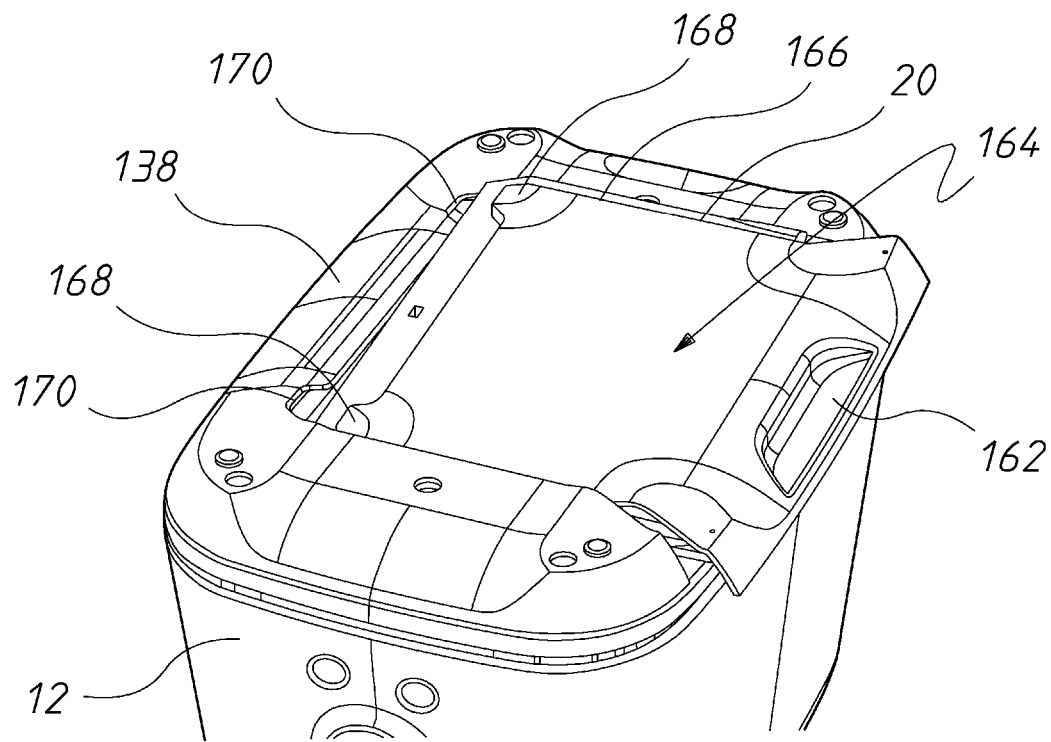
FIG. 43 is a further schematic isometric view of the underside of the toaster of FIG. 1.

FIGS. 40 to 43 show the appearance of the removable crumb tray 20, which includes a recessed portion 162 to allow the user to grip and pull the crumb tray 20 away from the base member 138 to remove the crumb tray 20 from the base member 138. The crumb tray 20 further includes the upper face 131 for collecting crumbs from the foodstuff 86 and the angled portions 132 for reflecting heat back into the toasting areas 25a and 25b as described above. The crumb tray also includes a lower surface 164 which is opposite to the upper face 131. As best shown in FIGS. 41 and 43, the lower surface 164 of the crumb tray 20 includes a raised portion 166 having protrusions 168, and the base member 138 includes corresponding recesses 170 adapted to receive the protrusions 168. The arrangement of the raised portion 166, the protrusions 168 and the corresponding recesses 170 may at least ensure that the crumb tray 20 is in the correct orientation when being inserted into the base member 138. In conjunction with the arrangement and functionality of the actuation member 148 and switch member 152 as described above, this arrangement may at least prevent the heating element assemblies 28 from being powered on if the crumb tray 20 is inserted incorrectly.

Heating Element Assembly

Figure 44:
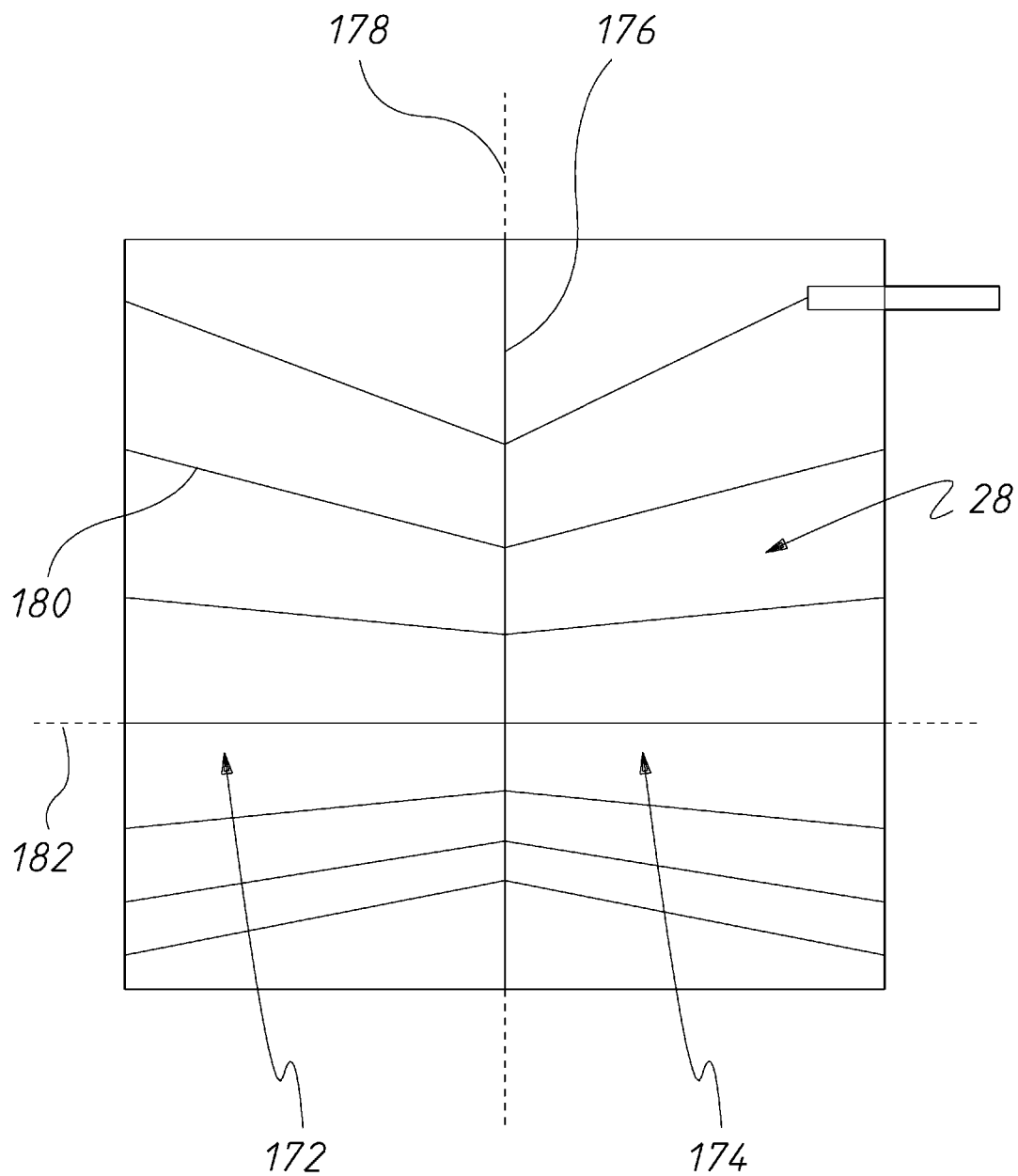
FIG. 44 is a schematic front view of a heating element of the toaster of FIG. 1.

FIG. 44 shows an embodiment of the heating element assembly 28, which includes a first heating element portion 172 and a second heating element portion 174. In preferred forms, each of the first and second heating element portions 172 and 174 is formed from mica. The heating element assembly 28 further includes a central intersection portion 176 extending along a longitudinal axis 178 located between the first and second heating element portions 172 and 174. The first and second heating element portions 172 and 174 each include a series of lateral element wires 180. In this embodiment, the series of lateral element wires 180 are oriented at a series of angles towards the general direction of a lateral axis 182. This arrangement of the central intersection portion 176 and the angled lateral element wires 180 creates a concentration of element wires at the centre of the heating element assembly 28, thereby creating a region with a larger heat output at the centre of the heating element assembly 28. As foodstuffs tend to have a higher moisture level in the central areas than at the periphery, it is understood that the periphery of the foodstuffs tend to cook faster because less time is required to heat and evaporate the moisture at the periphery than at the central areas. It will therefore be appreciated that the above arrangement of the central intersection portion 176 and the angled lateral element wires 180 may at least allow heat from the heating element assembly 28 to be concentrated at the central areas of the foodstuff. It is envisaged that, depending on the type of foodstuff, the central intersection portion 176 and the lateral element wires 180 may be positioned at any desired location on the heating element assembly 28 to concentrate the heat output from the heating element assembly 28 accordingly.

Figure 45:
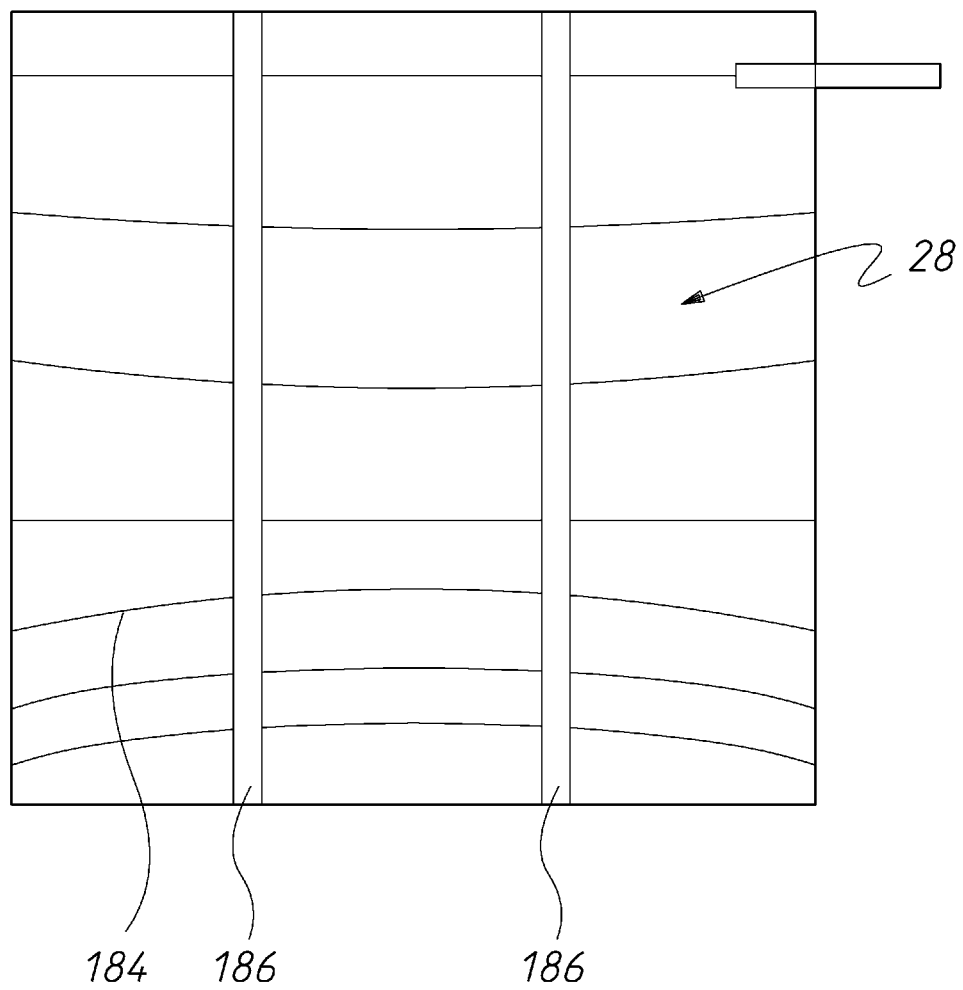
FIG. 45 is a schematic front view of a further heating element of the toaster of FIG. 1.

FIG. 45 shows another embodiment of the heating element assembly 28, which includes a series of lateral element wires 184 having a generally curved configuration. In this embodiment, the series of lateral element wires 184 is held in the curved configuration by a pair of spaced-apart longitudinally-extending support brackets 186. This arrangement of the curved lateral element wires 184 may at least allow the heat from the heating element assembly 28 to be concentrated at the central areas of the foodstuff. Additionally, depending on the type of foodstuff, the lateral element wires 184 may be positioned at any desired location on the heating element assembly 28 to concentrate the heat output from the heating element assembly 28 accordingly.

Figure 46:
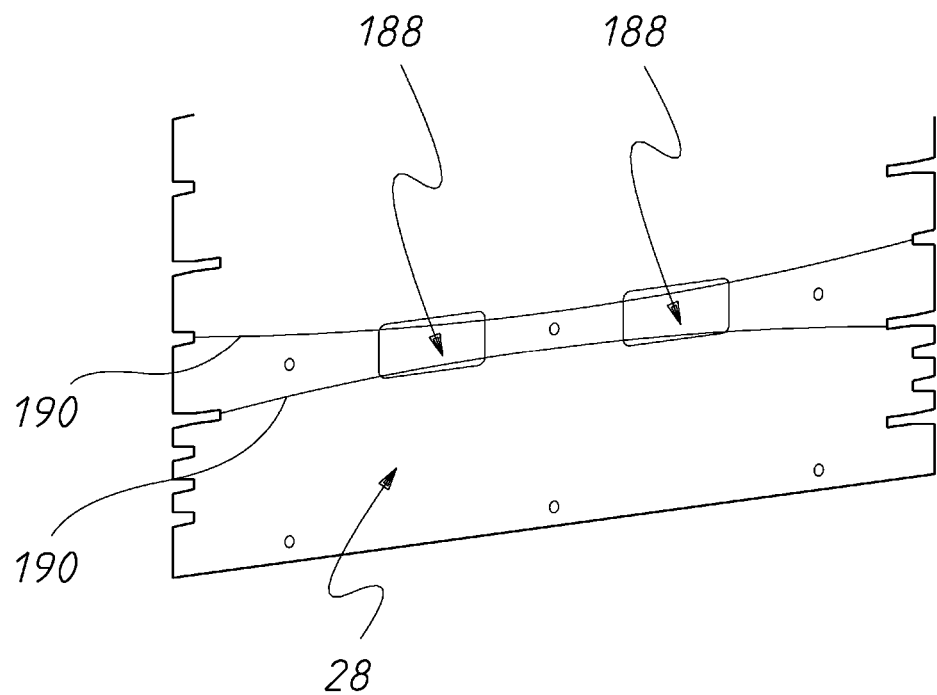
FIG. 46 is an enlarged schematic isometric view of the heating element of the toaster of FIG. 1.
Figure 47:
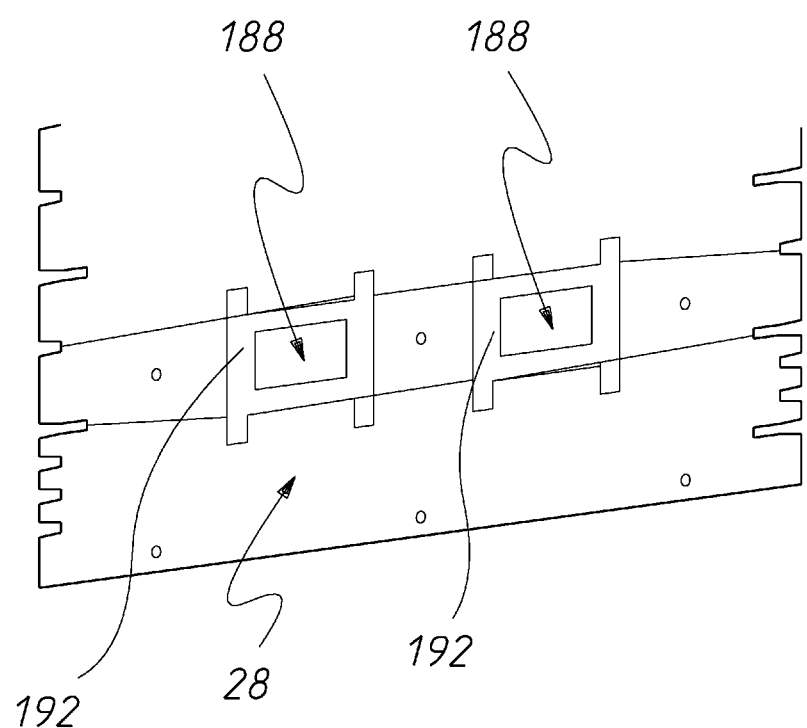
FIG. 47 is a further enlarged schematic isometric view of the heating element of the toaster of FIG. 1.
Figure 48:
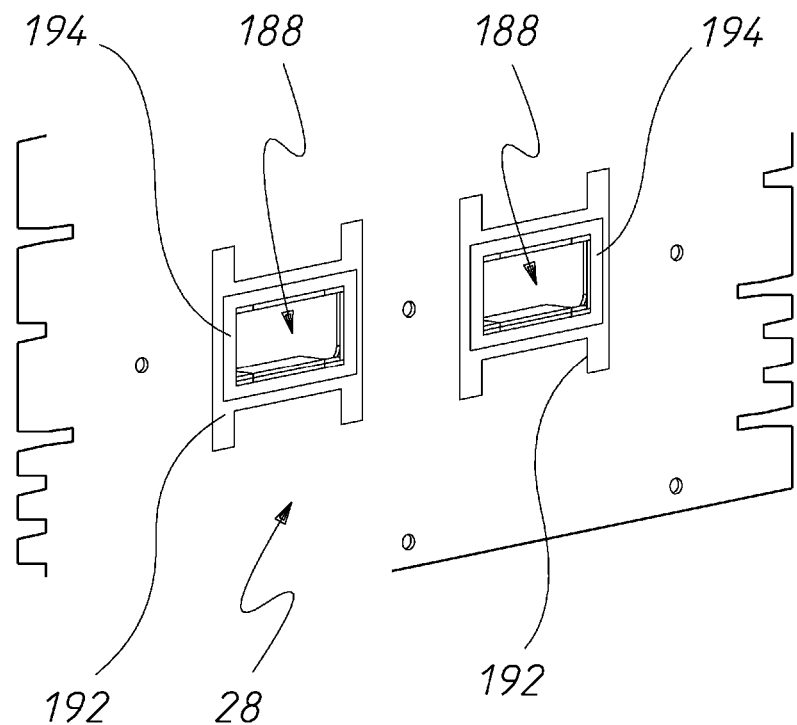
FIG. 48 is a further enlarged schematic isometric view of the heating element of the toaster of FIG. 1.
Figure 49:
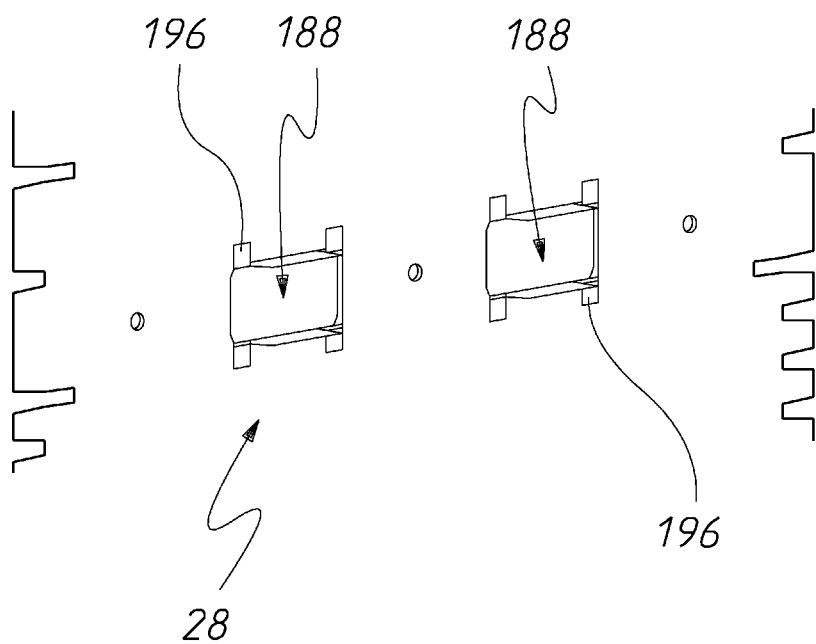
FIG. 49 is a further enlarged schematic isometric view of the heating element of the toaster of FIG. 1.

In the embodiment as shown in FIGS. 46 to 49, the heating element assembly 28 also includes a pair of openings 188 that are generally in alignment with the openings 50 in the inner wall 48 which allow the sensors 52 to detect the foodstuff. It is envisaged that the heating element assembly 28 may alternatively include a single opening or more than two openings. As shown in FIG. 46, there is a possibility that the pair of element wires 190 may distort and shift towards the openings 188 such that the signal from the sensors 52 may be interrupted. This may impact on the performance of the sensors 52. Accordingly, as shown in FIG. 47, a pair of primary brackets 192 located at the periphery of the pair of openings 188 may be introduced locate and guide the element wires 190 away from the opening 188. As best shown in FIGS. 48 and 49, a pair of secondary brackets 194 may be utilised to secure the pair of primary brackets 192 to the heating element 28. Each of the secondary brackets 194 includes a plurality of tabs 196 that extend through the associated opening 188 and is folded over on an opposing surface heating element 28 to secure the associated primary bracket 192 to the heating element 28.

Bun Warmer

Figure 50:
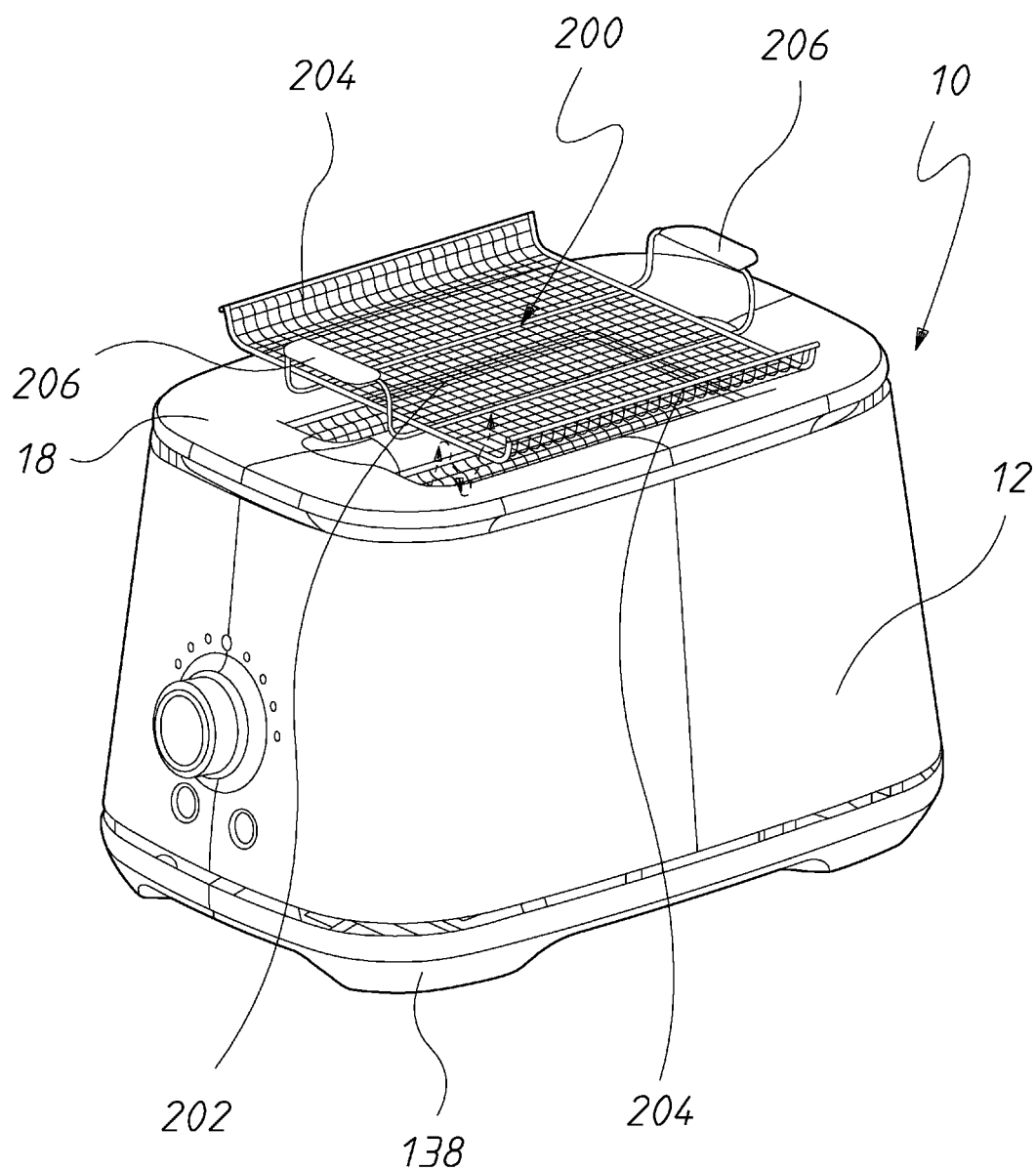
FIG. 50 is a schematic isometric view of the toaster of FIG. 1 and a food warmer.

As best shown in FIG. 50, the toaster 10 has an associated food warmer 200 which is adapted to rest on the upper surface 36 of the top cap 18. The food warmer 200 includes a flat portion 202 to receive the foodstuff to be warmed (e.g. bread, bagels, buns and pastries such as muffins and croissants) and a pair of upwardly-extending portions 204 to hold the foodstuff in place. The food warmer 200 also includes a pair of handles 206 that are insulted to allow a user to safely handle the food warmer 200. It will be appreciated that the food warmer 200 is formed from a thin gauge wire mesh. It will also be appreciated that the use of thin gauge wire to form the food warmer 200 may at least spread out the thermal mass of the food warmer 200 and allow the heat to be distributed evenly to the foodstuff.

Cord Stuff

Figure 51:
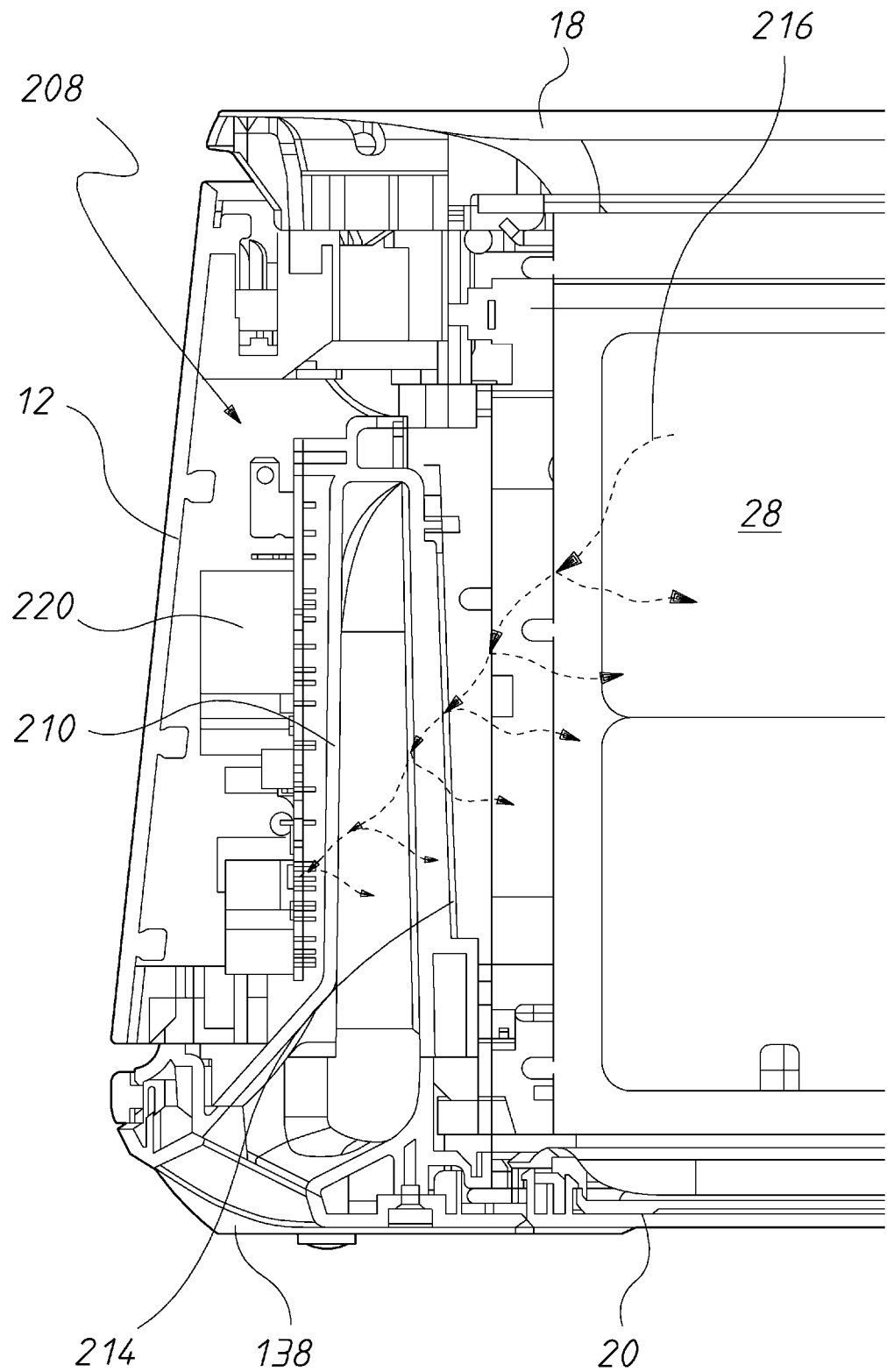
FIG. 51 is an enlarged schematic front view of the toaster of FIG. 1.
Figure 52:
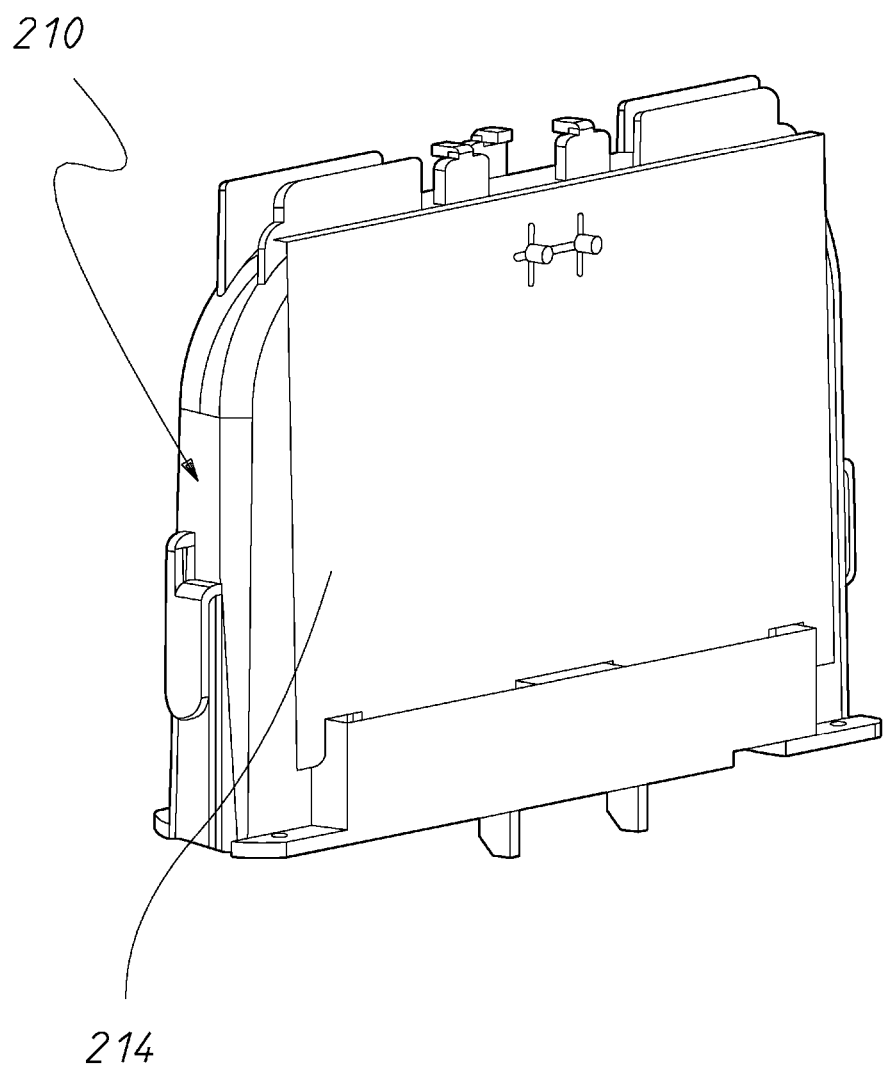
FIG. 52 is a schematic isometric view of a cord compartment of the toaster of FIG. 1.
Figure 53:
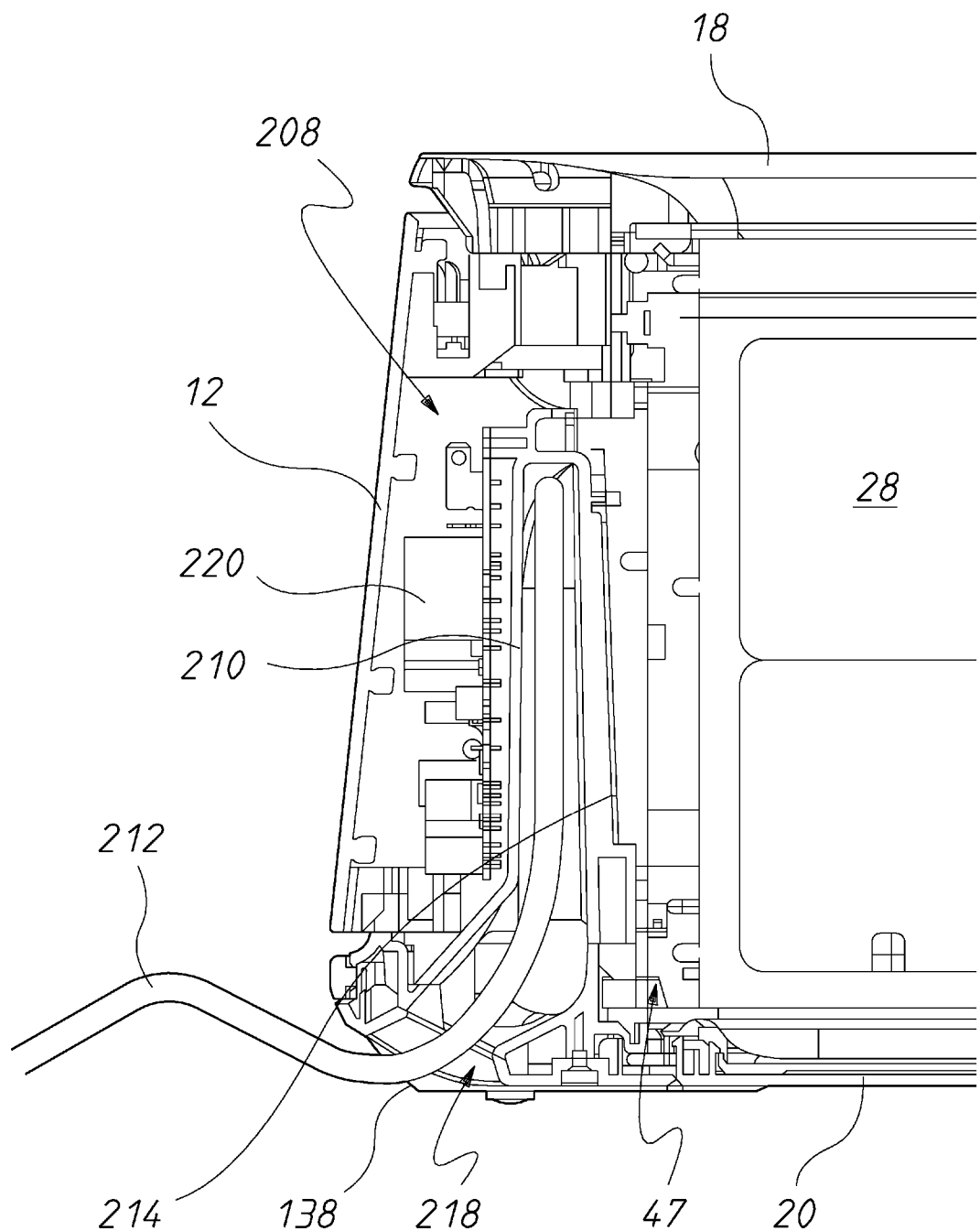
FIG. 53 is a further enlarged schematic front view of the toaster of FIG. 1.

FIG. 51 shows an internal cavity 208 which is part of the interior 22 of the housing 12 and adapted to hold a cord compartment 210. It will be understood that the cord compartment 210 is adapted to house at least a portion of an electrical power cord 212 (as shown in FIG. 53) of the toaster 10, which is to be connected to a mains power switch. The interior of the cord compartment 210 in which the electrical cord 212 is housed is required to remain within a specific temperature range to comply with safety requirements for electrical power cords. Accordingly, cord compartments in conventional toasters are typically located very close to the toaster chassis where there is a lot of radiant heat from the heating elements. It is envisaged that a heat reflector panel 214 may be introduced at a location between the cord compartment 210 and the inner chassis assembly 47 so as to reflect heat from the heating element assemblies 28 away from the cord compartment 210 (e.g. in the direction 216 as shown in FIG. 51). The arrangement of the heat reflector panel 214 may therefore at least ensure that the interior of the cord compartment 210 may be maintained within a safe temperature range.

It will be appreciated that the cord compartment 210 is a vertically-extending compartment to capitalise on the limited space available within the interior 22 of the housing 12 to store the electrical power cord 212. As best shown in FIG. 53, the base member 138 also includes a cavity 218 connected to the cord compartment 210, and through which the electrical cord power 212 extends. The cavity 218 is adapted to allow a user to push and pull the electrical power cord 212 in and out of the toaster 10 (e.g. to modify the extended length of the electrical power cord 212) without having to pick up the toaster 10.

Figure 54:
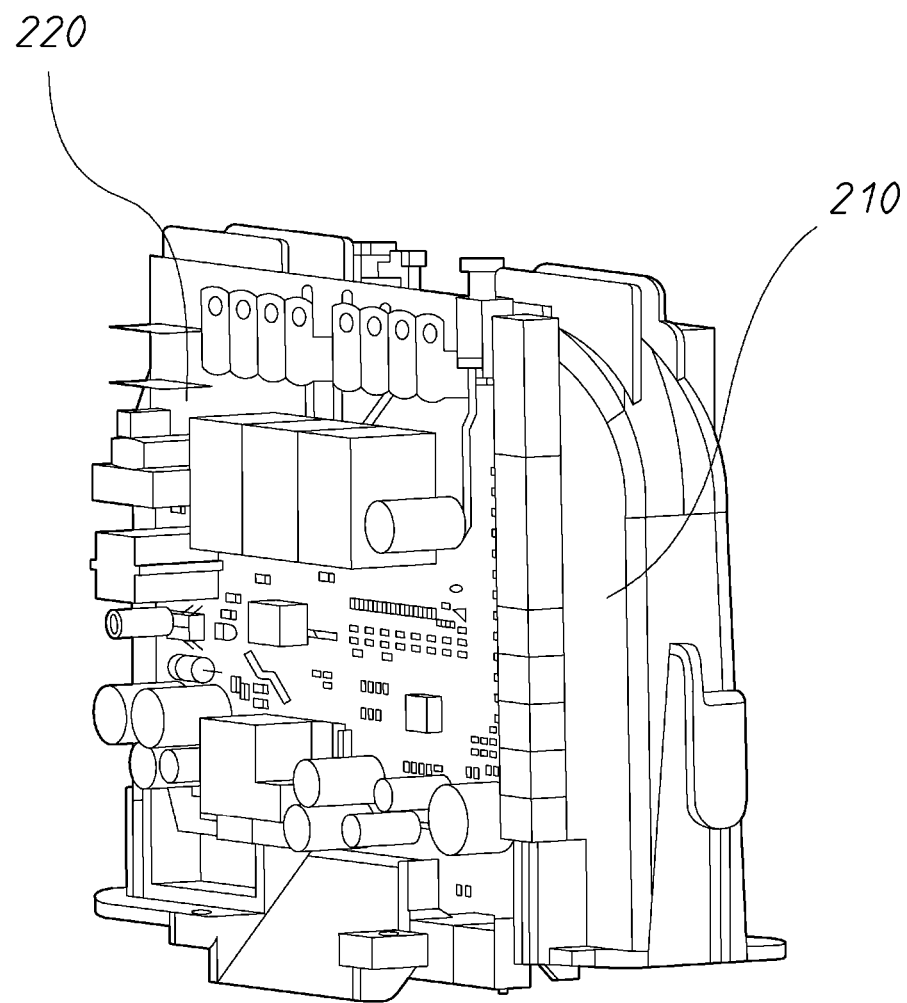
FIG. 54 is a further schematic isometric view of the cord compartment of the toaster of FIG. 1.

As best shown in FIG. 54, it will be appreciated that a printed circuit board (PCB) 220 that supports the electronic components of the toaster 10 is mounted in close relation to the cord compartment 220 to capitalise on the limited space available within the interior 22 of the housing 12. It will also be appreciated that by having the PCB 220 mounted in close relation to the cord compartment 210, the cord compartment 210 may act as a heat sink to draw heat away from the PCB 220, thereby providing protection for the PCB 220 from heat radiating from the heating elements 28.

Sensor Sub-Assembly

Figure 55:
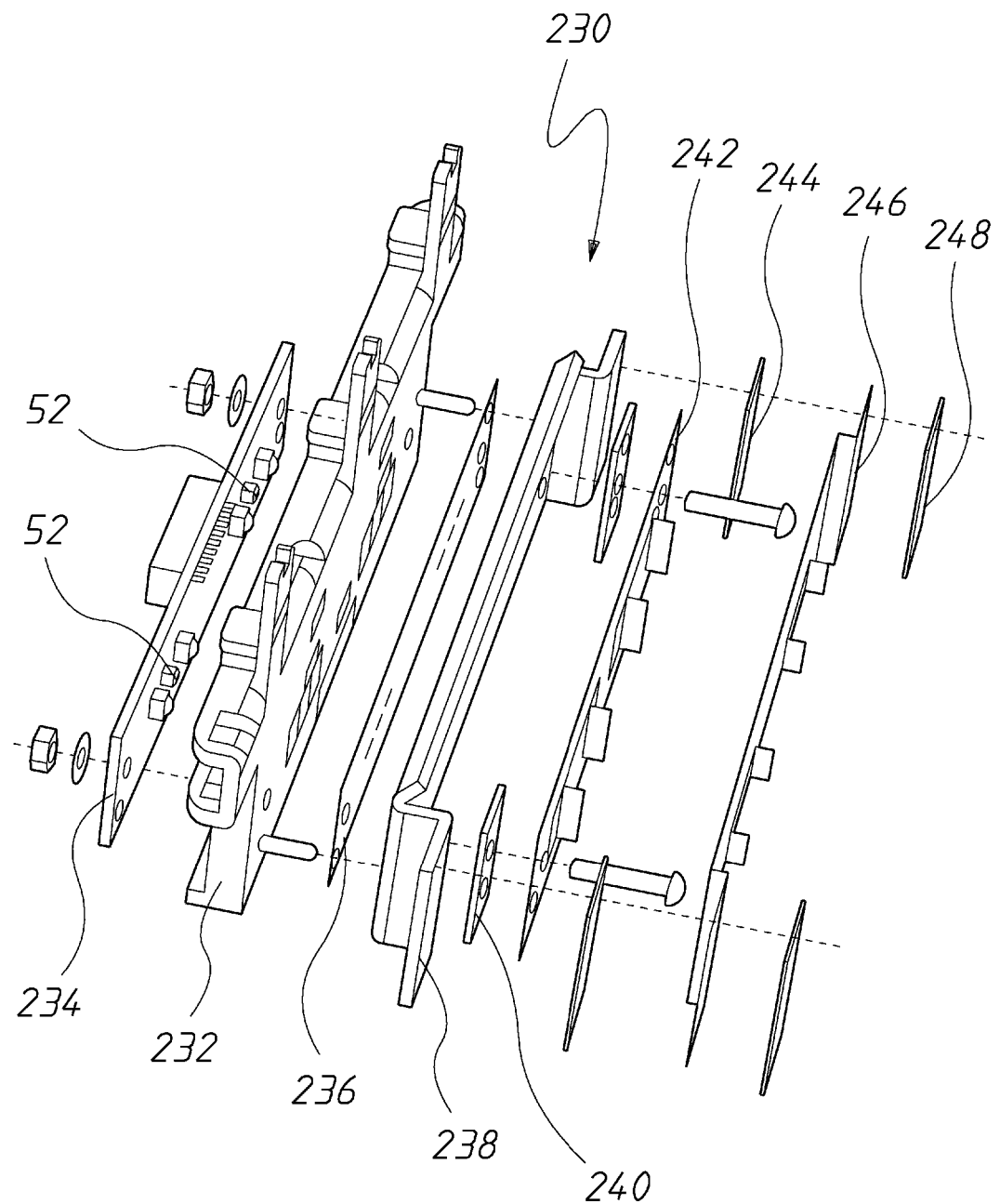
FIG. 55 is a schematic isometric view of a sensor sub-assembly of the toaster of FIG. 1.

FIG. 55 shows a sensor sub-assembly 230 including the pair of sensors 52 for detecting the foodstuff. The sensor sub-assembly 230 is mounted to the inner wall 48 of the inner chassis assembly 47 and includes a sensor sub-assembly bracket 232 and sensor sub-assembly components 234, 236, 238, 240, 242, 244, 246 and 248 mounted to the sensor sub-assembly bracket 232. It is envisaged that the simple construction and assembly of the sensor sub-assembly bracket 232 and the components 234, 236, 238, 240, 242, 244, 246 and 248 may at least allow for mass production of the sensor sub-assembly 230.

Figure 55A:
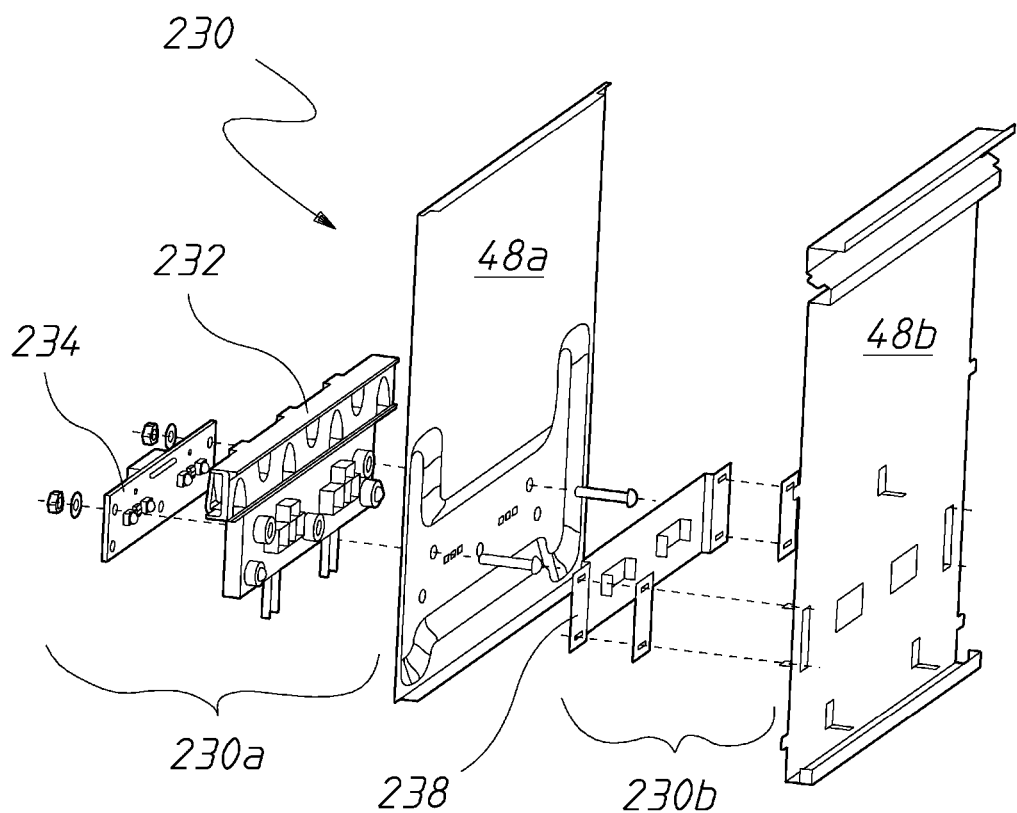
FIG. 55A is a schematic isometric view of an alternative configuration of the sensor sub-assembly of FIG. 55.

FIG. 55A shows an alternative arrangement whereby a first sensor sub-assembly 230a is mounted to a first inner wall 48a and a second sensor sub-assembly 230b is mounted to a second inner wall 48b. The first sensor sub-assembly 230a includes the sensor sub-assembly bracket 232 and the sensor sub-assembly component 234, whilst the second sensor sub-assembly 230b includes one or more of the sensor sub-assembly components 236, 238, 240, 242, 244, 246 and 248 described above.

Figure 56:
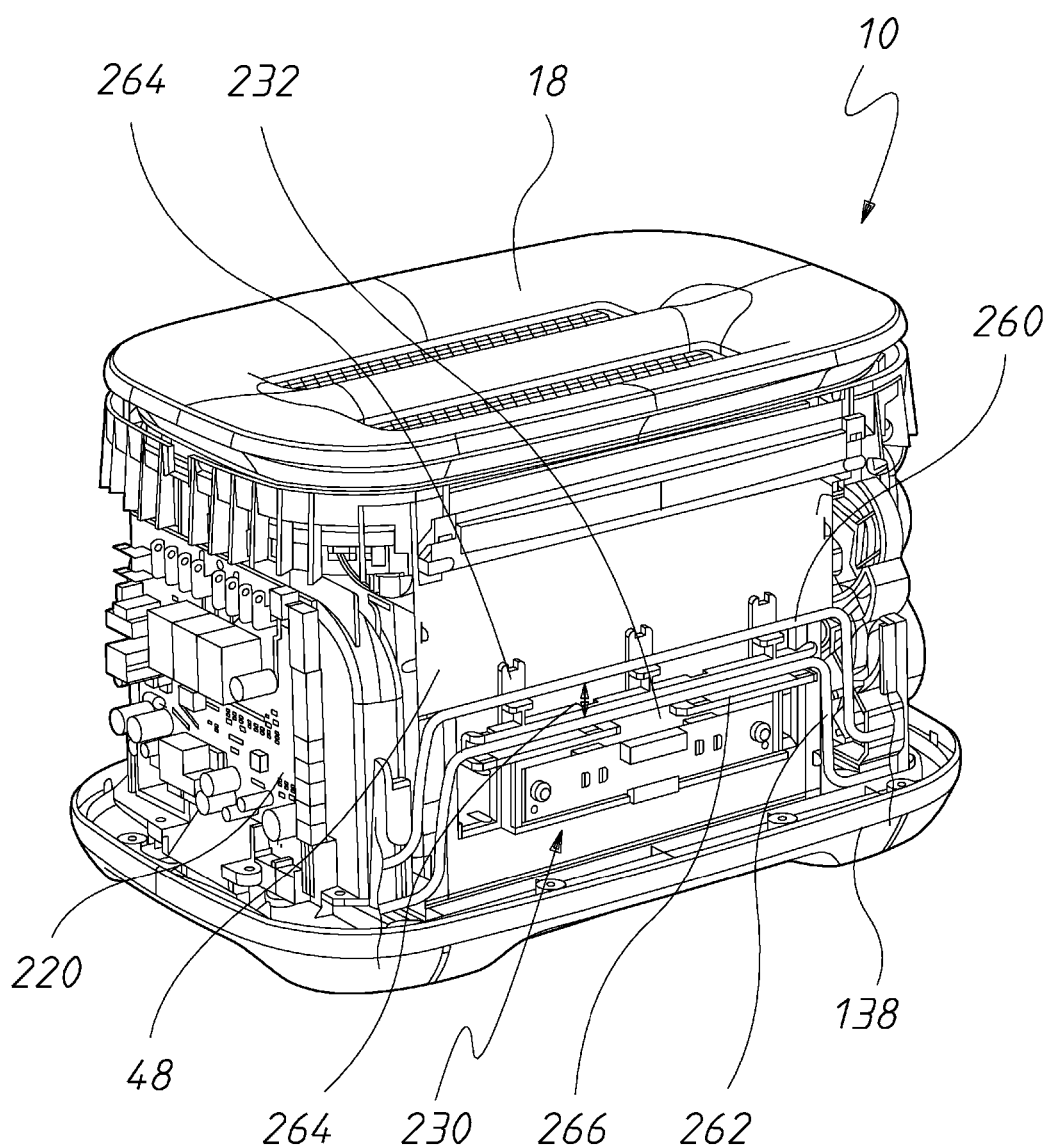
FIG. 56 is a further schematic isometric view of the toaster of FIG. 1.

As shown in FIG. 56, the toaster 10 includes a high voltage cable 260 and a low voltage cable 262 electrically connected to the electrical components of the PCT 220. It will be appreciated by a person skilled in the art that for safety compliance, high voltage and low voltage cables typically should not be contained in the same area within the toaster. Additionally, the presence of high voltage cables near a sensor may result in signal noise from the high voltage cable interfering with the sensor data. The sensor sub-assembly bracket 232 includes routing portions 264 and 266 to route the high voltage cable 260 in spaced relation away from the low voltage cable 262. This may at least reduce or eliminate the signal noise from the high voltage cable 260 from interfering with the data from the sensors 52.

Figure 56A:
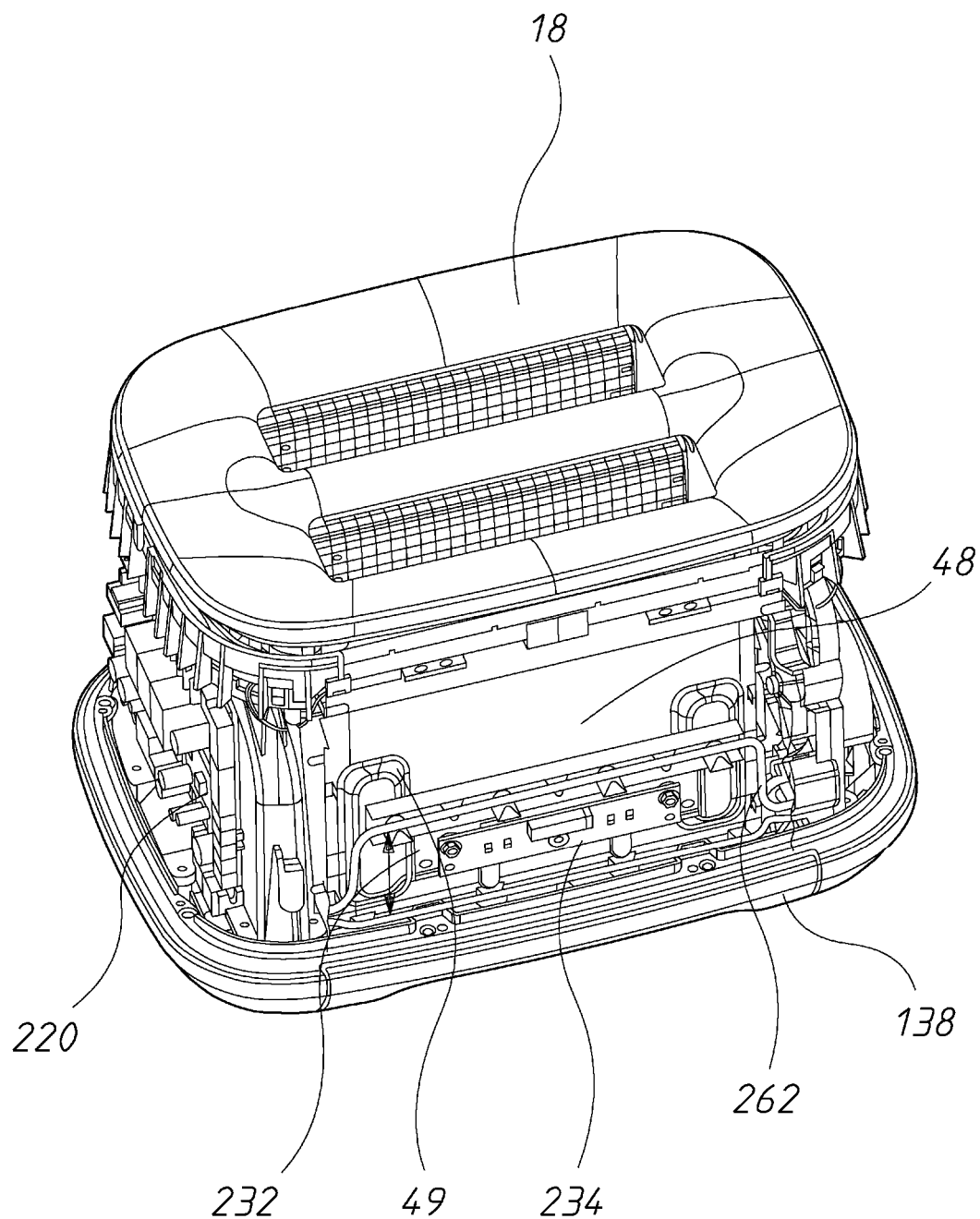
FIG. 56A is a further schematic isometric view of the toaster of FIG. 1 in an alternative configuration.

FIG. 56A shows an alternative embodiment having the inner wall 48 construction described above including the dogbone-shaped structure 49, with the sensor sub-assembly bracket 232 and sensor sub-component 234 mounted thereon.

LED Assembly

Figure 57:
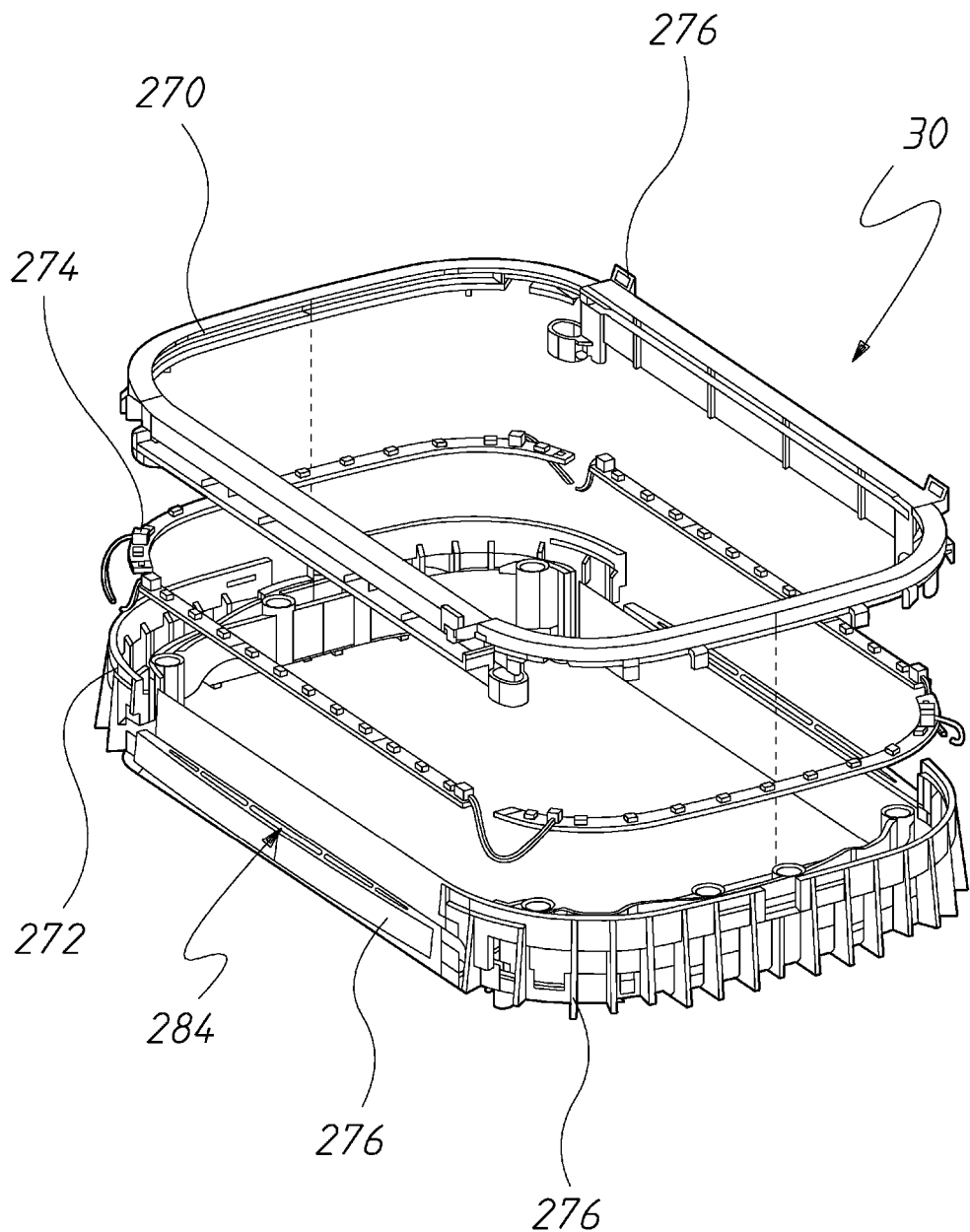
FIG. 57 is a schematic isometric view of a of the toaster of FIG. 1.

FIG. 57 shows an exploded view of the LED assembly 30 which includes a first LED bracket 270, and second LED bracket 272, and a set of LEDs 274. The first and second LED brackets 270 and 272 are mounted to the housing 12 and are adapted to hold the set of LEDs 274 in place. It will be appreciated that the first and second LED brackets 270 and 272 include supporting features 276 that contact the housing 12 and allow the potential load to spread out across the first and second LED brackets 270 and 272. The arrangement of the LED assembly 30 may also at least enhance the structural integrity of the upper portion 14 of the housing 12 by providing additional structural support to the housing 12.

Figure 58:
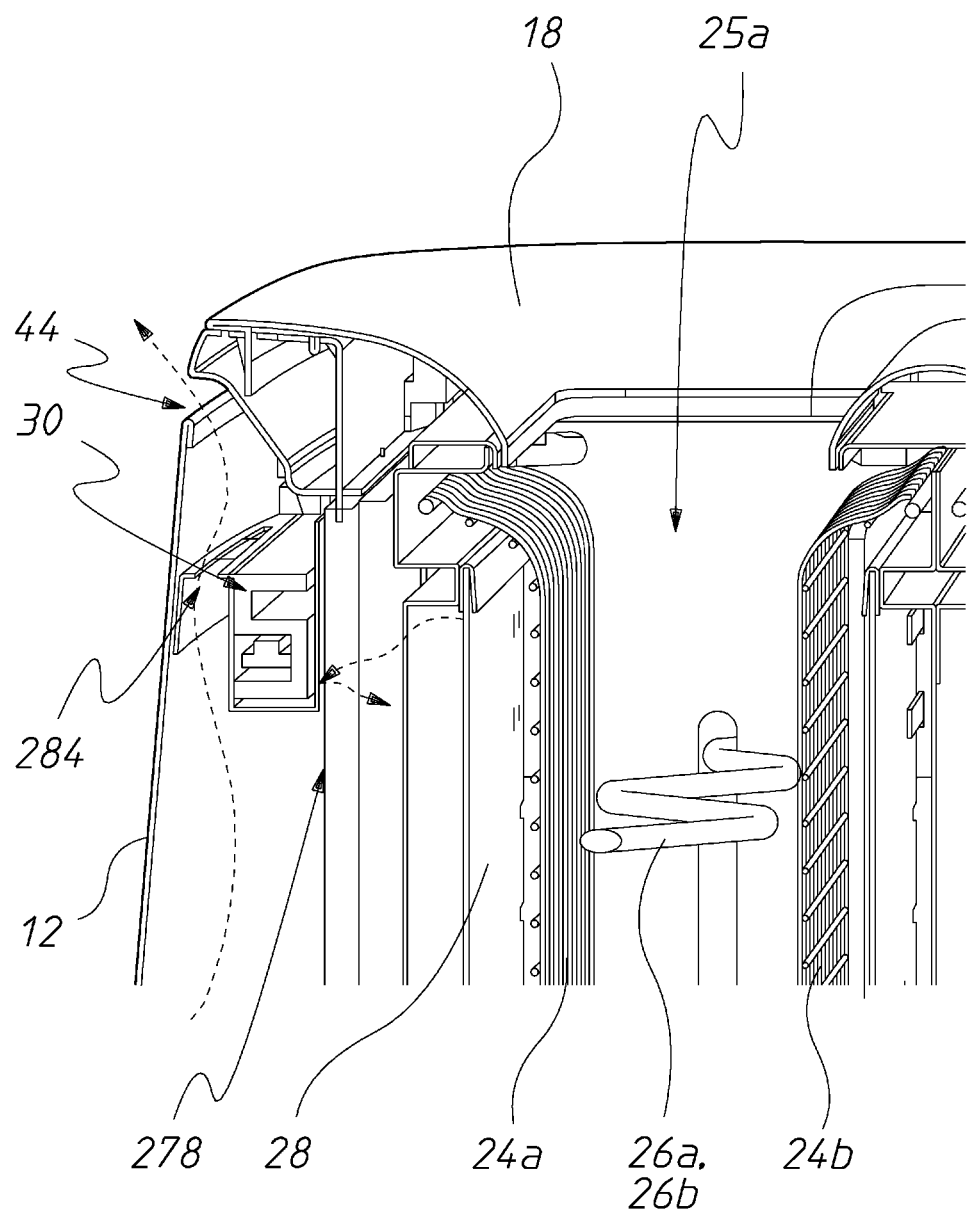
FIG. 58 is a further enlarged schematic isometric view of the toaster of FIG. 1.

As best shown in FIG. 58, the LED assembly 30 includes a heat shield 278 located between the LED assembly 30 and the heating element assemblies 28. The heat shield 278 is formed from an insulative or reflective material and is adapted to reflect radiant heat from the heating element assemblies 28 away from the LED assembly 30. The heat shield 278 may therefore at least ensure that the electronics of the LED assembly 30 may be maintained within a safe temperature range. It will be appreciated that the supporting features 276 of the first and second LED brackets 270 and 272 may similarly be formed from an insulative or reflective material and also adapted to reflect radiant heat from the heating element assembly 28 away from the LED assembly 30.

As discussed above, the gap or vent 44 located at the upper portion 14 of the housing 12 between the top cap 18 and the housing 12 allows light emitted from LED assembly 30 to shine out of the housing 12. With reference to FIG. 59, the LED assembly 30 is located directly in an air flow path 280 of the toaster 10. The air flow path 280 travels from a second gap or vent 282 located at the lower portion 16 of the housing 12, through the internal cavity 208, and out through the gap or vent 44. It will be appreciated that the construction of the LED assembly 30 (e.g. openings 284 in the first and second LED brackets 270 and 272) may at least allow sufficient gaps to maintain the air flow path 280 in and out of the toaster 10.

In FIGS. 60 to 74, there is schematically depicted another embodiment of a toaster 1001. It will be appreciated that the various components and functionalities thereof of the toaster 1001 operate in a similar manner as the components and functionality of the toaster 10 described above. The various components and functionalities of the toaster 10 and toaster 1001 may also be interchanged, depending on the specific requirements. The electrical functionalities of the toaster 1001 will now be described.

Figure 60:
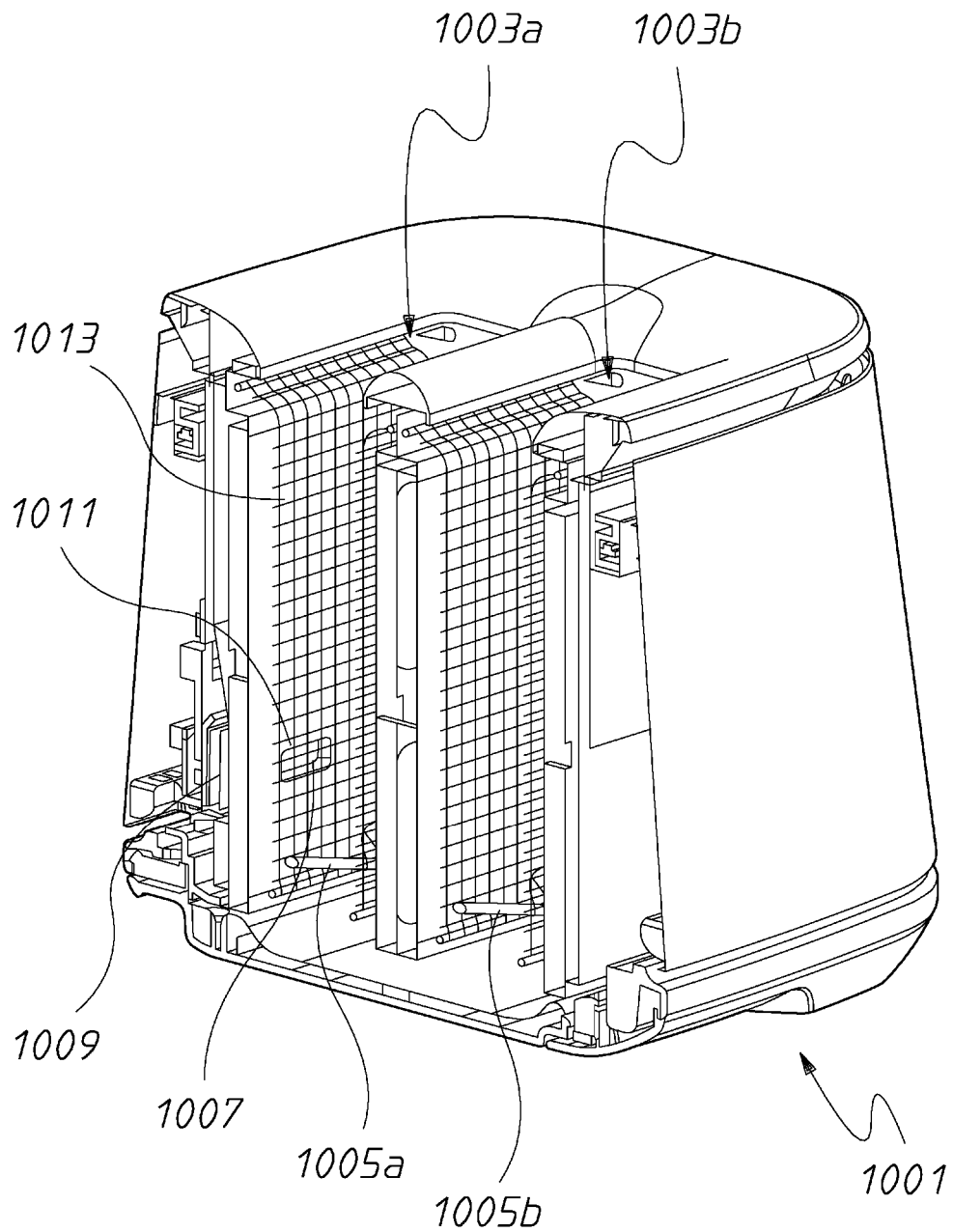
FIGS. 60 to 62 show various toasters according to other embodiments of the present disclosure.

FIG. 60 shows a cutaway view of the toaster 1001 with a first toasting slot 1003A and a second toasting slot 1003B. The toasting slots are arranged to receive food items for toasting. The food items are placed on toasting carriages (1005A and 1005B), shown in a lowered position, and lowered into the toasting slots. An optical sensor 1007 placed on an optical board 1009 is positioned to emit an optical signal into the toasting slot through a side aperture 1011 in the front wall of the toasting slot and detect (i.e. sense) a reflected optical signal that either reflects off a food item when the food item is placed in the toasting slot or reflects of the facing wall of the toasting slot. It will be understood that there may be more than one sensor in more than one toasting slot of the toaster.

Inside the toasting slots are heating elements 1013. For example, there may be two opposing heating elements in the first slot 1003A and two opposing heating elements in the second slot 1003B. It will be understood however that there may be one or more heating elements in one or more slots of a toaster.

Figure 61:
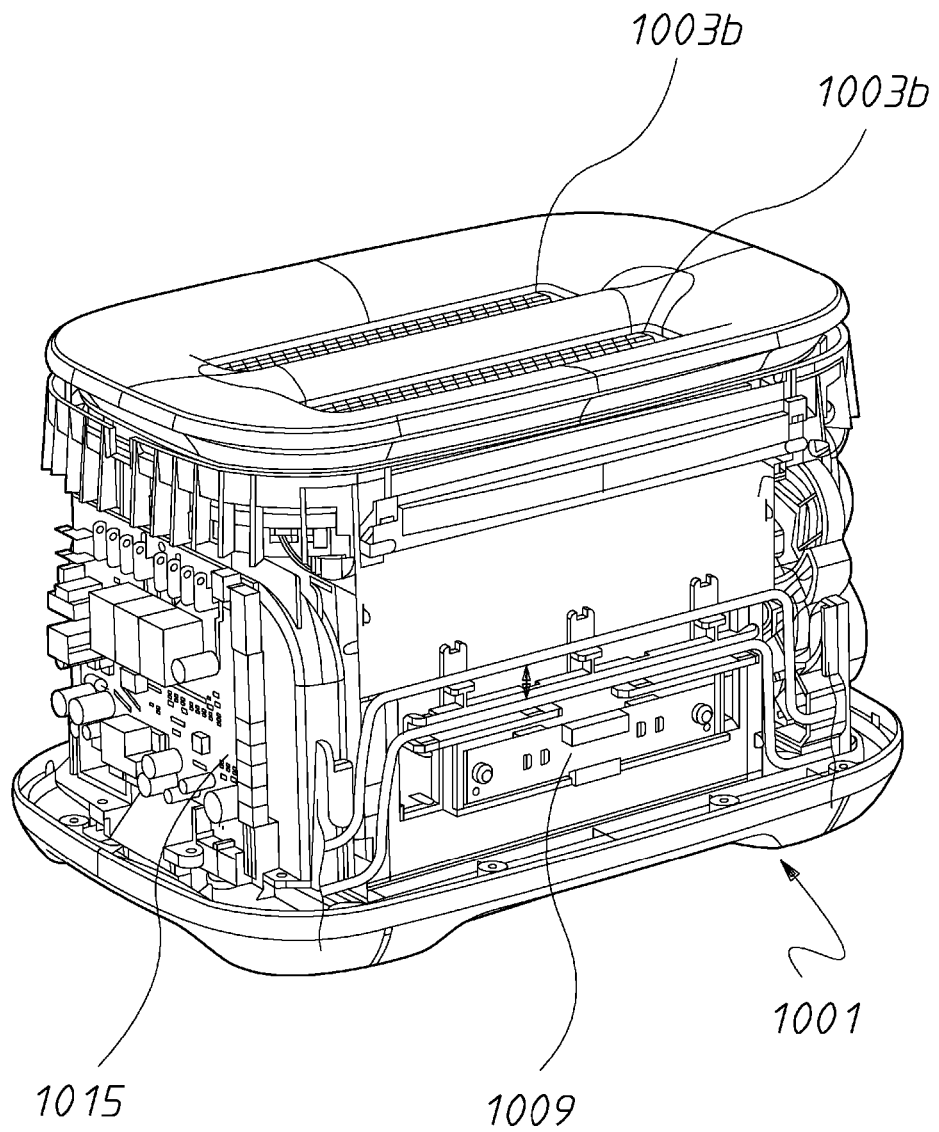

FIG. 61 shows the toaster of FIG. 1A without an outer covering. On one end of the toaster is positioned a control board 1015 that includes a processor (or controller) for controlling various operations of the toaster.

Figure 62:
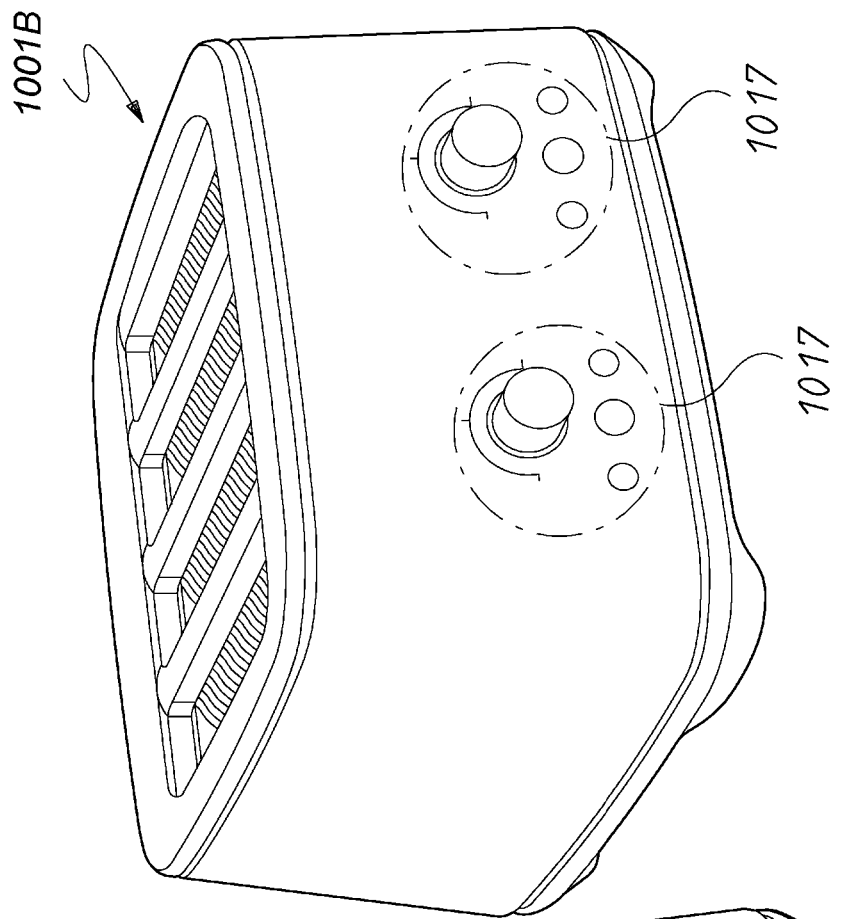
Figure 62:
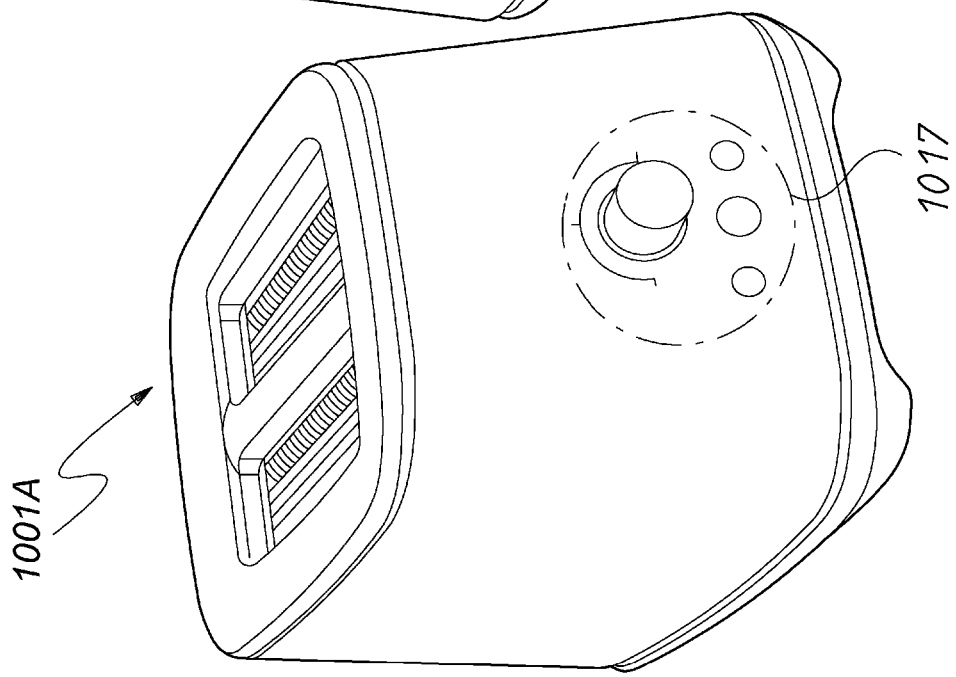

FIG. 62 shows two different embodiments of a toaster (1001A and 1001B) each with one or two user interfaces 1017, which are connected to the processor for controlling operation of the toaster. A first toaster 1001A has two toasting slots whereas a second toaster 1001B has four toasting slots. The user interface may be used to set a desired "shade" of toasting level between light and dark. Further, the user interface may set a type of food item that is to be toasted such as a snack, crumpet or any other type of food item, including a type of bread, such as sourdough, fruit bread etc.

Figure 63:
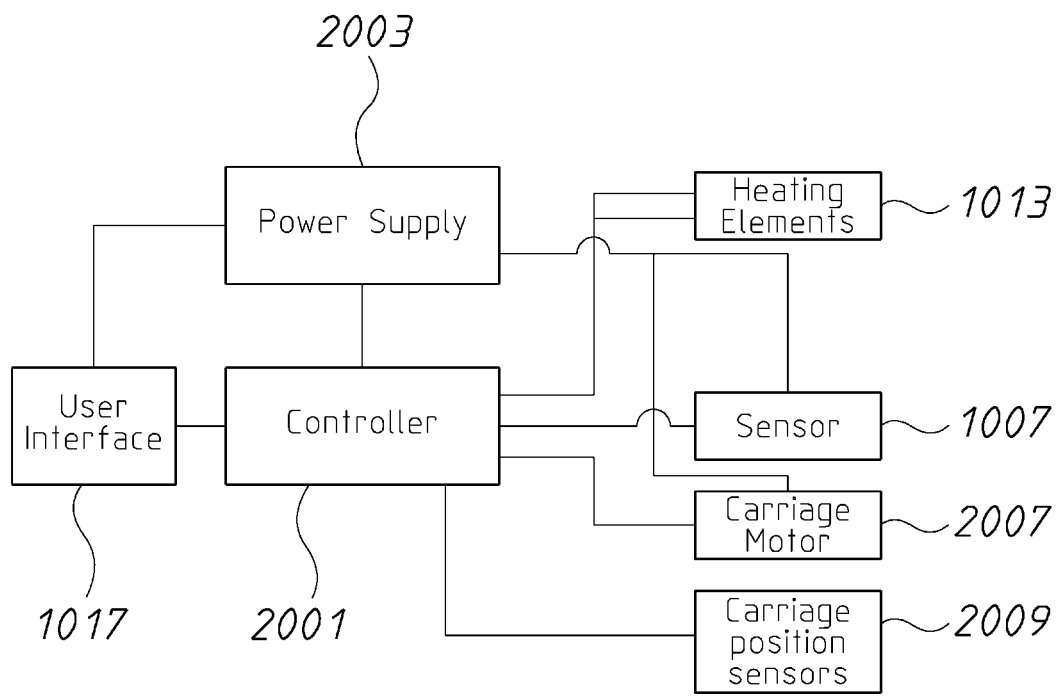
FIG. 63 shows a circuit block diagram according to an embodiment of the present disclosure.

FIG. 63 shows a circuit block diagram according to an embodiment of the present disclosure.

A controller 2001 in the form of a microprocessor or microcontroller is connected to a power supply system 2003 that regulates the mains power to which the toaster is connected. Power to the elements 1013 is fed from a controller board (not shown), the power supply supplies power that is used to switch the elements power feed. The power supply 2003 provides power to the optical sensor 1007 as well as the user interface 1017 and a carriage motor 2007. The controller is in communication with each of the user interface 1017, heating elements 1013, sensor 1007, carriage motor 2007 and carriage position sensors 2009 to send control signals and receive feedback signals.

The controller may operate using an algorithm stored inside internal memory, or may access an algorithm from an external memory. Alternatively, the controller may operate based on hard wired instructions such as with a FPGA (Field Programmable Gate Array).

Figure 64:
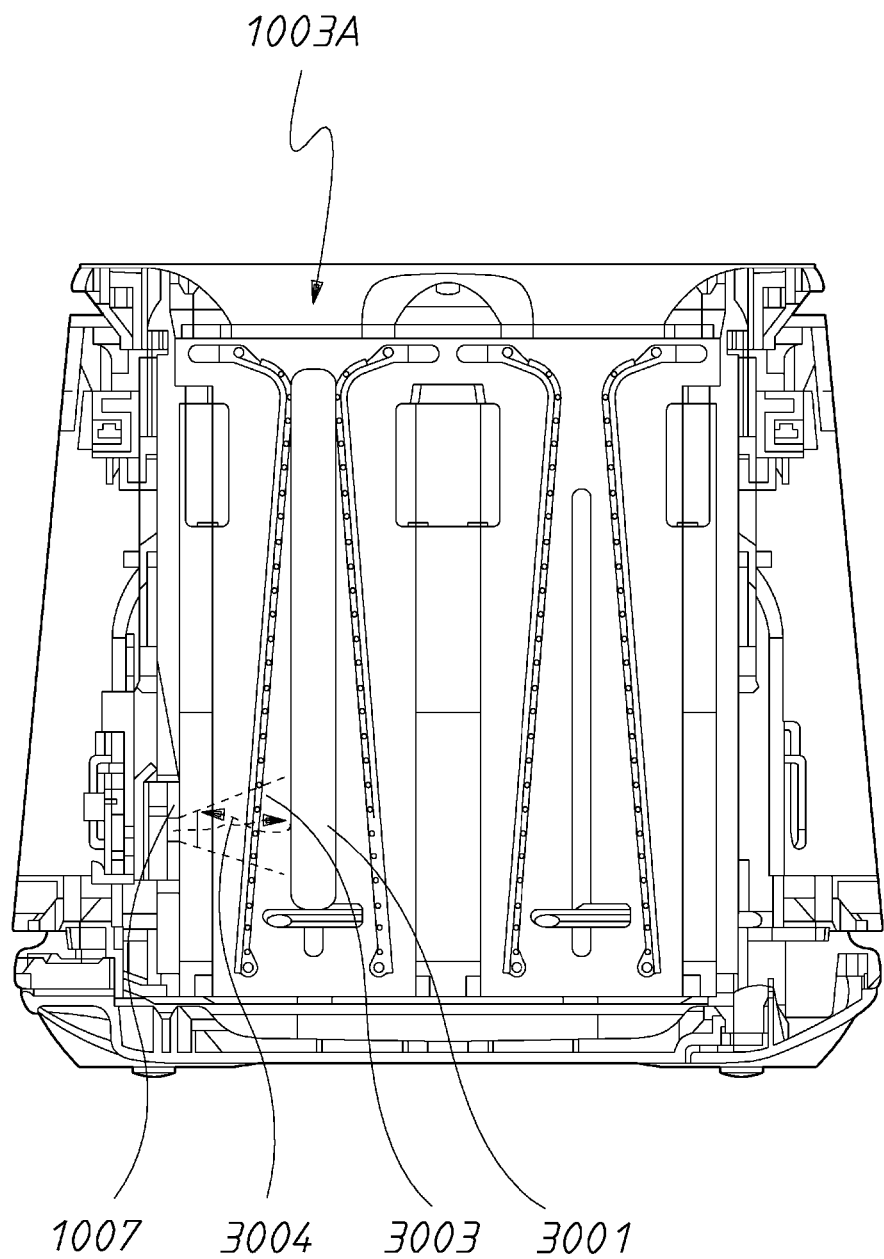
FIG. 64 shows a cross section of a toaster according to an embodiment of the present disclosure.

FIG. 64 shows a cross section of a toaster according to an embodiment of the present disclosure.

Figure 2:
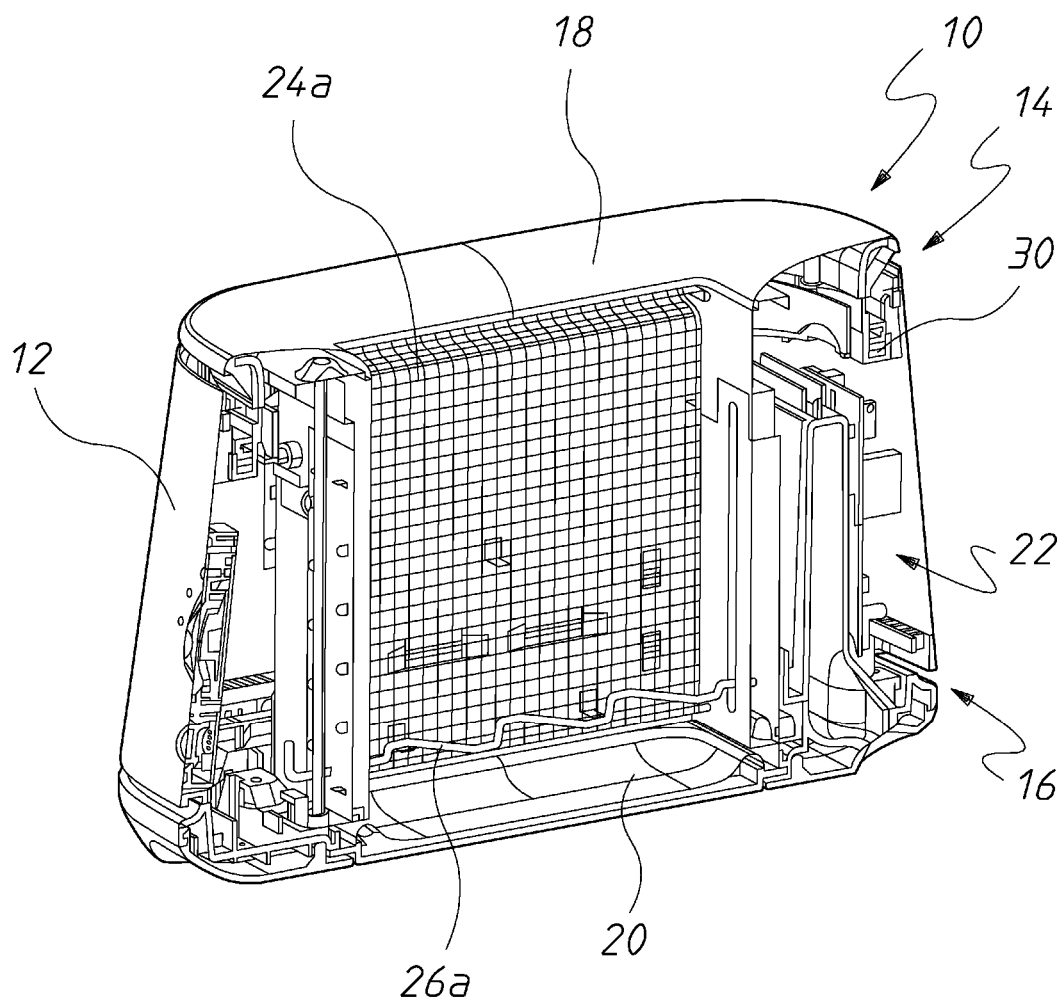
FIG. 2 is a further schematic sectioned isometric view of the toaster of FIG. 1.

An item of food 3001 has been placed in the first toasting slot 1003A. The optical sensor 1007 emits 3003 an optical signal into the toasting slot. This optical signal is then reflected 3004 off the food item back to the sensor 1007. The sensor 1007 communicates the reflected optical signal to the processor 2001 (see FIG. 2), wherein the processor makes a determination of the type of food item being toasted. In this example, the processor determines an active shade profile based on the reflected optical signal for the food item when the heating element is active, It will be understood that the active shade profile may also be obtained prior to and/or after the heating element is active, i.e. when the heating element is inactive. The processor then compares the active shade profile that has been determined from the reflected optical signal with at least one stored shade profile. Each stored shade profile may be associated with a food item type, such as a type of food, or a type of bread, e.g. sourdough, fruit bread, white bread, whole grain, brown bread, crumpet etc. The processor 2001 is then able to determine if the active shade profile and the stored shade profile are within a defined threshold of each other to obtain a match. If a match is obtained the processor 2001 may then control a heating profile of the heating elements 1013 based on the food item type that has been detected due to the active shade profile.

Figure 65:
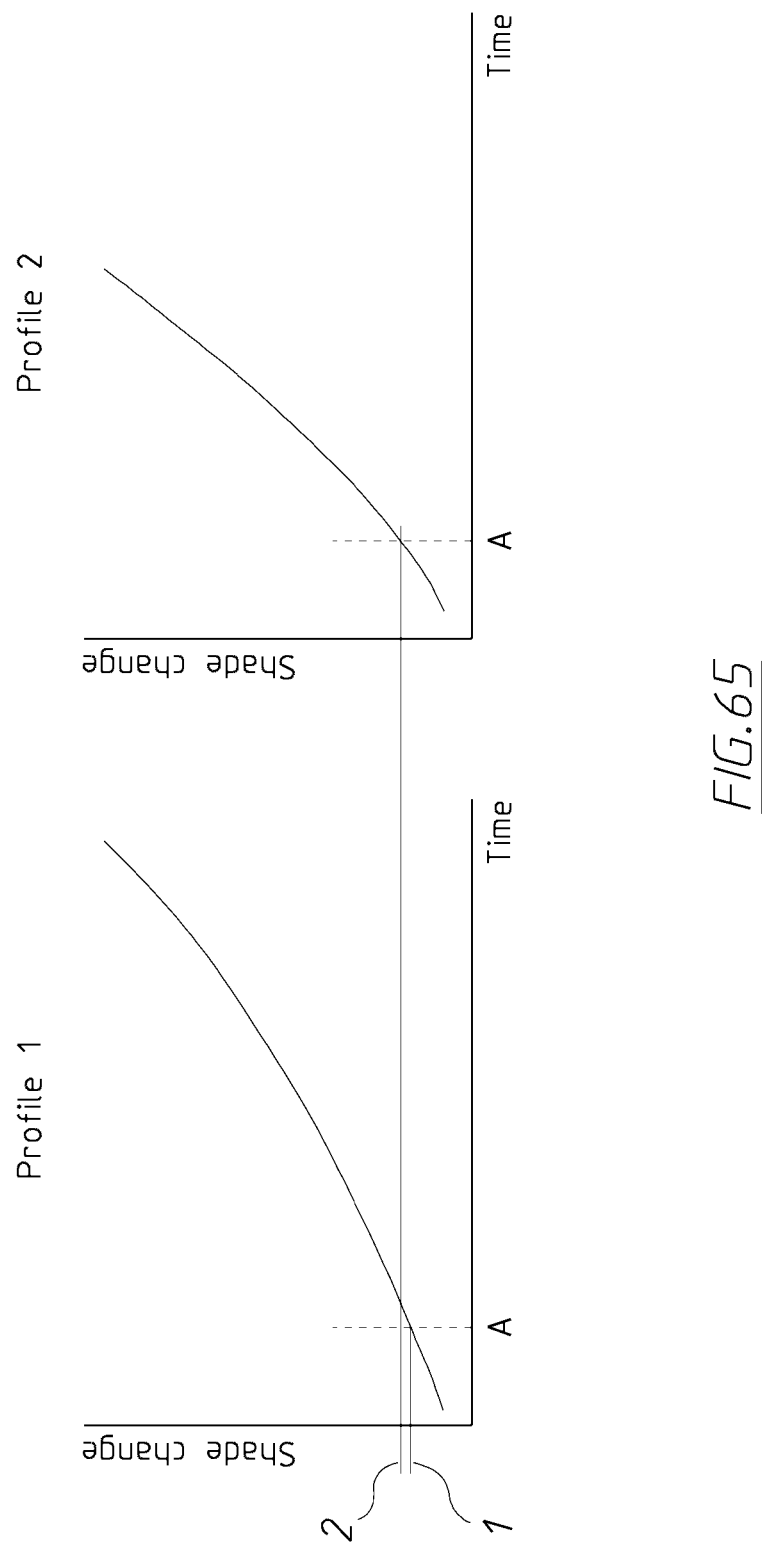
FIG. 65 shows shade change profiles for different food types according to an embodiment of the present disclosure.

FIG. 65 shows shade change profiles for different food types according to an embodiment of the present disclosure.

In profile 1 of FIG. 65 a profile is shown of shade change (i.e. reflected optical signal) versus time the heating elements 1013 have been switched on for a standard benchmark food type, such as white bread. In profile 2 of FIG. 3B a profile is shown of shade change (i.e. reflected optical signal) versus time the heating elements 1013 have been switched on for a different food type, such as a fruit bread. It can be seen that, at time point A of profile 1, a different shade change value is evident when compared with time point A of profile 2.

As seen in FIG. 65, the processor 2001 may compare a first shade value of a first food type in an active shade profile at a defined time point (e.g. time point A) with a second shade value of a second food type in a stored shade profile at the same defined time point (time point A) to determine if the first shade value and the second shade value are within the defined threshold, indicating that the first and second food types are the same food type. For example, if the value at the defined time point is within a defined percentage threshold or a defined value, the processor 2001 makes the determination that the food item type being toasted is the one associated with the stored shade profile.

Upon the processor 2001 determining that the active shade profile and the stored shade profile are within the defined threshold of each other, it may adjust one or both of the time for toasting the food stuff and the power being applied to the heating elements 1013 in order to better toast the food item.

Figure 66:
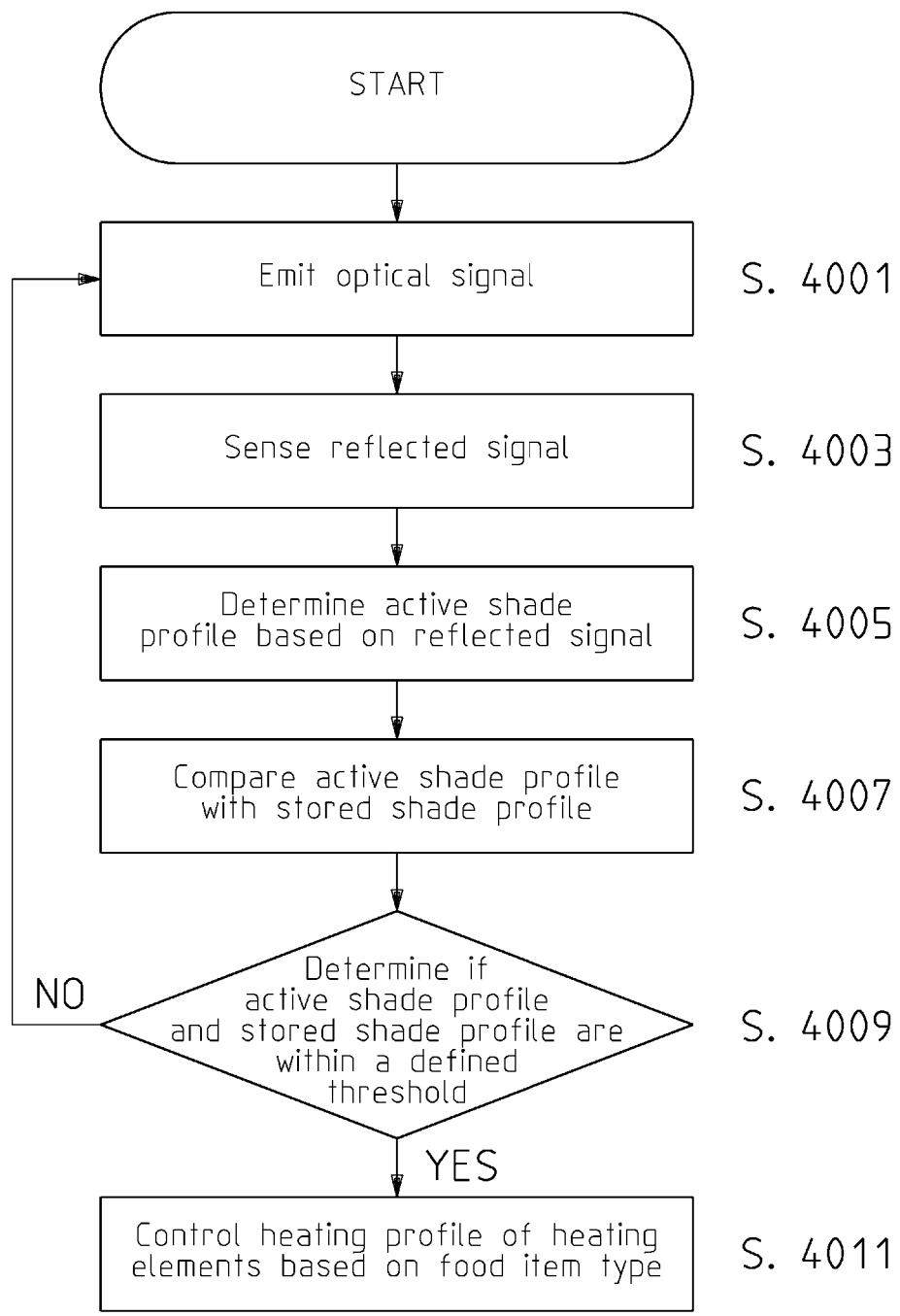
FIG. 66 shows a process flow diagram according to an embodiment of the present disclosure.

FIG. 66 shows a process flow diagram according to an embodiment of the present disclosure.

The process starts, and at step S4001, the process emits an optical signal into a toasting slot of the toaster. At step S4003, the process senses a reflected optical signal that reflects off a food item when the food item is placed in the toasting slot. In this example, at step S4005, the process determines an active shade profile based on the reflected optical signal for the food item when heating elements of the toaster are active. Alternatively, the heating elements can also be inactive when performing this step. At step S4007, the process compares the active shade profile with at least one stored shade profile associated with at least one food item types to determine if the active shade profile and the stored shade profile are within a defined threshold of each other. At step S4009, the process determines if the active shade profile and the stored shade profile are within the defined threshold of each other, and if so, at step S4011, controls a heating profile of the heating elements 1013 based on the food item type or, if not, returns to step S4001.

Further, the process may compare a first shade value in the active shade profile at a defined time point with a second shade value in the stored shade profile at the same defined time point to determine if the first shade value and the second shade value are within the defined threshold.

Further, the process may adjust one or both of the time for toasting the food stuff and the power being applied to the heating elements based on the determination that the active shade profile and the stored shade profile are within the defined threshold of each other.

Therefore, for example, by sensing the rate of shade change on the bread surface, the system can detect bread types with high moisture content and adjust heating conditions/toast settings accordingly. This detection method may also be used to identify unique bread types such as breads with high sugar content (raisin) where toasting has a faster rate of change.

The following describes an embodiment of a toaster and an associated toaster control method for detecting an optimal position for toasting a food item in a toasting slot of a toaster.

Figure 67:
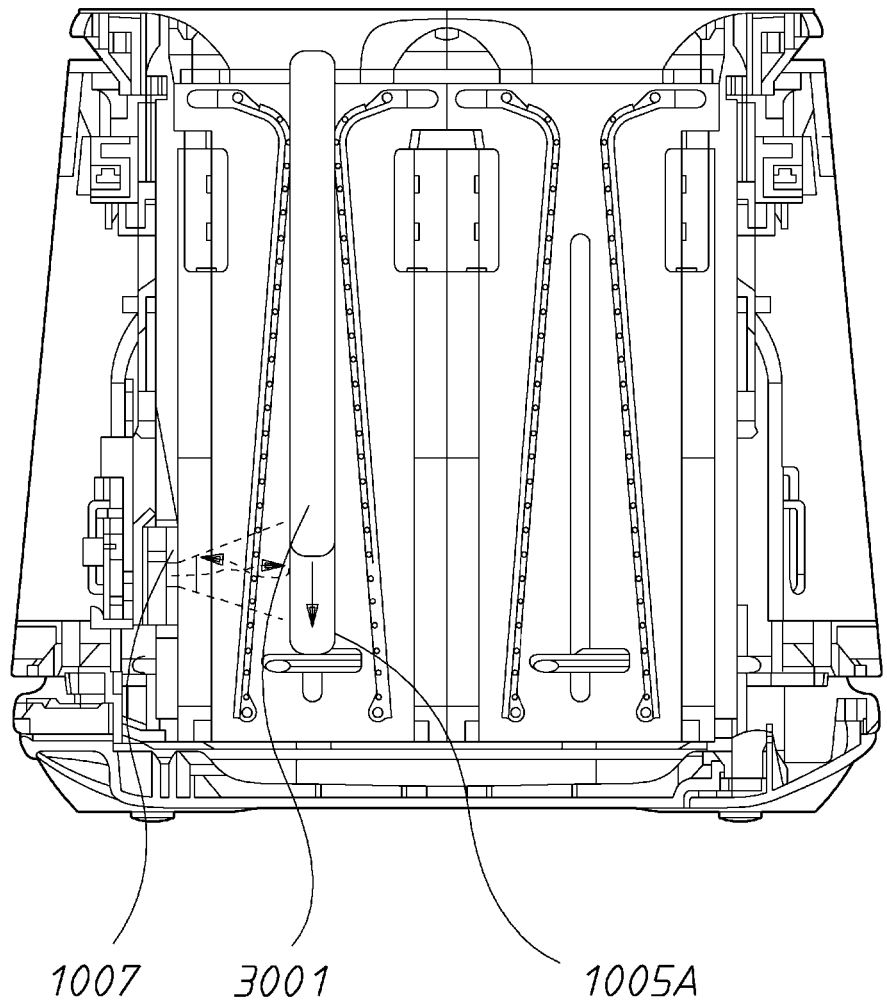
FIG. 67 shows a cross section of a toaster in accordance with an embodiment of the present disclosure.

FIG. 67 shows a cross section of a toaster in accordance with an embodiment of the present disclosure.

An item of food 3001 has been placed in the first toasting slot 1003A on the toasting carriage 1005A. FIG. 67 indicates the movement of the item of food 3001 as it is lowered into the first toasting slot 1003A. The food item is automatically lowered using a toaster lift carriage mechanism which is described in more detail below. The optical sensor 1007 emits an optical signal 3003 into the toasting slot against the food item. This optical signal is then reflected off the food item back to the sensor 1007. The sensor 1007 communicates the reflected optical signal to the processor 2001.

The processor 2001 then determines an optical profile of the food item 3001 based on the reflected optical signal along a region of the food item as it is being moved within the slot. For example, the processor may determine the optical profile as the lift carriage mechanism lowers the food item into the slot, or as it raises the food item from the bottom of the slot, or at any other desired position.

The processor 2001 then, based on the determined optical profile, determines an optimal sensing location along the region of the food item that corresponds to an optimal sensing region. For example, the optical profile may indicate where holes appear in the bread, or the location of seeds in the bread due to increased or lowered reflectivity of the optical signal. These regions would not be preferable for directing the optical signal when monitoring the toasting of the bread. An optimal sensing location would be one that generally identifies the bread surface that is to be optimally toasted. Therefore, the processor controls the toasting carriage so that it moves to a toasting position that corresponds with the determined optimal sensing location.

Alternatively, the optimal sensing location may be determined by the processor by comparing the optical profile with a stored profile that is associated with at least one optimal sensing region for the food item.

Figure 68:
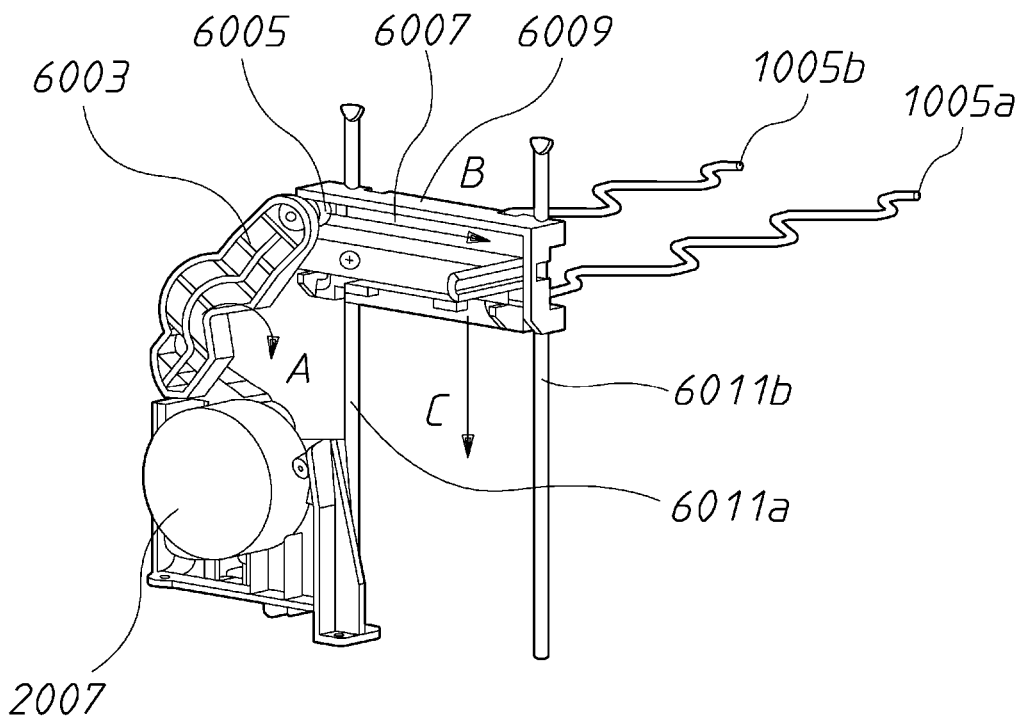
FIGS. 68 to 71 show a toaster carriage lift mechanism in accordance with an embodiment of the present disclosure.

FIGS. 68 to 71 show a toaster carriage lift mechanism in accordance with an embodiment of the present disclosure;

A shown in FIG. 68, the toaster carriage lift mechanism has a motor 2007 (e.g. a step motor) controlled by the processor 2001 which feeds back its position to the processor 2001. The motor position may be synchronised with the toasting carriages (1005A, 1005B) when they are in a raised position and when they are in a lowered position.

Connected to the motor 2007 is a curved arm 6003 that rotates in an arc (see arrow A in FIG. 68) with the spin of the motor drive. A spindle 6005 at the end of the arm is located in a slot 6007 of a carriage piece 6009 that is connected to the top and bottom positions of the toasting carriages (1005A, 1005B). As motor 2007 turns, the curved arm 6003 rotates and causes the spindle 6005 to move in an arc and slide along the slot 6007 in the direction of arrow B, forcing the carriage piece 6009 down along the guide posts (6011A & 6011B) in the direction of arrow C.

Figure 69:
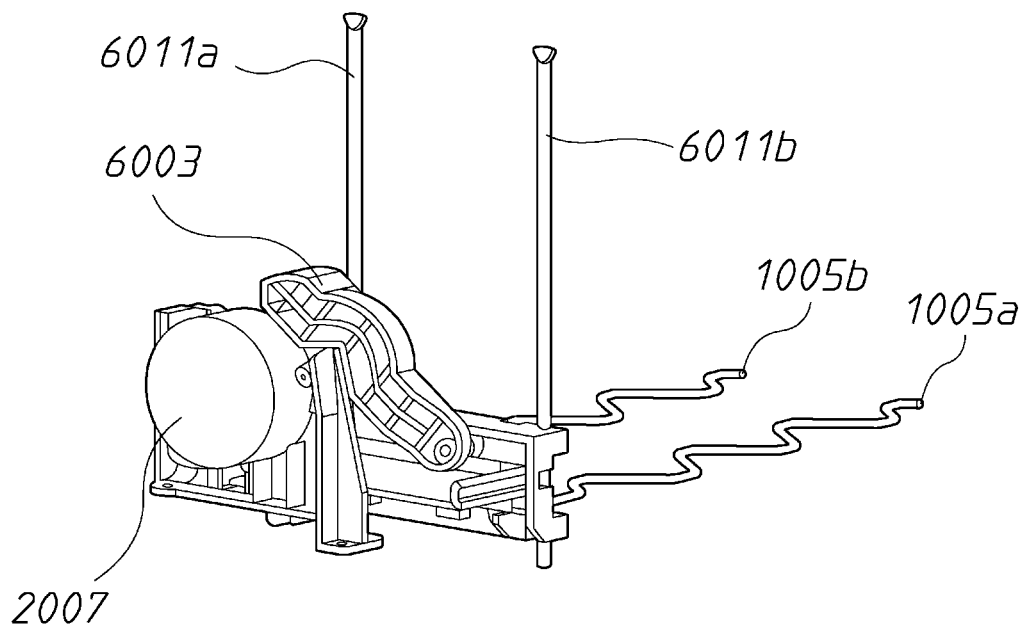

FIG. 69 shows the toasting carriages (1005A & 1005B) at a lowered position.

Figure 70:
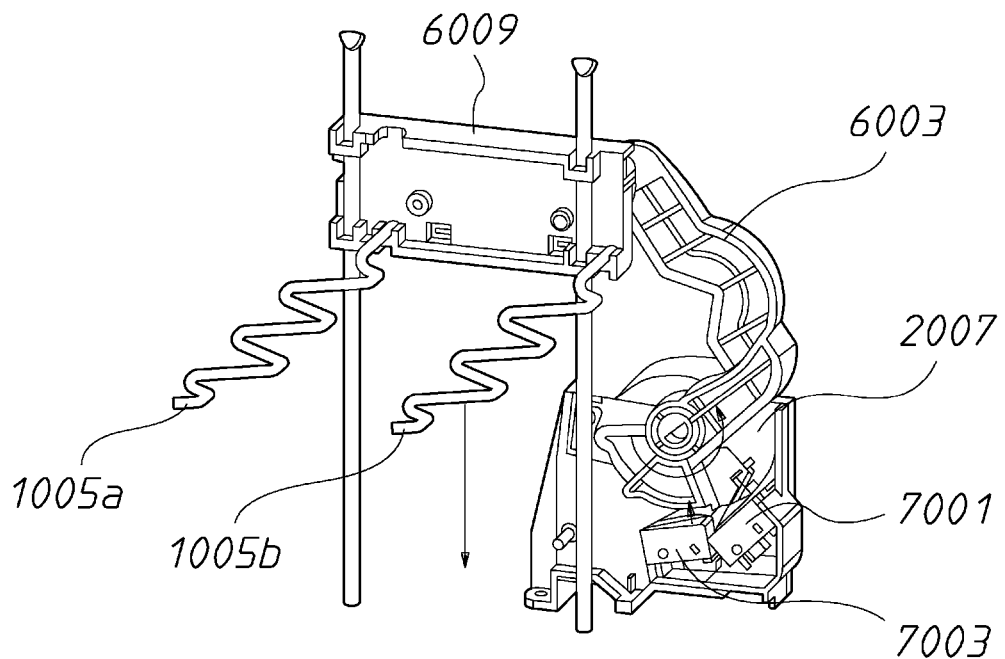

FIG. 70 shows the top and bottom positions of toasting carriages (1005A & 1005B) at a raised position corresponding to the image in FIG. 6A. Also shown are microswitches (7001, 7003) which feedback the upper and lower position limits based on the rotation of the motor to the controller 2001 to stop the motor 2007 form rotating to a point that would cause damage. The micro-switches may also identify a third position between the upper and lower position.

Figure 71:
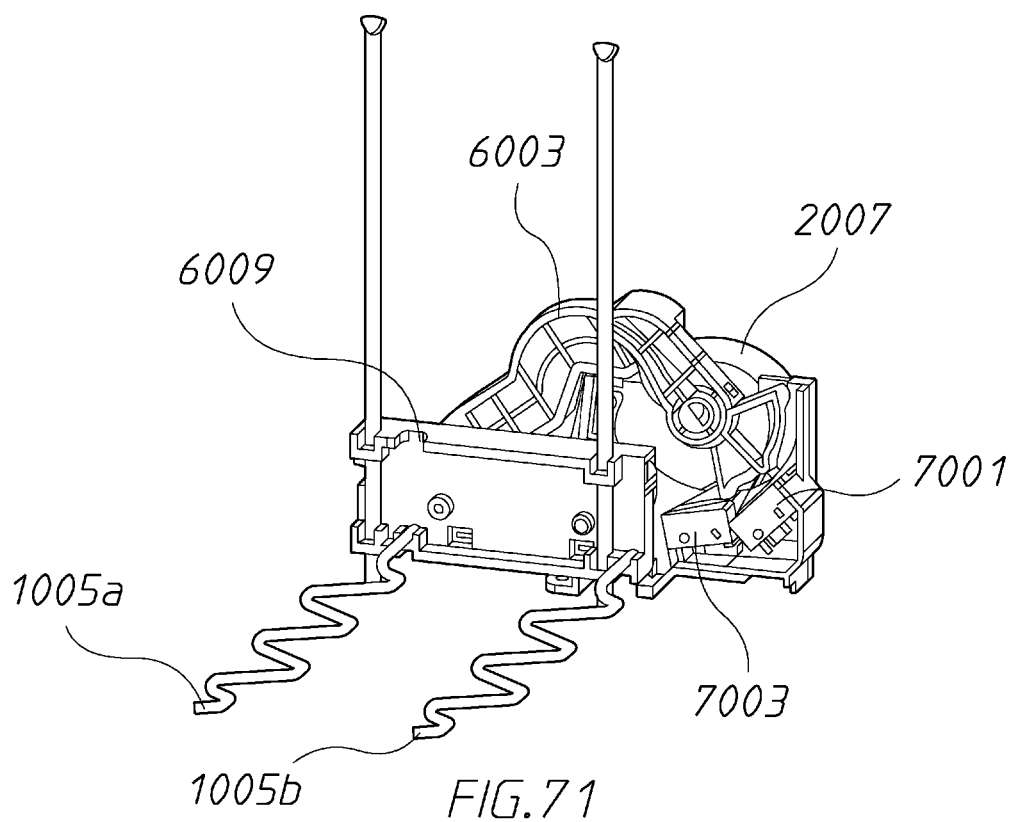

FIG. 71 shows the toasting carriages (1005A & 1005B) at a lowered position corresponding to the image in FIG. 6B.

Therefore, the carriage motor 2007 is arranged to control movement of the toasting carriage under operation of the processor 2001. The processor 2001 may determine the carriage position of the toasting carriage when the toasting carriage is moved within the toasting slot based on operation of the carriage motor, for example, by receiving feedback from a stepper motor as to the rotating position of the step motor. Alternative type motors may also be used to provide positional feedback. Other motors may include DC motors, synchronous motors etc. The processor 2001 can then control movement of the toasting carriage to the carriage position that corresponds with the toasting position after determining the optimal sensing location as discussed above.

It will be understood that other positional feedback devices may be used to provide an indication of the position of the toasting carriage. For example, feedback devices may include, for example, optical devices, Hall effect sensors, magnetic devices, and transducers.

Figure 72:
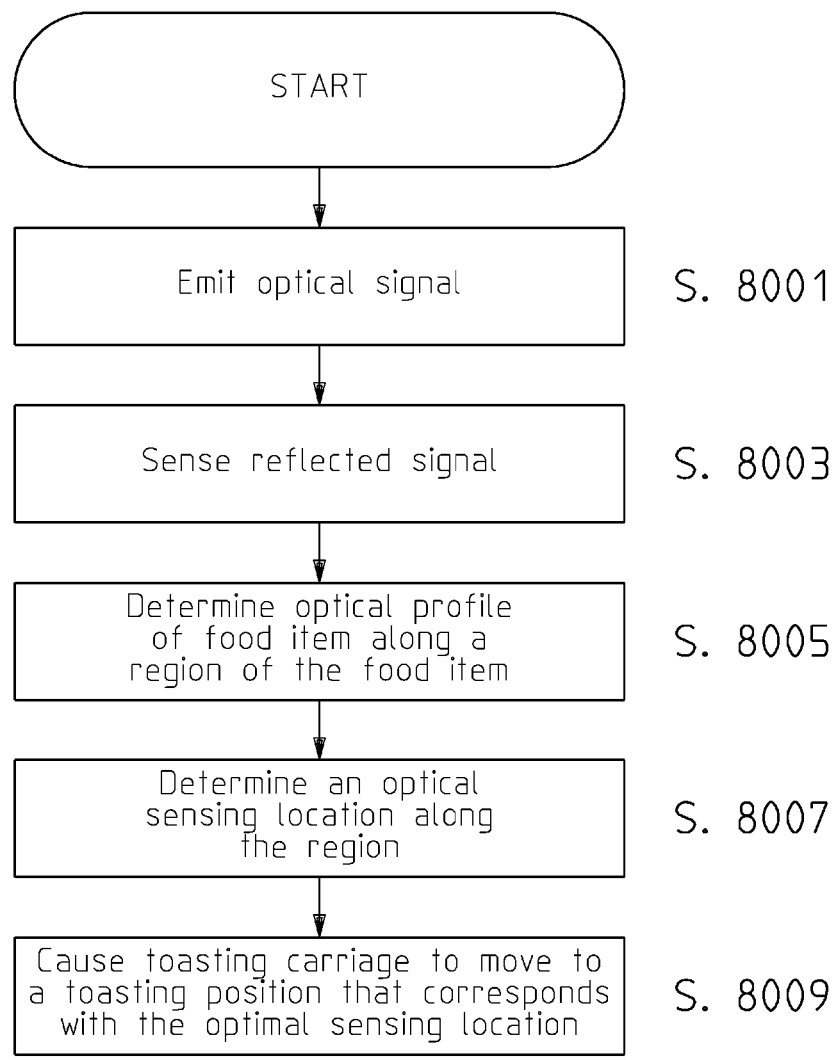
FIG. 72 shows a process flow diagram in accordance with an embodiment of the present disclosure.

FIG. 72 shows a process flow diagram in accordance with an embodiment of the present disclosure;

The process starts and at step S8001, the process emits an optical signal into a toasting slot of the toaster. At step S8003, the process senses a reflected optical signal associated with a food item when a toasting carriage of the toaster is inserting the food item into the toasting slot. At step S8005, the process determines an optical profile of the food item based on the reflected optical signal along a region of the food item as it was being inserted. At step S8007, the process determines an optimal sensing location along the region of the food item that corresponds to an optimal sensing region based on the determined optical profile. At step S8009, the process causes the toasting carriage to move to a toasting position that corresponds with the determined optimal sensing location.

Further, the process may determine a carriage position of the toasting carriage when the toasting carriage is moved within the toasting slot based on operation of the carriage motor, and control movement of the toasting carriage to the carriage position that corresponds with the toasting position after determining the optimal sensing location.

Further, the process may compare the optical profile with a stored profile that is associated with at least one optimal sensing region.

The following describes an embodiment of a toaster and an associated toaster control method for detecting whether a food item to be toasted has been correctly placed in a toasting slot of the toaster or placed in a correct toasting slot of the toaster, and controlling one or more heater elements in the toaster based on the detected food item.

Figure 73:
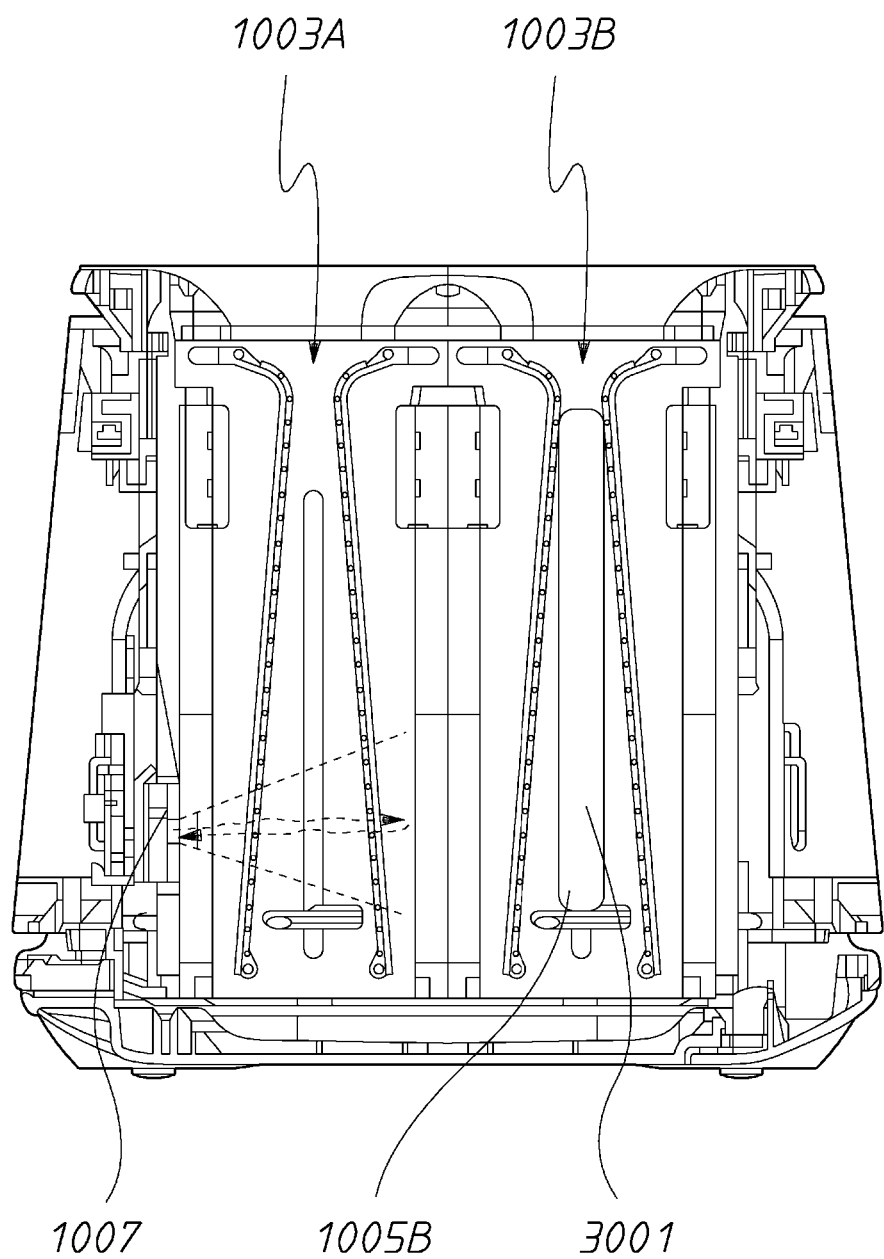
FIG. 73 shows a cross section of a toaster in accordance with an embodiment of the present disclosure.

FIG. 73 shows a cross section of a toaster in accordance with an embodiment of the present disclosure;

An item of food 3001 has been placed in a toasting slot 1003B on the toasting carriage 1005B. The optical sensor 1007 emits an optical signal and senses the reflected signals of the back wall of the toasting slot 1003A. The reflected signal is communicated back to the processor 2001.

The processor 2001 determines, based on the reflected optical signal, whether a food item 3001 has or has not been inserted in the toasting slot 1003A. In this particular example, the food item 3001 has been placed in the incorrect slot 1003B. The reflected signal from an item of food is significantly different to that of a reflected signal from the back of the slot.

It will be understood that slot 1003B may also have an optical sensor, which may detect that the food item has been placed in the slot 1003B associated with that optical sensor. Subsequently, if the user activates the heating element(s) of a different slot 1003A, the processor may determine this and carry out corrective action or output an appropriate signal.

It will be understood that the system may work equally as well in a toaster having a single slot, where the optical signal is used to determine if the food item has been correctly placed in the slot.

When the processor 2001 has made a determination that the food item 3001 has not been inserted in the toasting slot being operated, the processor executes one or more defined tasks that may include, for example, turning off one or more heating elements associated with the toasting slot, causing a toasting carriage for the toasting slot to rise, outputting an alarm signal and shutting down user control of the toaster.

Although this example is described with reference to a toaster with a motorised toasting carriage, it will be understood that this example may be applied to a toaster with a manually operated toasting carriage.

Figure 74:
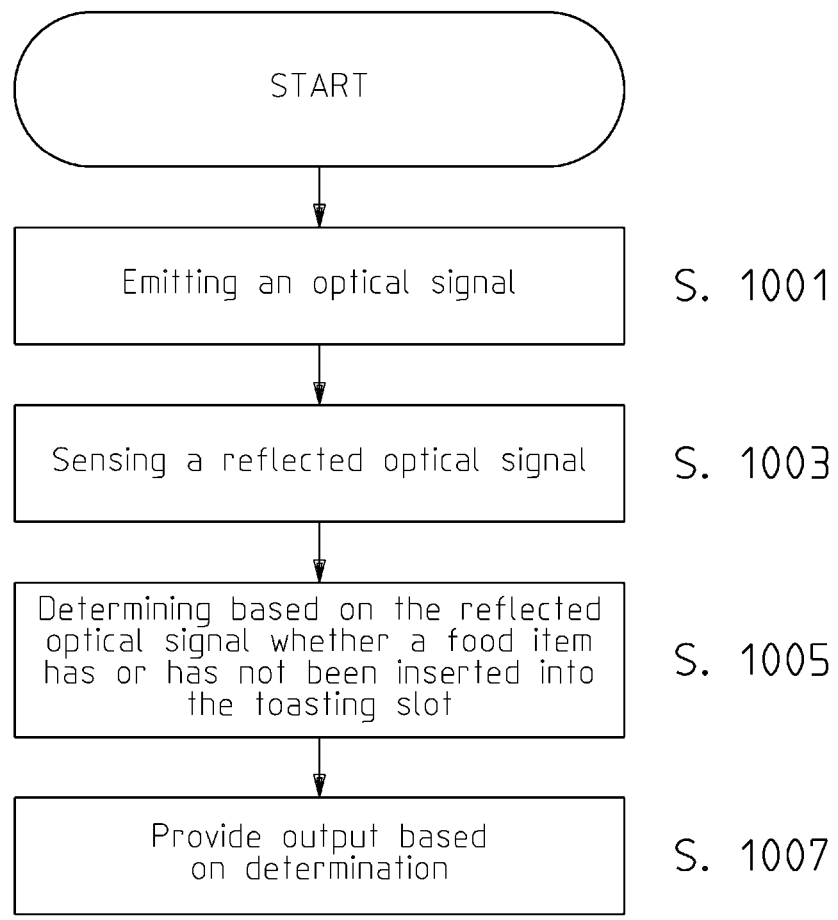
FIG. 74 shows a process flow diagram according to an embodiment of the present disclosure.

FIG. 74 shows a process flow diagram according to an embodiment of the present disclosure.

The process starts and at step S1001, the process emits an optical signal into a toasting slot of the toaster. At step S1003, the process senses a reflected optical signal associated with the toasting slot. At step S1005, the process determines, based on the reflected optical signal, whether a food item 3001 has or has not been inserted within the toasting slot. At step S1007, the process provides an output based on the determination in step S1005.

For example, the process may, upon a determination that the food item 3001 has not been inserted in the toasting slot, execute one or more defined tasks including, for example, turning off one or more heating elements 1013 associated with the toasting slot, causing a toasting carriage for the toasting slot to rise, outputting an alarm signal and shutting down user control of the toaster. Any suitable indication may be provided on a user interface of the toaster.

Although the invention has been described with reference to a preferred embodiment, it will be appreciated by those persons skilled in the art that the invention may be embodied in many other forms.

The invention claimed is:

1. A toaster including:
a housing;
a pair of opposing food guards located within the housing and defining a toasting cavity for receiving foodstuff to be toasted;
a pair of heating elements located within the housing, each heating element being located on a respective side of the pair of food guards; and
a top cap forming an upper surface of the housing, the upper surface providing a curved portion having a first and a second surface portion, the first and second surface portions being located so as to provide a slot therebetween, the slot providing for the delivery of the foodstuff to the cavity,
wherein the curved portion has a vertical direction of extension and a horizontal direction of extension so as to converge downwardly to said toasting cavity,
wherein the top cap has a coating that is a non-tarnishing colour, and wherein the non-tarnishing colour of the top cap coating has an emissivity of 0.75 for even heat distribution.

2. The toaster of claim 1, wherein the curved portions directs crumbs to fall into the cavity via the slot and directly onto a crumb tray of the toaster.

3. The toaster of claim 2, wherein the curved portion is formed as a compound curve with boundaries defined by a height in the range of between 10 to 20 mm and a width in the range of between 30 to 45 mm.

4. The toaster of claim 3, wherein the height is 15.2 mm and the width is 37.5 mm so as to define a compound curve having a radius of curvature of 24.5 mm.

5. The toaster of claim 1, wherein the coating of the top cap is non-stick and/or ceramic.

6. The toaster of claim 5, wherein the top cap coating is black.

7. The toaster of claim 1, wherein the top cap coating has a surface texture to provide an emissivity of 0.75 for even heat distribution.

8. The toaster of claim 1, wherein each food guard is spaced from the corresponding heating element by a clearance, and each food guard has an upwardly-extending portion and a portion that extends transversely therefrom so as to extend above the corresponding heating element, the transversely-extending portion of each food guard projecting away from the opposing food guard.

9. The toaster of claim 1, wherein the toaster further includes a pair of heating element brackets mounted at an upper portion of the housing, each heating element bracket including a downwardly-facing portion adapted to engage and support the corresponding heating element.

10. The toaster of claim 1, wherein each food guard is formed from a wire mesh having a mesh gap of less than 5.3 mm.

11. The toaster of claim 10, wherein each food guard has a ceramic coating adapted to evenly distribute the heat from the heating elements into the toasting cavity.

12. The toaster of claim 11, wherein the food guard coating is a dark, non-tarnishing colour.

13. The toaster of claim 12, wherein the dark, non-tarnishing colour of the food guard coating has an emissivity of about 0.75 for even heat distribution.

14. The toaster of claim 11, wherein the food guard coating has a surface texture to provide an emissivity of about 0.75 for even heat distribution.

15. The toaster of claim 1, wherein the toaster further includes a pair of end panels, each end panel being located adjacent to a respective end of the food guards, the end panels having a ceramic coating adapted to evenly distribute the heat from the heating elements into the toasting area.

16. The toaster of claim 15, wherein the end panel coating is a non-tarnishing colour.

17. The toaster of claim 16, wherein the non-tarnishing colour has an emissivity of about 0.75 for even heat distribution.

18. The toaster of claim 15, wherein the end panel coating has a surface texture to provide an emissivity of 0.75 for even heat distribution.

19. The toaster of claim 1, wherein the housing includes an inner wall surrounding the toasting cavity, the inner wall including an upper portion that is angled downwardly toward the slots.

* * * * *